US009674528B2

(12) United States Patent
Amano et al.

(10) Patent No.: US 9,674,528 B2
(45) Date of Patent: Jun. 6, 2017

(54) IMAGE PROCESSING APPARATUS AND IMAGE PROCESSING METHOD

(75) Inventors: Hiroshi Amano, Osaka (JP); Takeshi Tanaka, Osaka (JP); Kenji Oga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 492 days.

(21) Appl. No.: 13/823,129

(22) PCT Filed: Aug. 22, 2012

(86) PCT No.: PCT/JP2012/005256
§ 371 (c)(1),
(2), (4) Date: Mar. 14, 2013

(87) PCT Pub. No.: WO2013/076888
PCT Pub. Date: May 30, 2013

(65) Prior Publication Data
US 2013/0315312 A1 Nov. 28, 2013

(30) Foreign Application Priority Data

Nov. 21, 2011 (JP) .................. 2011-254421

(51) Int. Cl.
*H04N 19/587* (2014.01)
*H04N 19/51* (2014.01)
(Continued)

(52) U.S. Cl.
CPC ..... *H04N 19/00587* (2013.01); *H04N 19/129* (2014.11); *H04N 19/157* (2014.11);
(Continued)

(58) Field of Classification Search
CPC .. H04N 19/122; H04N 19/169; H04N 19/189; H04N 19/196
(Continued)

(56) References Cited

U.S. PATENT DOCUMENTS

2006/0239354 A1 10/2006 Amano et al.
2010/0208806 A1* 8/2010 Yu ..................... H04N 19/176
375/240.12
(Continued)

FOREIGN PATENT DOCUMENTS

JP 2006-311526 11/2006
JP 2008-079170 4/2008
(Continued)

OTHER PUBLICATIONS

International Search Report issued Nov. 27, 2012 in International (PCT) Application No. PCT/JP2012/005256.
(Continued)

*Primary Examiner* — Mohammed Rahaman
*Assistant Examiner* — Jimmy S Lee
(74) *Attorney, Agent, or Firm* — Wenderoth, Lind & Ponack, L.L.P.

(57) ABSTRACT

An image processing apparatus for decoding an image coded in coding processes including (i) prediction on at least one prediction unit (PU) and (ii) frequency transform on transform units (TUs) included in a region including the at least one PU includes a processing unit configured to perform image processing for a predictive image of the at least one PU, depending on a transform order predetermined for the TUs.

18 Claims, 52 Drawing Sheets

(51) Int. Cl.
*H04N 19/176* (2014.01)
*H04N 19/129* (2014.01)
*H04N 19/61* (2014.01)
*H04N 19/157* (2014.01)
*H04N 19/18* (2014.01)
*H04N 19/119* (2014.01)
*H04N 19/122* (2014.01)
*H04N 19/44* (2014.01)

(52) U.S. Cl.
CPC ........... *H04N 19/176* (2014.11); *H04N 19/18* (2014.11); *H04N 19/61* (2014.11); *H04N 19/119* (2014.11); *H04N 19/122* (2014.11); *H04N 19/44* (2014.11); *H04N 19/51* (2014.11)

(58) Field of Classification Search
USPC .................................................... 375/240.16
See application file for complete search history.

(56) References Cited

U.S. PATENT DOCUMENTS

| | | | | |
|---|---|---|---|---|
| 2011/0243226 | A1* | 10/2011 | Choi | H04N 19/91 375/240.12 |
| 2012/0099657 | A1 | 4/2012 | Tanaka et al. | |
| 2013/0003855 | A1* | 1/2013 | Park | H04N 19/119 375/240.18 |

FOREIGN PATENT DOCUMENTS

| | | | |
|---|---|---|---|
| JP | 2008079170 A | * | 4/2008 |
| JP | 2008079170 A1 | * | 4/2008 |
| WO | 2011/004577 | | 1/2011 |
| WO | 2011/158867 | | 12/2011 |
| WO | 2011/161949 | | 12/2011 |
| WO | 2012/046435 | | 4/2012 |

OTHER PUBLICATIONS

Thomas Weigand et al., "Overview of teh H.264/AVC Video Coding Standard", IEEE Transactions on Circuits and Systems for Video Technology, vol. 13, No. 7, Jul. 2003, pp. 560-576.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d1 (version 2: Sep. 8, 2011, search on Sep. 22, 2011) , 6th Meeting: Torino, IT, Jul. 14-22, 2011, URL:http://phenix.itsudparis.eu/jct/doc_end_user/documents/6_Torino/wg11/JCTVC-F803-v3.zip.

* cited by examiner

SC: Start code
SH: Slice header

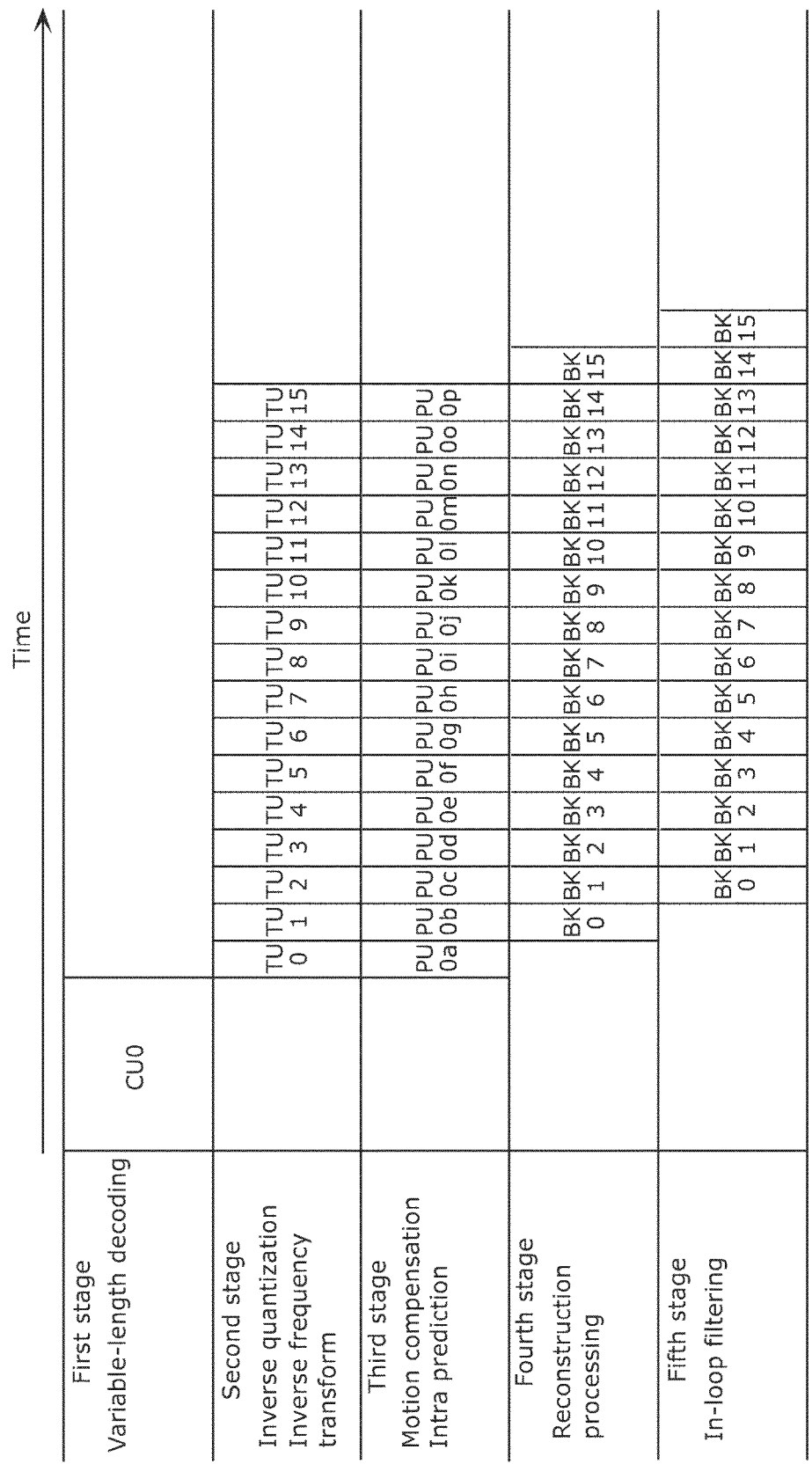

IMAGE PROCESSING APPARATUS AND IMAGE PROCESSING METHOD

TECHNICAL FIELD

The present invention relates to an image processing apparatus for decoding an image coded in coding processes including prediction.

BACKGROUND ART

Examples of the technique for decoding an image coded in coding processes including prediction include the techniques disclosed in Patent Literature (PTL) 1 and Non Patent Literatures (NPLs) 1 and 2.

CITATION LIST

Patent Literature

[PTL 1] Japanese Unexamined Patent Application Publication No. 2006-311526

Non Patent Literature

[NPL 1] Thomas Wiegand et al, "Overview of the H.264/AVC Video Coding Standard", IEEE TRANSACTIONS ON CIRCUITS AND SYSTEMS FOR VIDEO TECHNOLOGY, JUL. 2003, PP. 560-576

[NPL 2] "Working Draft 3 of High-Efficiency Video Coding", [online], Joint Collaborative Team on Video Coding (JCT-VC), Sep. 8, 2011 (searched on Sep. 22, 2011), Internet <URL:http://phenix.it-sudparis.eu/jct/doc_end_user/documents/6_Torino/wg11/JCTVC -F803-v3.zip>

SUMMARY OF INVENTION

Technical Problem

In decoding a coded image, delay sometimes occurs.

Thus, the present invention provides an image processing apparatus that can reduce delay occurring in decoding a coded image.

Solution to Problem

The image processing apparatus according to an aspect of the present invention is an image processing apparatus for decoding an image coded in coding processes including (i) prediction on at least one prediction unit (PU) and (ii) frequency transform on transform units (TUs) included in a region including the at least one PU, and includes a processing unit configured to perform image processing for a predictive image of the at least one PU, depending on a transform order predetermined for the TUs.

These general or specific aspects of the present invention may be implemented by a system, a method, an integrated circuit, a non-transitory computer-readable recording medium, such as a CD-ROM, or an arbitrary combination of the system, the method, the integrated circuit, the computer program, and the recording medium.

Advantageous Effects of Invention

The image processing apparatus can reduce delay occurring in decoding a coded image.

BRIEF DESCRIPTION OF DRAWINGS

FIG. 13B illustrates a time chart of a second example of pipeline processing according to Embodiment 1.

Figure 1:
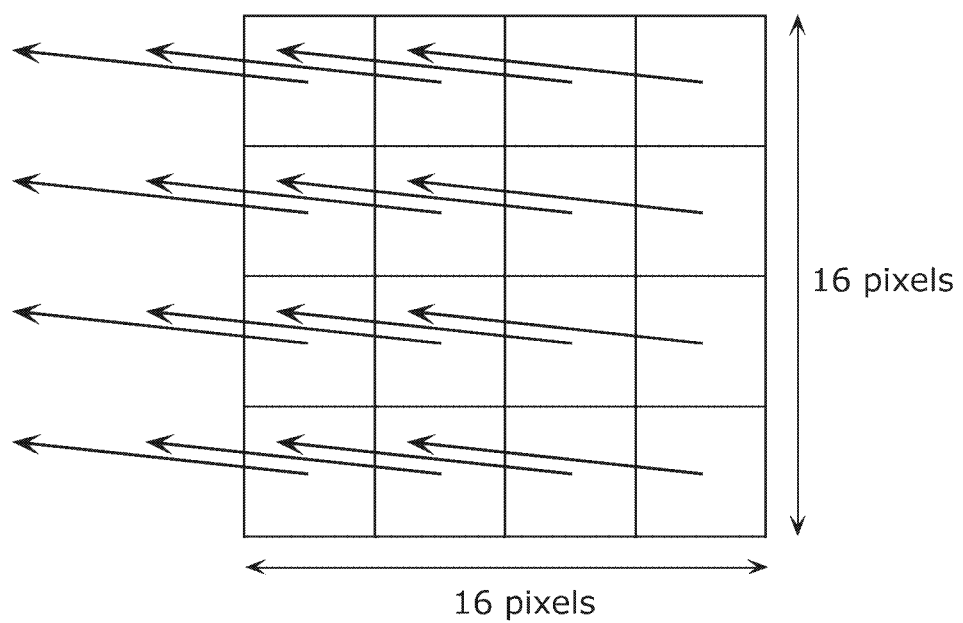
FIG. 1 illustrates partitioning of a macroblock.

DESCRIPTION OF EMBODIMENTS (Knowledge on which the Present Invention is Based)

An image coding apparatus that codes an image partitions each picture included in the image into a plurality of macroblocks (sometimes abbreviated as MBs) each including 16×16 pixels. The image coding apparatus codes the macroblocks in raster scan order. The image coding apparatus codes and compresses the image to generate a coded stream. An image processing apparatus that decodes an image decodes the coded stream in raster scan order for each of the macroblocks to reproduce each of the pictures that are included in the original image.

One of the conventional image coding scheme is the ITU-T H.264 standard (for example, see NPL 1). The image processing apparatus first reads the coded stream to decode the image coded in accordance with the H.264 standard. Then, the image processing apparatus performs variable-length decoding after decoding various header information. The image processing apparatus inversely quantizes coefficient information obtained by the variable-length decoding to perform inverse frequency transform. Accordingly, a differential image is generated.

Next, the image processing apparatus performs intra prediction or motion compensation according to a macroblock type obtained by the variable-length decoding. Here, the motion compensation is performed on 16×16 pixels at a maximum. Accordingly, the image processing apparatus generates a predictive image. Then, the image processing apparatus performs reconstruction processing by adding the differential image to the predictive image. Then, the image processing apparatus performs in-loop filtering on the reconstructed image to decode a target image.

The in-loop filter is a filter to be applied before the reconstructed image is stored in a frame memory as a reference image. Examples of the in-loop filter include a deblocking filter, a sample adaptive offset filter, and an active loop filter. The filter to be applied in display is called an out-loop filter.

As described above, the image coding apparatus in accordance with the H.264 standard codes an image per macroblock including 16×16 pixels. However, 16×16 pixels are not necessarily optimal as a coding unit. Generally, as the resolution of an image is higher, the correlation between adjacent blocks is higher. Thus, as the coding unit is set larger according to the higher resolution of an image, the image coding apparatus can more improve the compression efficiency.

In recent years, super-high-resolution displays have been developed, such as display with 4K2K resolution (3840× 2160 pixels). Thus, it is expected that the resolution of images will further increase. The image coding apparatus in accordance with the H.264 standard has difficulties in efficiently coding an image with high resolution as the technical development for high-resolution images advances.

On the other hand, examples of the techniques proposed as next-generation image coding standards include a technique for solving such a problem (NPL 2). In this technique, the size of a block as a coding unit in accordance with the conventional H.264 standard is variable. The image coding apparatus according to the technique can code an image using blocks each of which is larger than the conventional 16×16 pixels, and appropriately code super-high-resolution images.

Specifically, in NPL 2, a coding unit (CU) is defined as a data unit for coding. The CU is a data unit switchable between the intra prediction for performing intra prediction and the inter prediction for performing motion compensation, such as a macroblock in accordance with the conventional coding standard, and is defined as the most basic block in coding.

The size of the CU is one of 8×8 pixels, 16×16 pixels, 32×32 pixels, and 64×64 pixels. The largest coding unit is called Largest Coding Unit (LCU).

Furthermore, a transform unit (TU also called frequency transform unit) is defined as a data unit for frequency transform. This TU is set to various rectangular sizes larger than or equal to 4×4 pixels, such as 4×4 pixels, 8×8 pixels, 16×16 pixels, 16×12 pixels, and 32×32 pixels.

Furthermore, a prediction unit (PU) is defined as a data unit for the intra prediction or the inter prediction. The PU is set to various rectangular sizes larger than or equal to 4×4 pixels, such as 64×64 pixels, 64×32 pixels, 32×64 pixels, 32×32 pixels, 32×16 pixels, 16×32 pixels, and 16×12 pixels.

On the other hand, examples of an image decoding apparatus in accordance with the H.264 standard include an image decoding apparatus described in PTL 1. The image decoding apparatus according to PTL 1 partitions a macroblock into sub-blocks each with a predetermined size, and performs motion compensation on each of the sub-blocks.

FIG. 1 illustrates partitioning of a macroblock. For example, the image decoding apparatus according to PTL 1 partitions a macroblock of 16×16 pixels into sub-blocks each including 4×4 pixels. Then, the image decoding apparatus performs motion compensation on each of the sub-blocks. Accordingly, the data size for motion compensation is determined to be a predetermined size, irrespective of the size of a macroblock. Thus, processing for motion compensation is simplified.

However, when each of the CU, the PU, and the TU has various sizes as disclosed in NPL 2, there are cases where difficulties arise in smooth operations in pipeline processing including inverse frequency transform, motion compensation, and reconstruction processing. For example, the necessary processing time varies in each of the inverse frequency transform, the motion compensation, and the reconstruction processing, depending on the size or differences in size or shape of the CU, the PU, and the TU. Accordingly, the useless wait time may occur.

Here, the technique of PTL 1 makes it possible to perform motion compensation with a predetermined size. However, for example, the size of the TU varies. After the frequency transform is performed with various sizes, it is difficult to perform the inverse frequency transform with a predetermined size. Thus, the sizes and the shapes of the data units are not unified even with the technique of PTL 1.

Thus, the technique of PTL 1 cannot eliminate the useless wait time described in NPL 2. The useless wait time further increases the delay in the entire processing.

The image processing apparatus according to an aspect of the present invention is an image processing apparatus for decoding an image coded in coding processes including (i) prediction on at least one prediction unit (PU) and (ii) frequency transform on transform units (TUs) included in a region including the at least one PU, and includes a processing unit configured to perform image processing for a predictive image of the at least one PU, depending on a transform order predetermined for the TUs.

Thus, the image processing for a predictive image is appropriately performed in the transform order. Thus, the useless wait time is eliminated, and the delay in the entire processing is reduced.

For example, the processing unit may be configured to obtain the transform order, and perform the image processing in the obtained transform order.

Thus, the image processing for a predictive image is appropriately performed in the transform order.

Furthermore, for example, the processing unit may be configured to perform the image processing on blocks smaller than or equal to the TUs, in the transform order.

Accordingly, the image processing for a predictive image is performed on the TUs in the transform order. Alternatively, the image processing for a predictive image is performed, in the transform order, on the blocks smaller than or equal to the TUs. Thus, the image processing for a predictive image is appropriately performed in the transform order.

Furthermore, for example, the processing unit may be configured to output the predictive image in the transform order as the image processing.

Accordingly, the predictive image is output in the transform order. Thus, the pipeline processing is smoothly performed, and the delay in the entire processing is reduced.

Furthermore, for example, the processing unit may be configured to perform the image processing in the transform order when a prediction order predetermined for the at least one PU does not follow the transform order.

Accordingly, when the predetermined prediction order does not follow the transform order, the image processing for the predictive image is performed not in the predetermined prediction order but in the transform order. Thus, the pipeline processing is smoothly performed, and the delay in the entire processing is reduced.

Furthermore, for example, the image processing apparatus may further include a partitioning unit configured to partition the at least one PU into blocks along an edge of the TUs, wherein the processing unit may be configured to perform the image processing on the blocks in the transform order.

Accordingly, a larger PU is partitioned along an edge of TUs. Thus, the image processing for a predictive image that is the larger PU is appropriately performed in the transform order.

Furthermore, for example, the partitioning unit may be configured to partition one PU corresponding to the at least one PU into the blocks along the edge of the TUs, and the processing unit may be configured to perform the image processing on the blocks in the transform order.

Accordingly, a PU including a region of TUs is partitioned along an edge of the TUs. Thus, the image processing for a predictive image of such a PU is appropriately performed in the transform order.

Furthermore, for example, the partitioning unit may be configured to partition PUs into the blocks along the edge of the TUs, the PUs being included in a coding unit (CU) including the TUs and being the at least one PU, and the processing unit may be configured to perform the image processing on the blocks in the transform order.

Accordingly, the PUs included in the CU is partitioned according to TUs. Thus, the image processing for a predictive image corresponding to the CU is appropriately performed.

Furthermore, for example, the processing unit may be configured to generate and output the predictive image in the transform order as the image processing.

Accordingly, the processes of generating and outputting the predictive image are performed in the transform order. Thus, the pipeline processing is smoothly performed, and the delay in the entire processing is reduced.

Furthermore, for example, the processing unit may be configured to obtain information for generating the predictive image, generate the predictive image using the obtained information, and output the generated predictive image, in the transform order as the image processing.

Accordingly, the processes of obtaining information for generating the predictive image, and generating and outputting the predictive image are performed in the transform order. Thus, the pipeline processing is smoothly performed, and the delay in the entire processing is reduced.

Furthermore, for example, the processing unit may be configured to output the predictive image generated by motion compensation, in the transform order as the image processing.

Accordingly, the predictive image generated by the motion compensation is output in the transform order. Thus, the pipeline processing is smoothly performed, and the delay in the entire processing is reduced.

Furthermore, for example, the processing unit may be configured to perform motion compensation to generate the predictive image, and output the predictive image, in the transform order as the image processing.

Accordingly, the processes of generating the predictive image by the motion compensation and outputting the generated predictive image are performed in the transform order. Thus, the pipeline processing is smoothly performed, and the delay in the entire processing is reduced.

Furthermore, for example, the processing unit may be configured to obtain information for performing motion compensation, perform the motion compensation using the obtained information to generate the predictive image, and output the generated predictive image, in the transform order as the image processing.

Accordingly, the processes of obtaining information for motion compensation, perform the motion compensation to generate the predictive image, and outputting the generated predictive image are performed in the transform order. Thus, the pipeline processing is smoothly performed, and the delay in the entire processing is reduced.

Furthermore, for example, the processing unit may be configured to output the predictive image generated by intra prediction, in the transform order as the image processing.

Accordingly, the predictive image generated by the motion compensation is output in the transform order. Thus, the pipeline processing is smoothly performed, and the delay in the entire processing is reduced.

Furthermore, for example, the processing unit may be configured to perform intra prediction to generate the predictive image, and output the generated predictive image, in the transform order as the image processing.

Accordingly, the processes of generating the predictive image by the intra prediction and outputting the predictive image generated by the intra prediction are performed in the transform order. Thus, the pipeline processing is smoothly performed, and the delay in the entire processing is reduced.

Furthermore, for example, the processing unit may be configured to obtain information for performing intra prediction, perform the intra prediction using the obtained information to generate the predictive image, and output the generated predictive image, in the transform order as the image processing.

Accordingly, the processes of obtaining information for intra prediction, performing the intra prediction to generate the predictive image, and outputting the predictive image generated by the intra prediction are performed in the transform order. Thus, the pipeline processing is smoothly performed, and the delay in the entire processing is reduced.

Furthermore, for example, the processing unit may be configured to reconstruct the image using the predictive image in the transform order as the image processing.

Accordingly, the image is reconstructed using the predictive image in the transform order. Thus, the pipeline processing is smoothly performed, and the delay in the entire processing is reduced.

Furthermore, for example, the processing unit may be further configured to perform in-loop filtering on the reconstructed image in the transform order.

Accordingly, the in-loop filtering is performed in the transform order. Thus, the pipeline processing is smoothly performed, and the delay in the entire processing is reduced.

Furthermore, for example, the processing unit may be further configured to store, in a frame memory in the transform order, the image on which the in-loop filtering has been performed.

Accordingly, the image is stored in the frame memory in the transform order. Thus, the pipeline processing is smoothly performed, and the delay in the entire processing is reduced.

Furthermore, for example, the image processing apparatus according to another aspect of the present invention may be an image processing apparatus for decoding an image coded in coding processes including intra prediction for generating a predictive image of a prediction unit (PU) according to a prediction mode of the PU, and may include: a partitioning unit configured to partition the PU into blocks; and a processing unit configured to perform the intra prediction on each of the blocks according to the prediction mode of the PU.

Accordingly, the image processing apparatus can perform the intra prediction on a smaller data unit basis. Thus, the image processing apparatus can smoothly perform pipeline processing on the smaller data unit basis. Thus, the image processing apparatus can reduce delay in the entire processing.

These general or specific aspects of the present invention may be implemented by a system, a method, an integrated circuit, a non-transitory computer-readable recording medium, such as a CD-ROM, or an arbitrary combination of the system, the method, the integrated circuit, the computer program, and the recording medium.

Hereinafter, Embodiments will be described in detail with reference to the drawings. Embodiments to be described below are all general or specific examples. The values, shapes, materials, constituent elements, positions and connections of the constituent elements, steps, and orders of the steps indicated in Embodiments are examples, and do not limit the present invention. The constituent elements in Embodiments that are not described in independent Claims that describe the most generic concept of the present invention are described as arbitrary constituent elements.

Furthermore, for example, "64×64 pixels" and "32×32 pixels" represent the sizes of 64×64 pixels and 32×32 pixels, respectively.

Furthermore, each of a block, a data unit, and a coding unit (CU) represents an organized region. Each of them may represent an image region. Alternatively, each of them may represent a data region in a coded stream.

Furthermore, an image may be one of a plurality of pictures, one picture, a part of the picture, and others, where the pictures are included in a still image or a moving image.

(Embodiment 1)

(1-1. Outline)

First, the outline of an image processing apparatus according to Embodiment 1 will be described. The image processing apparatus decodes a coded stream generated by coding processes including motion compensation. In the coding, the size of motion compensation, that is, the size of a PU is variable, e.g. 64×64 pixels at a maximum.

When the rectangle of the PU on which the motion compensation is performed includes an edge of a TU, the image processing apparatus partitions the PU into a plurality of blocks (partitioned blocks) with the edge of the TU. Then, the image processing apparatus transfers a reference image, performs motion compensation, and outputs a predictive image in the processing order (transform order) of the TU, for each of the partitioned blocks. Furthermore, the image processing apparatus performs the following reconstruction processing and in-loop filtering in the processing order of the TU.

For example, even when the size of the PU is larger, the image processing apparatus partitions the PU, and performs motion compensation in the processing order of the TU. Accordingly, the necessary memory capacity is reduced.

Furthermore, the image processing apparatus transfers a reference image and performs motion compensation in a pipeline manner. Accordingly, the processing delay is reduced. Furthermore, the image processing apparatus can start the reconstruction processing and in-loop filtering earlier. Thus, the image processing apparatus can accelerate the entire decoding processes.

(1-2. Outline)

Next, a configuration of the image processing apparatus according to Embodiment 1 will be described.

Figure 2:
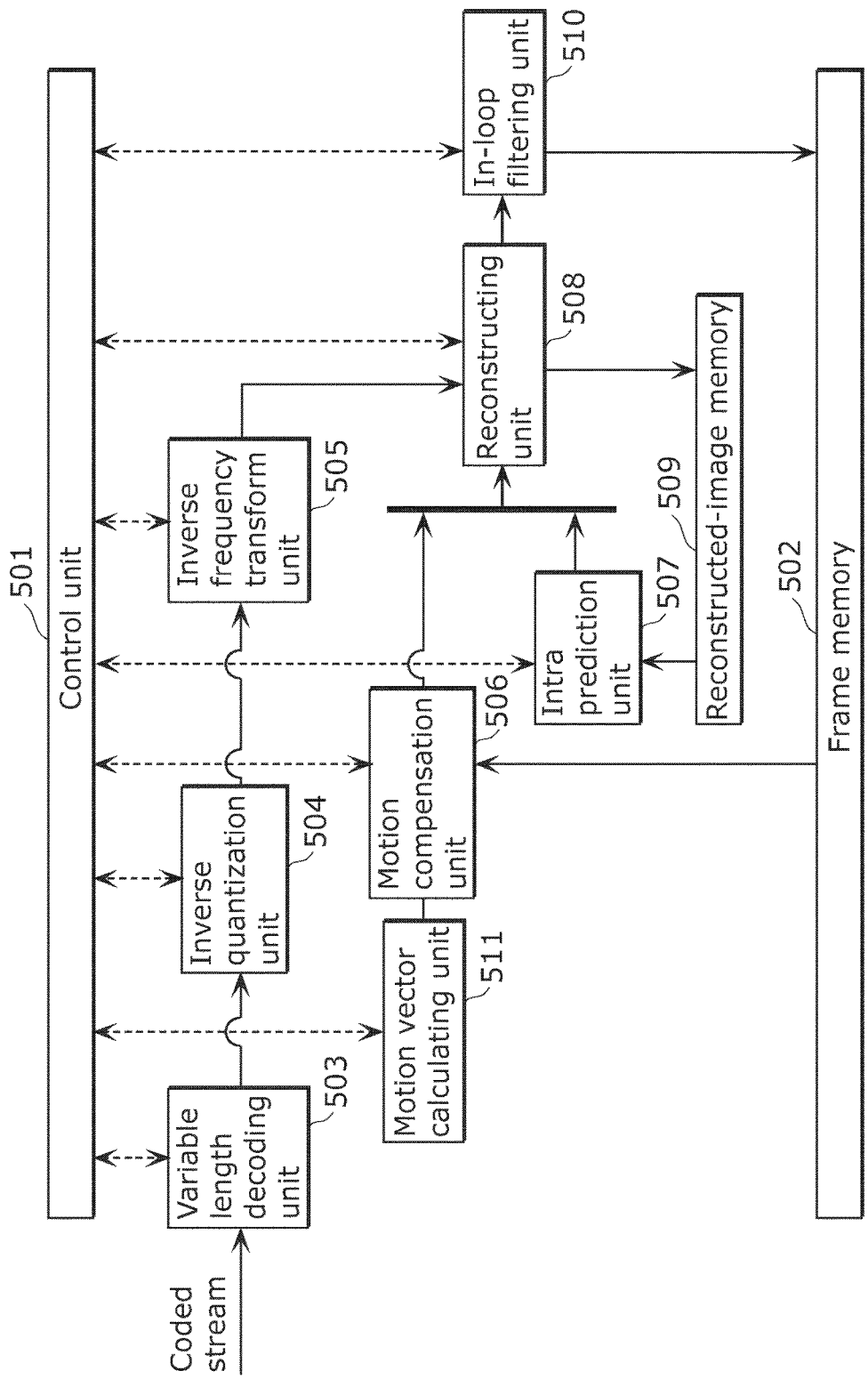
FIG. 2 illustrates a configuration of an image processing apparatus according to Embodiment 1.

FIG. 2 illustrates the configuration of the image processing apparatus. The image processing apparatus includes a control unit 501, a frame memory 502, a reconstructed-image memory 509, a variable length decoding unit 503, an inverse quantization unit 504, an inverse frequency transform unit 505, a motion compensation unit 506, an intra prediction unit 507, a reconstructing unit 508, an in-loop filtering unit 510, and a motion vector calculating unit 511.

The control unit 501 controls the entire image processing apparatus. The frame memory 502 is a memory for storing decoded image data. The reconstructed-image memory 509 is a memory for storing part of a generated reconstructed image. The variable length decoding unit 503 reads a coded stream and decodes a variable length code. The inverse quantization unit 504 performs inverse quantization. The inverse frequency transform unit 505 performs inverse frequency transform.

The motion vector calculating unit 511 calculates a motion vector based on a motion vector predictor, a motion vector difference, and others, and outputs the motion vector to the motion compensation unit 506. The motion compensation unit 506 reads a reference image from the frame memory 502 and performs motion compensation to generate a predictive image. The intra prediction unit 507 reads a reference image from the reconstructed-image memory 509 and performs intra prediction to generate a predictive image.

The reconstructing unit 508 adds a difference image to the predictive image to generate a reconstructed image, and stores part of the reconstructed image in the reconstructed-image memory 509. The in-loop filtering unit 510 removes noise from the reconstructed image to increase the resolution of the reconstructed image.

Figure 3:
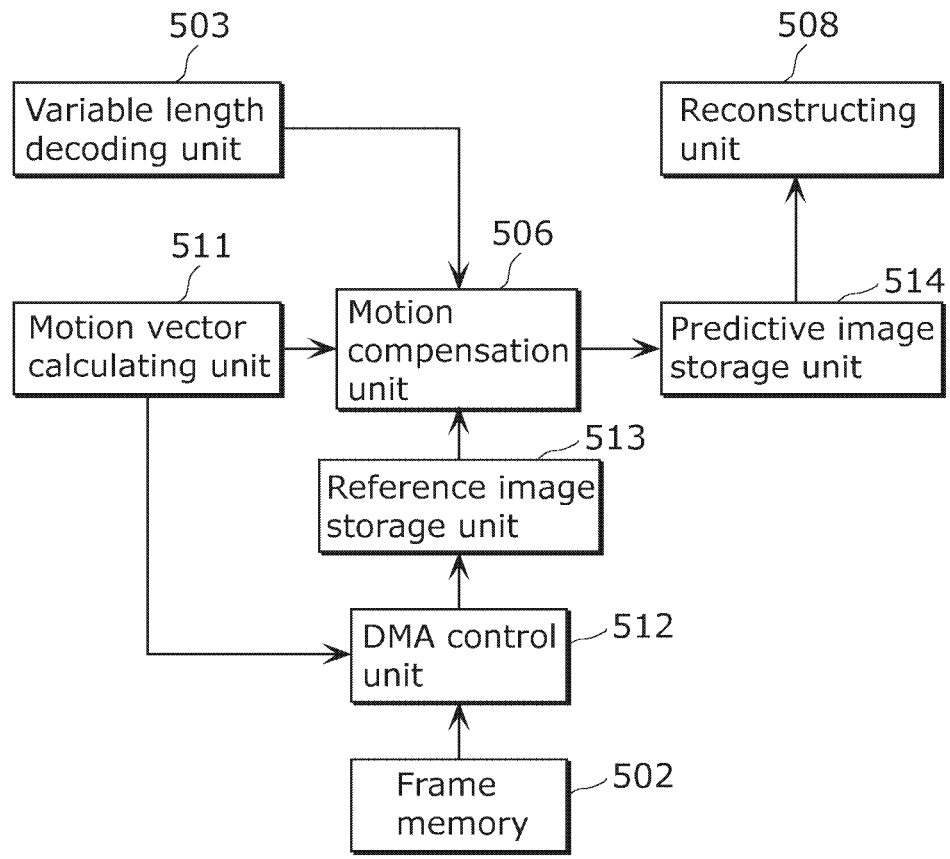
FIG. 3 illustrates a configuration for motion compensation according to Embodiment 1.

FIG. 3 illustrates a surrounding configuration of the motion compensation unit 506 according to Embodiment 1. The constituent elements identical to those in FIG. 2 are assigned the same reference numerals, and the description is omitted. FIG. 3 illustrates a Direct Memory Access (DMA) control unit 512, a reference image storage unit 513, and a predictive image storage unit 514 in addition to the constituent elements in FIG. 2. These units may be included in the motion compensation unit 506.

The DMA control unit 512 transfers a reference image from the frame memory 502 to the reference image storage unit 513, based on the motion vector calculated by the motion vector calculating unit 511. The reference image storage unit 513 stores the reference image transferred by the DMA control unit 512. Furthermore, the predictive image storage unit 514 stores the predictive image generated by the motion compensation unit 506.

The motion compensation unit 506 performs motion compensation based on a motion vector. Here, the motion compensation unit 506 obtains information on a processing order of the TUs from the variable length decoding unit 503. Then, the motion compensation unit 506 performs motion compensation according to the processing order of the TUs to generate a predictive image. Then, the motion compensation unit 506 stores the predictive image in the predictive image storage unit 514. The reconstructing unit 508 performs reconstruction processing using the predictive image stored in the predictive image storage unit 514.

The configuration of the image processing apparatus is hereinbefore described.

(1-3. Operations)

Next, operations of the image processing apparatus according to Embodiment 1 will be described. The coded stream decoded by the image processing apparatus includes a CU, a TU, and a PU.

The CU has a size between 64×64 pixels and 8×8 pixels, and is a data unit switchable between the intra prediction and the inter prediction. The TU has a size between 64×64 pixels and 4×4 pixels within a region of the CU. The PU has a size between 64×64 pixels and 4×4 pixels within a region of the CU, and has a prediction mode for the intra prediction or a motion vector for the inter prediction. The structure of a coded stream will be described with reference to FIGS. 4A to 6B.

Figure 4A:
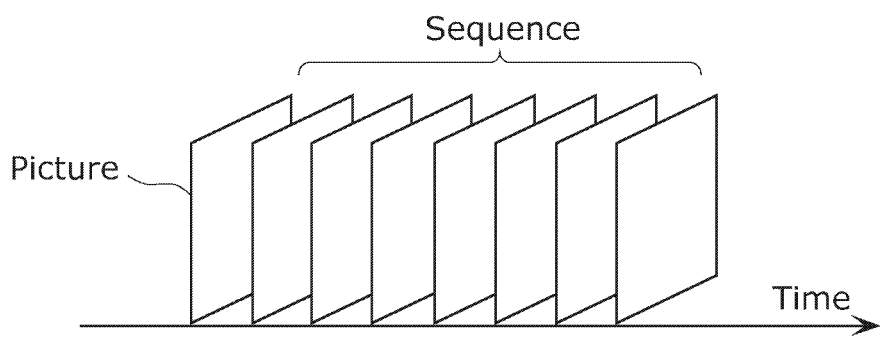
FIG. 4A illustrates an example of a sequence according to Embodiment 1.
Figure 4B:
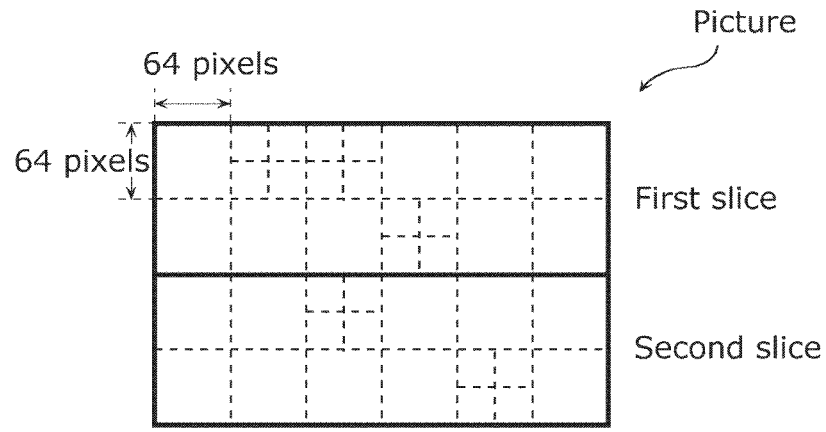
FIG. 4B illustrates an example of a picture according to Embodiment 1.

FIGS. 4A and 4B illustrate a hierarchical structure of an image to be decoded by the image processing apparatus according to Embodiment 1. As illustrated in FIG. 4A, a set of pictures is called a sequence. Furthermore, as illustrated in FIG. 4B, each of the pictures is divided into slices, and each of the slices is further partitioned into CUs. Here, there are cases where each of the pictures is not divided into slices.

The size of the LCU is 64×64 pixels according to Embodiment 1.

Figure 4C:
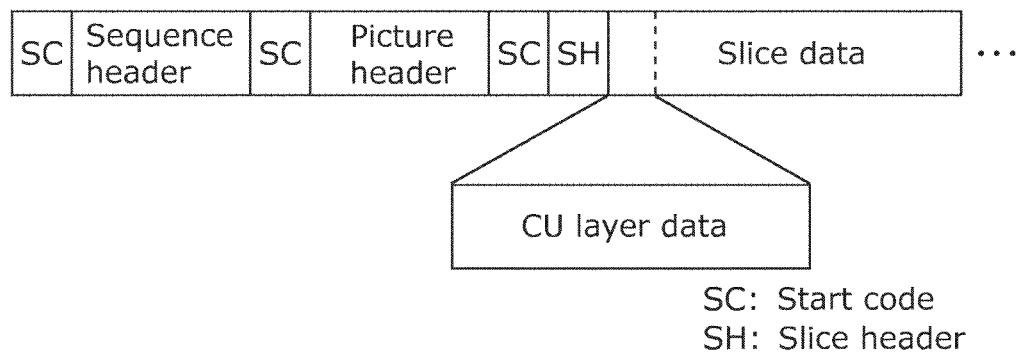
FIG. 4C illustrates an example of a coded stream according to Embodiment 1.

FIG. 4C illustrates a coded stream according to Embodiment 1. The coded stream in FIG. 4C is obtained by hierarchically coding the data in FIGS. 4A and 4B.

The coded stream in FIG. 4C includes a sequence header for controlling a sequence, a picture header for controlling a picture, a slice header for controlling a slice, and coding unit (CU) layer data. In the H.264 standard, the sequence header is also called a sequence parameter set (SPS), and the picture header is also called a picture parameter set (PPS).

Figure 5A:
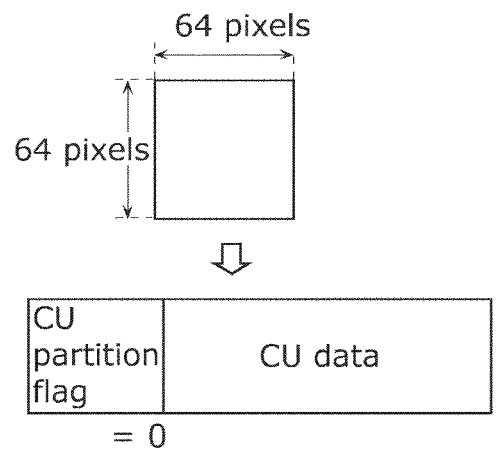
FIG. 5A illustrates a structure example of a coding unit (CU) and CU layer data according to Embodiment 1.

FIG. 5A illustrates a structure example of a CU and CU layer data according to Embodiment 1. The CU layer data corresponding to the CU includes a CU partition flag and CU data. The CU partition flag indicated by 1 means quad-partitioning of a CU, and the CU partition flag indicated by 0 means no quad-partitioning of a CU. In FIG. 5A, the CU of 64×64 pixels is not partitioned. In other words, the CU partition flag is 0.

Figure 5B:
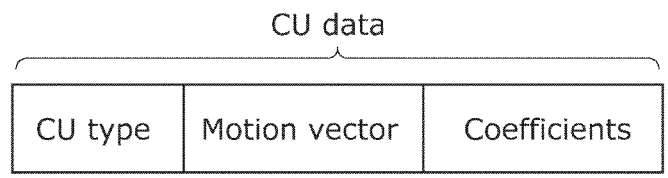
FIG. 5B illustrates a structure example of CU data according to Embodiment 1.

FIG. 5B Illustrates a structure example of the CU data according to Embodiment 1. The CU data includes a CU type, one of a motion vector and an intra prediction mode, and coefficients. Depending on the CU type, the size of a PU is determined.

Figure 6A:
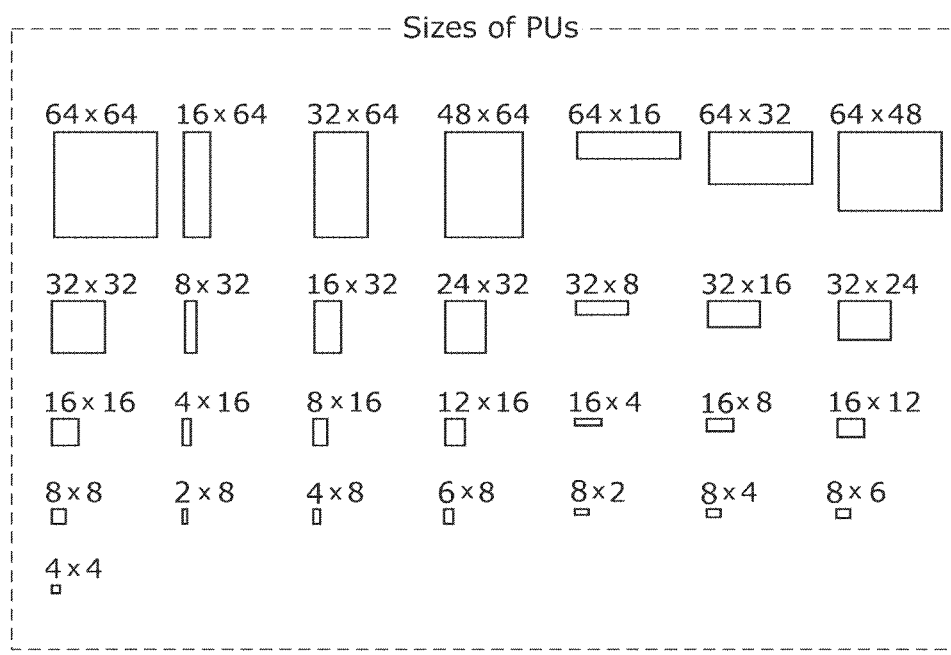
FIG. 6A illustrates an example of sizes of PUs according to Embodiment 1.

FIG. 6A illustrates an example of selectable sizes of PUs. Specifically, FIG. 6A illustrates the selectable sizes of PUs, such as 64×64 pixels, 32×64 pixels, 64×32 pixels, 32×32 pixels, 16×32 pixels, 32×16 pixels, 16×16 pixels, 16×8 pixels, 8×16 pixels, 8×8 pixels, 8×4 pixels, 4×8 pixels, and 4×4 pixels. A size of a PU can be selected from the sizes larger than or equal to 4×4 pixels. Furthermore, the shape of a PU may be rectangular.

For each of the PUs, one of a motion vector and an intra prediction mode is specified. Since only a motion vector is used according to Embodiment 1, FIG. 5B indicates only the motion vector. Furthermore, there are cases where PUs of 16×64 pixels and 48×64 pixels each of which is obtained by dividing a square in a ratio of 1:3 are selected.

Figure 6B:
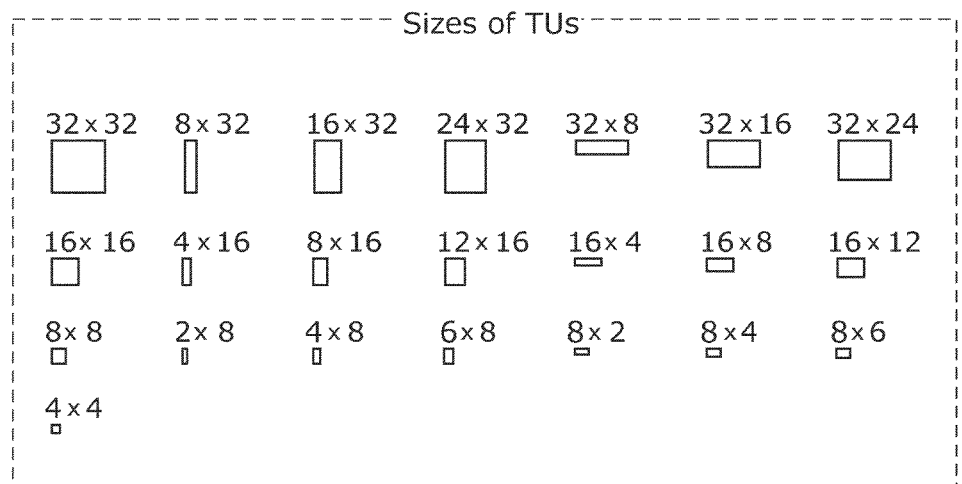
FIG. 6B illustrates an example of sizes of TUs according to Embodiment 1.

FIG. 6B illustrates an example of selectable sizes of TUs. Specifically, FIG. 6A illustrates the selectable sizes of TUs, such as 32×32 pixels, 16×32 pixels, 32×16 pixels, 16×16 pixels, 16×8 pixels, 8×16 pixels, 8×8 pixels, 8×4 pixels, 4×8 pixels, and 4×4 pixels. As illustrated in FIG. 6B, there are cases where the TUs of 8×32 pixels and 24×32 pixels each of which is obtained by dividing a square in a ratio of 1:3 are selected.

Figure 7:
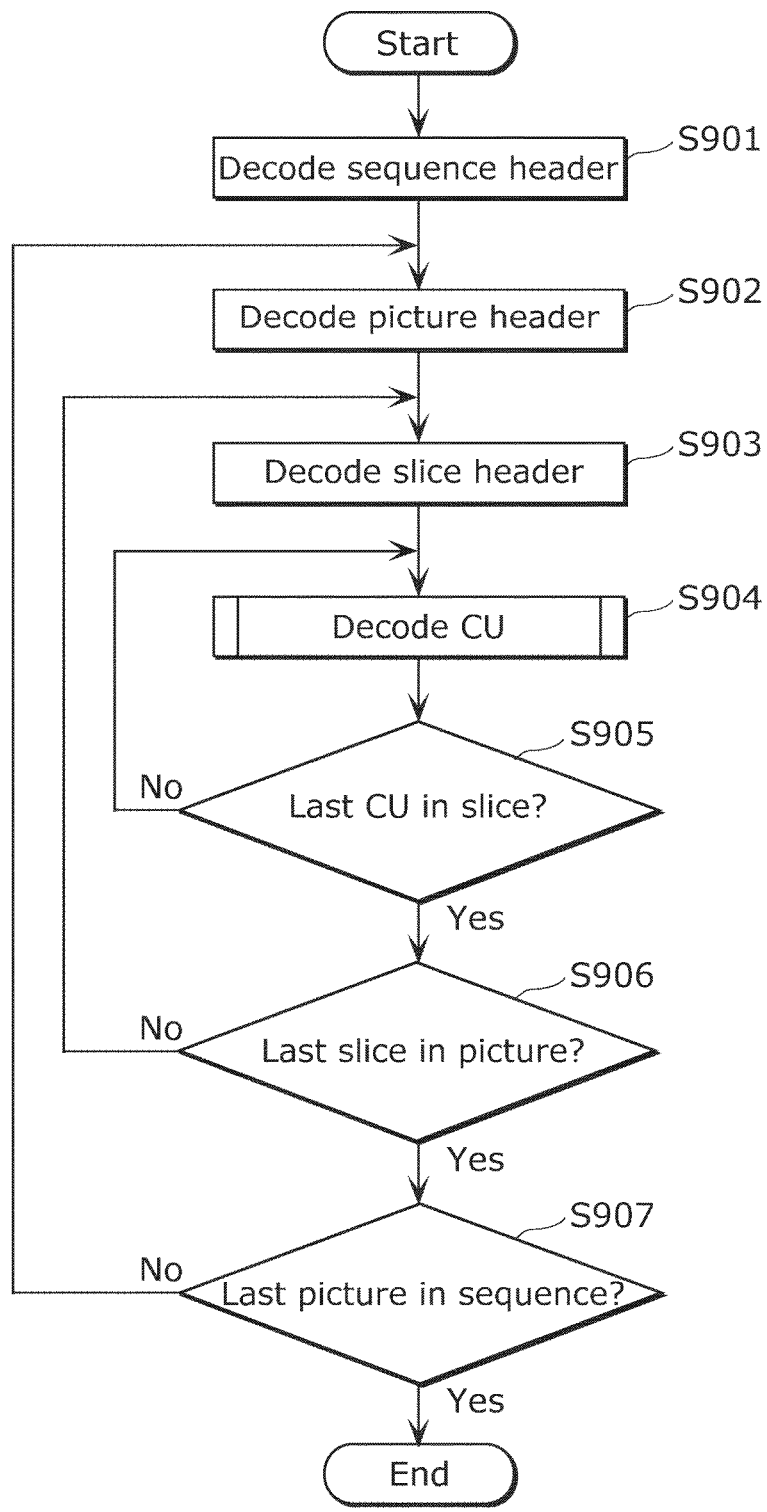
FIG. 7 is a flowchart indicating operations performed by an image processing apparatus according to Embodiment 1.

FIG. 7 is a flowchart indicating operations for decoding one sequence included in a coded stream. The operations of the image processing apparatus in FIG. 2 will be described with reference to the flowchart in FIG. 7. The image processing apparatus first decodes a sequence header as according to FIG. 7 (S901). Then, the variable length decoding unit 503 decodes a coded stream based on the control by the control unit 501. Next, the image processing apparatus similarly decodes a picture header (S902), and a slice header (S903).

Next, the image processing apparatus decodes a CU (S904). The decoding of a CU will be described in detail later. After decoding the CU, the image processing apparatus determines whether or not the decoded CU is the last CU in the slice (S905). When the decoded CU is not the last CU in the slice (No at S905), the image processing apparatus again decodes the next CU (S904).

Furthermore, the image processing apparatus determines whether or not the slice including the decoded CU is the last slice in the picture (S906). Furthermore, when the slice is not the last slice in the picture (No at S906), the image processing apparatus again decodes the slice header (S903).

Furthermore, the image processing apparatus determines whether or not the picture including the decoded CU is the last picture in the sequence (S907). Furthermore, when the picture is not the last picture in the sequence (No at S907), the image processing apparatus again decodes the picture header (S902). The image processing apparatus ends a series of the decoding operations after decoding all the pictures in the sequence.

Figure 8:
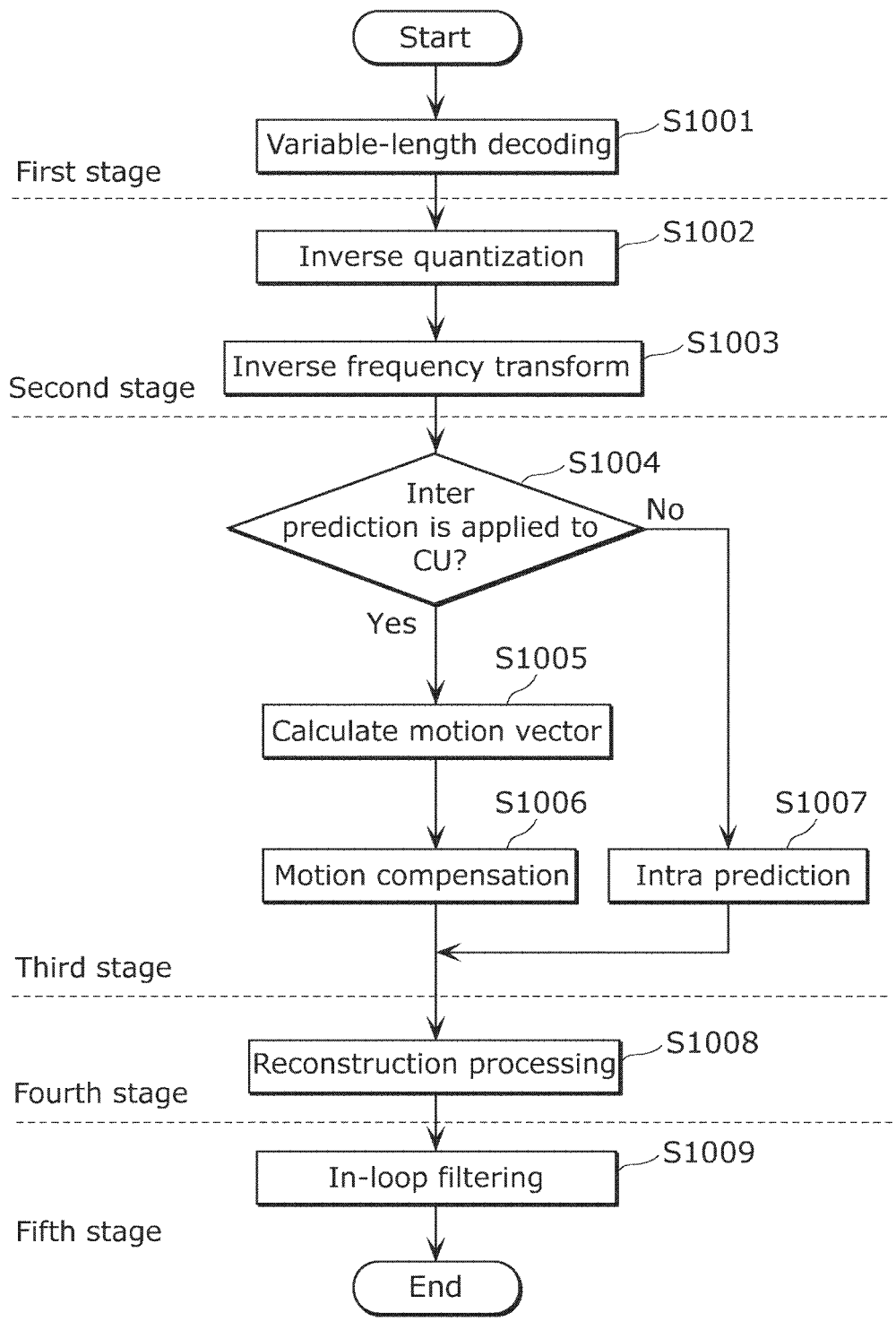
FIG. 8 is a flowchart indicating processes of decoding a CU according to Embodiment 1.

FIG. 8 is a flowchart indicating operations for decoding a CU. The operations for decoding a CU (S904) in FIG. 7 will be described with reference to the flowchart of FIG. 8.

First, the variable length decoding unit 503 variable-length decodes a CU to be processed that is included in an input coded stream (S1001).

In the variable-length decoding (S1001), the variable length decoding unit 503 outputs coding information, such as a CU type, an intra prediction mode, motion vector information, and a quantization parameter. According to Embodiment 1, the output coding information includes the size of a CU, a processing order of a CU, the size of a PU, the size of a TU, and a processing order of a TU. Furthermore, the variable length decoding unit 503 outputs coefficient information corresponding to each pixel data.

The variable length decoding unit 503 outputs the coding information to the control unit 501, and then to each of the processing units. The variable length decoding unit 503 outputs the coefficient information to the inverse quantization unit 504 subsequent to the variable length decoding unit 503 in the configuration. Then, the inverse quantization unit 504 performs inverse quantization (S1002). Then, the inverse frequency transform unit 505 performs inverse frequency transform to generate a differential image (S1003).

Next, the control unit 501 determines whether the inter prediction or the intra prediction is applied to the CU to be processed (S1004).

When the inter prediction is applied (Yes at S1004), the control unit 501 starts the motion vector calculating unit 511. The motion vector calculating unit 511 calculates a motion vector (S1005). Then, the motion vector calculating unit 511 transfers a reference image indicated by the motion vector from the frame memory 502. Next, the control unit 501 starts the motion compensation unit 506. Then, the motion compensation unit 506 generates a predictive image with half-pixel or quarter-pixel accuracy (S1006).

When the inter prediction is not applied (No at S1004), that is, when the intra prediction is applied, the control unit 501 starts the intra prediction unit 507. The intra prediction unit 507 performs intra prediction to generate a predictive image (S1007).

The reconstructing unit 508 adds the predictive image output by one of the motion compensation unit 506 and the intra prediction unit 507 to the differential image output by the inverse frequency transform unit 505 to generate a reconstructed image (S1008).

The in-loop filtering unit 510 receives the generated reconstructed image. Simultaneously, the reconstructed-image memory 509 stores a portion of the generated reconstructed image to be used in the intra prediction. Finally, the in-loop filtering unit 510 performs in-loop filtering on the reconstructed image for reducing noise. Then, the in-loop filtering unit 510 stores the result in the frame memory 502 (S1009). As described above, the image processing apparatus ends the operations of decoding the CU.

In the example of FIG. 8, the aforementioned processes are divided into stages. Then, the processes compose pipeline processing.

Next, operations of the motion vector calculating unit 511 and the motion compensation unit 506 will be described in detail.

Figure 9:
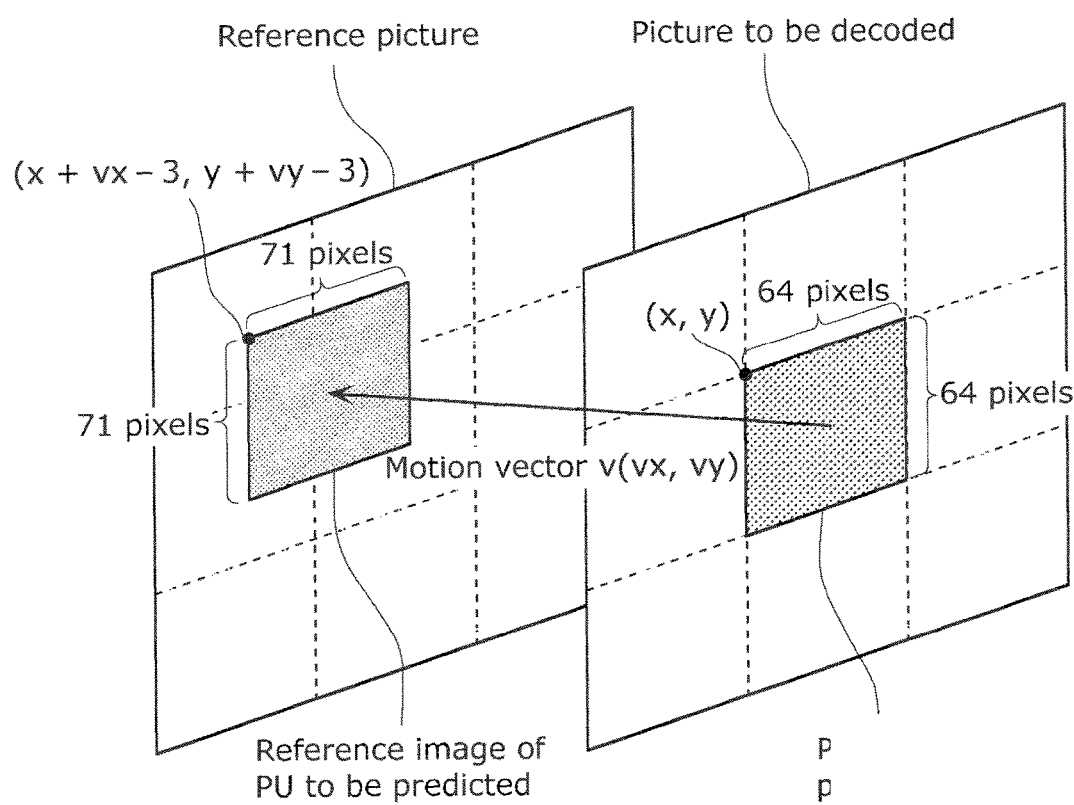
FIG. 9 illustrates an operation of motion compensation according to Embodiment 1.

FIG. 9 illustrates the outline of the motion compensation. As illustrated in FIG. 9, the motion compensation is processes of extracting a part of a picture that is indicated by a motion vector v (vx, vy) decoded from a coded stream and is previously decoded, and generating a predictive image through filtering.

For example, when a PU to be predicted has the size of 64×64 pixels and an 8-TAP filter is used, 7 pixels are added to the 64×64 pixels in both of a vertical direction and a horizontal direction. Specifically, 3 pixels to the left, 4 pixels to the right, 3 pixels above, and 4 pixels below are added to the 64×64 pixels. Thus, the reference image to be extracted from a reference picture is 71×71 pixels. When upper-left coordinates of the PU are (x, y), the reference image is a rectangle of 71×71 pixels with upper-left coordinates of (x+vx−3, y+vy−3).

Figure 10A:
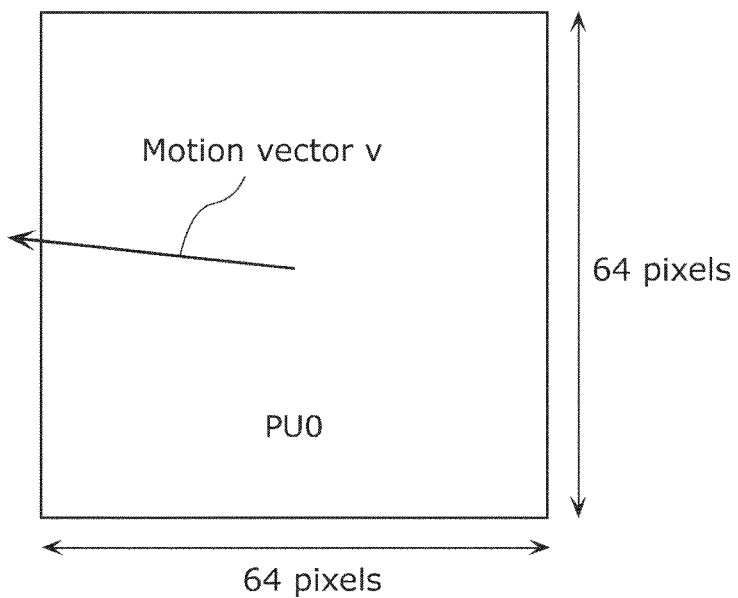
FIG. 10A illustrates a PU and the motion vector according to Embodiment 1.

FIG. 10A illustrates a PU and the motion vector according to Embodiment 1. Specifically, a prediction unit PU0 of 64×64 pixels in FIG. 10A has one motion vector v.

Figure 10B:
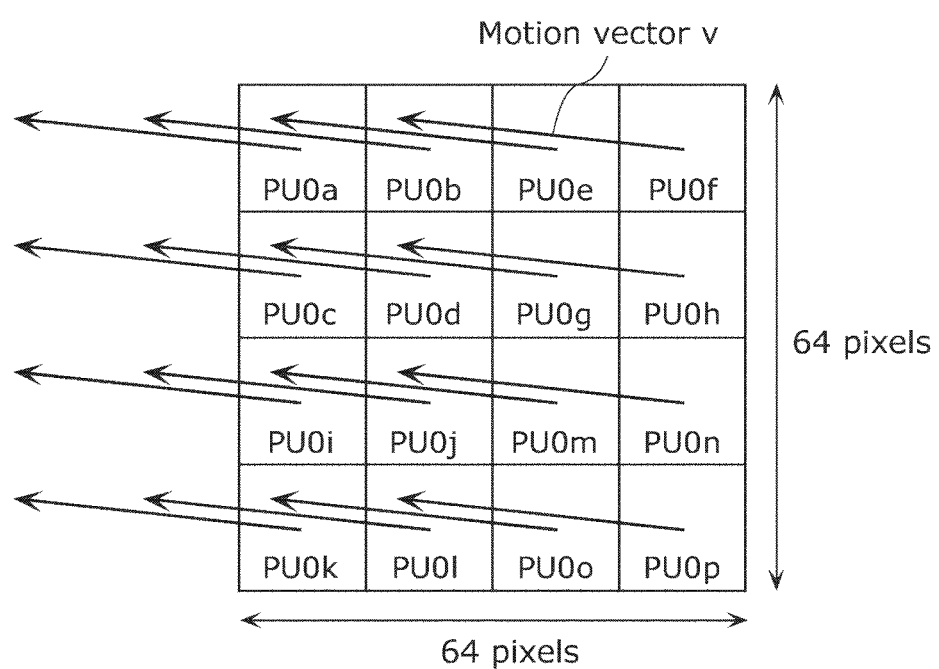
FIG. 10B illustrates partitioning of a PU according to Embodiment 1.

FIG. 10B illustrates partitioning of the prediction unit PU0 illustrated in FIG. 10A. In the example of FIG. 10B, the prediction unit PU0 of 64×64 pixels is partitioned into 16 blocks of PU0a to PU0p each with 16×16 pixels.

Each of the pixels of the prediction unit PU0 has the motion vector v identical to that of the prediction unit PU0 of 64×64 pixels in FIG. 10A. In other words, even when the prediction unit PU0 is partitioned into the 16 blocks as illustrated in FIG. 10B, each of the blocks has the same motion vector v. Thus, the prediction unit PU0 of 64×64 pixels is processed as the 16 blocks each having the same motion vector v.

Here, start of the reconstruction processing delays depending on a processing order of the 16 blocks, that is, an order (prediction order) of transferring a reference image for each of the blocks, and performing motion compensation, and outputting a predictive image.

The image processing apparatus according to Embodiment 1 partitions a PU, transfers a reference image for each of the blocks, performs motion compensation, and outputs a predictive image in the processing order of the TUs. The processing order of the TUs may be, for example, an order of storing a plurality of TUs in a coded stream.

Figure 11:
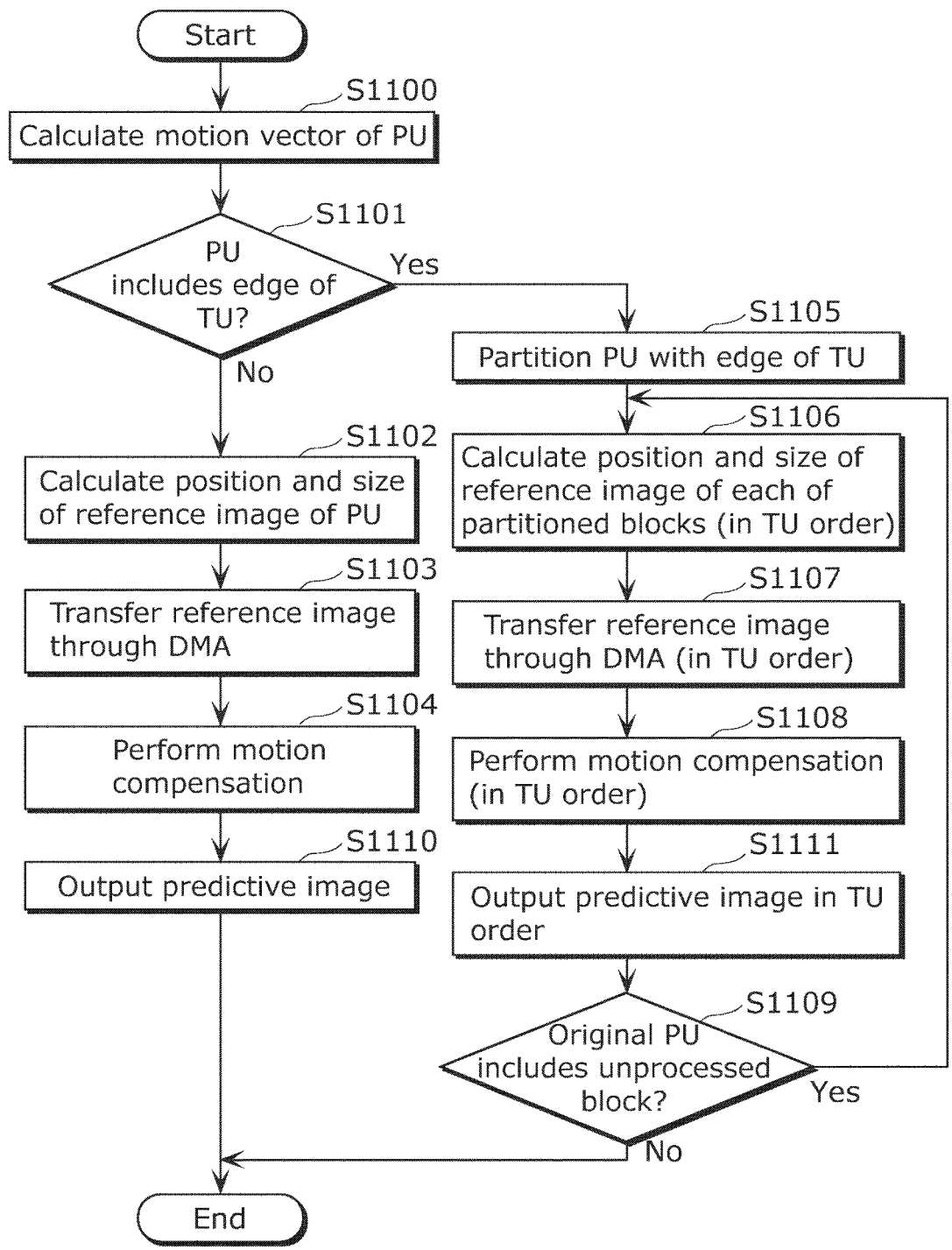
FIG. 11 is a flowchart indicating operations of motion compensation according to Embodiment 1.

FIG. 11 is a flowchart indicating operations of the motion compensation according to Embodiment 1. The operations of the motion vector calculating unit 511 and the motion compensation unit 506 in FIG. 3 will be described with reference to FIG. 11.

First, the motion vector calculating unit 511 calculates a motion vector of a PU using a method determined by a standard (S1100). Next, the motion vector calculating unit 511 determines whether or not a rectangle of a PU within a CU includes an edge of a TU (also referred to as "side" or "TU boundary"), based on coordinates and the size of each of the PU and the TU (S1101).

When the rectangle of the PU does not include an edge of a TU (No at S1101), the motion vector calculating unit 511 calculates a position and a size of a reference image, based on the motion vector, the coordinates of the PU, and the size of the PU (S1102). The motion vector calculating unit 511 sets the position and the size of the reference image to the DMA control unit 512. The DMA control unit 512 transfers the reference image from the frame memory 502 to the reference image storage unit 513 (S1103).

Next, the motion compensation unit 506 performs motion compensation using the reference image transferred to the reference image storage unit 513 (S1104). Then, the motion compensation unit 506 writes the predictive image obtained as a result of the motion compensation, in the predictive image storage unit 514 (S1110).

When the rectangle of the PU includes an edge of a TU (Yes at S1101), the motion vector calculating unit 511 partitions the PU with the edge of the TU (S1105). The motion vector calculating unit 511 calculates a position and a size of a reference image that are necessary for the motion compensation, for each of the partitioned blocks (S1106). Next, the motion vector calculating unit 511 sets the obtained position and size of the reference image to the DMA control unit 512. The DMA control unit 512 transfers the reference image from the frame memory 502 to the reference image storage unit 513 (S1107).

Next, the motion compensation unit 506 performs motion compensation using the reference image transferred to the reference image storage unit 513 (S1108). Then, the motion compensation unit 506 writes the predictive image obtained as a result of the motion compensation, in the predictive image storage unit 514 (S1111).

Furthermore, the motion vector calculating unit 511 determines whether or not the original PU includes an unprocessed block (S1109). When the original PU includes an unprocessed block (Yes at S1109), the motion vector calculating unit 511 calculates the position and the size of the reference image of the block (S1106). When the original PU does not include an unprocessed block (No at S1109), the motion compensation ends.

The image processing apparatus performs the processes (S1106, S1107, S1108, S1111, and S1109) in the processing order of the TUs.

Figure 12A:
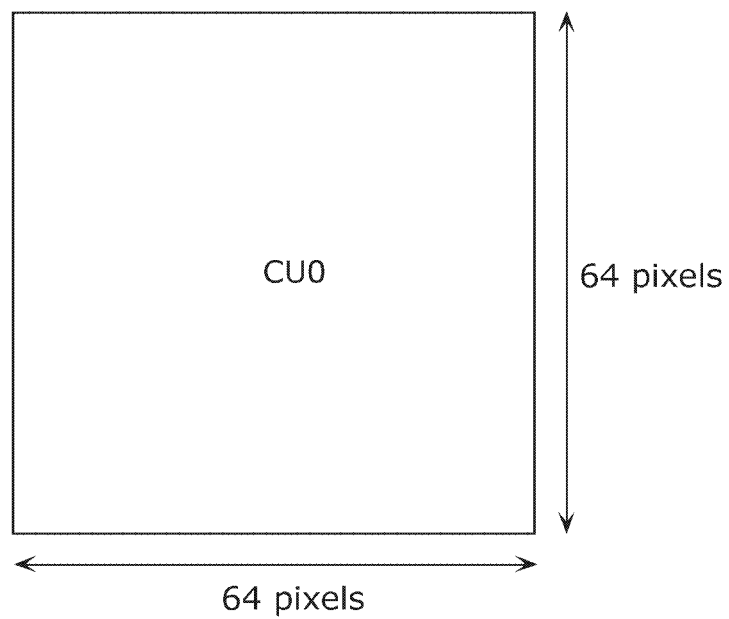
FIG. 12A illustrates a structure example of a CU according to Embodiment 1.

FIG. 12A illustrates a structure example of a CU according to Embodiment 1. The coding unit CU0 in FIG. 12A has the size of 64×64 pixels.

Figure 12B:
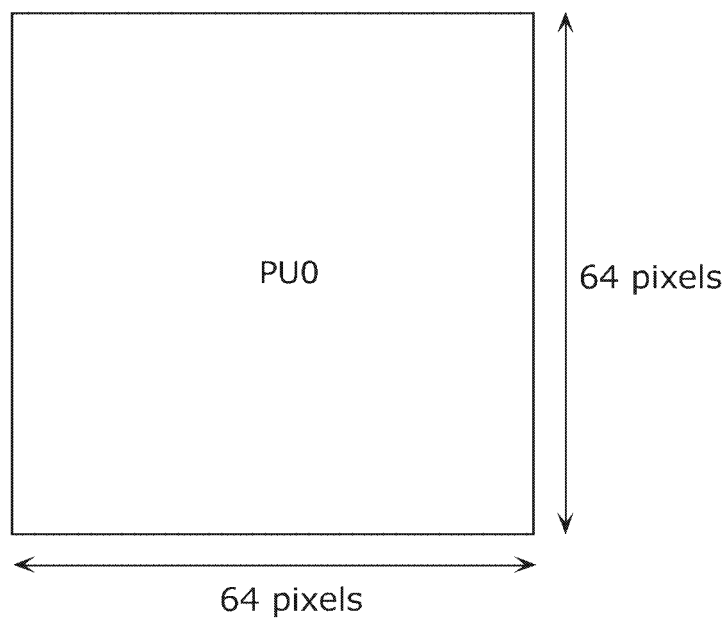
FIG. 12B illustrates a structure example of a PU according to Embodiment 1.

FIG. 12B illustrates a structure example of a PU corresponding to the coding unit CU0 in FIG. 12A. The prediction unit PU0 in FIG. 12B is composed on an entire region of the coding unit CU0.

Figure 12C:
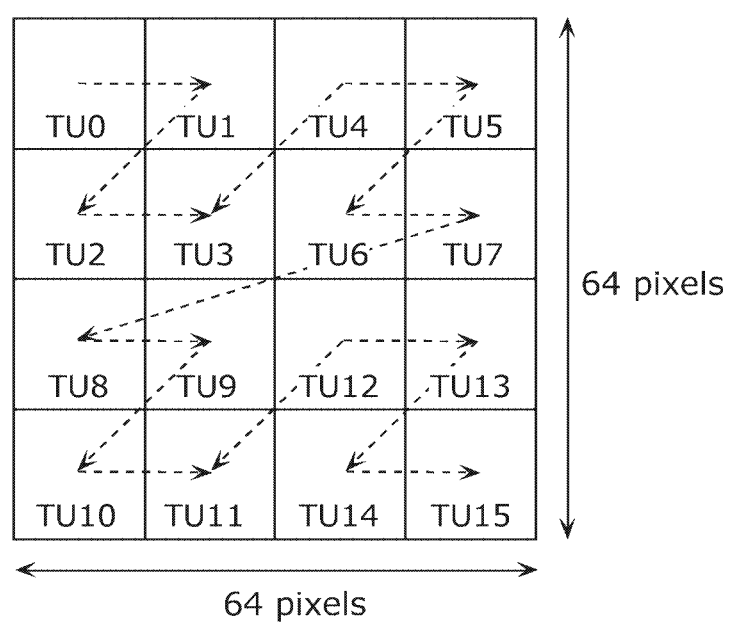
FIG. 12C illustrates a structure example of TUs according to Embodiment 1.

FIG. 12C illustrates a structure example of TUs in the coding unit CU0 in FIG. 12A. FIG. 12C illustrates 16 transform units TU0 to TU15. The 16 transform units TU0 to TU15 are processed in the order of TU0, TU1, TU2, ..., and TU15. Examples of the processes to be performed on the 16 transform units TU0 to TU15 include frequency transform, inverse frequency transform, quantization, and inverse quantization.

Figure 12D:
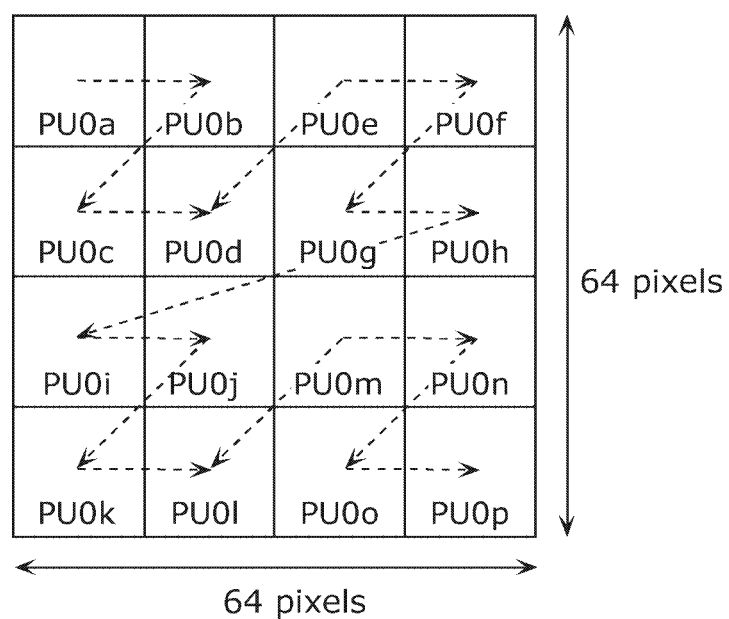
FIG. 12D illustrates a structure example of blocks obtained by partitioning a PU according to Embodiment 1.

FIG. 12D illustrates a structure example of blocks obtained by partitioning a PU corresponding to the coding unit CU0 in FIG. 12A. FIG. 12D Illustrates 16 blocks PU0a to PU0p. The 16 blocks PU0a to PU0p are processed in the order of PU0a, PU0b, PU0c, ..., and PU0p. Examples of the processes to be performed on the 16 blocks PU0a to PU0p include transferring a reference image, motion compensation, and outputting a predictive image.

The processing order of the 16 transform blocks PU0a to PU0p in FIG. 12D follows a transform order that is a processing order of the 16 transform units TU0 to TU15 in FIG. 12C. In other words, the prediction unit PU0 is processed in the transform order.

Figure 12E:
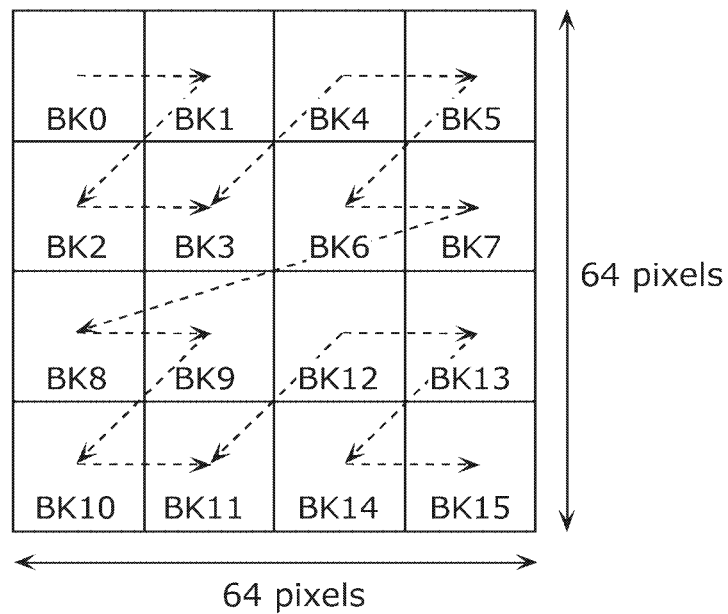
FIG. 12E illustrates a structure example of blocks obtained by partitioning the CU according to Embodiment 1.

FIG. 12E illustrates a structure example of blocks obtained by partitioning the coding unit CU0 in FIG. 12A. FIG. 12E illustrates 16 blocks BK0 to BK15. Then, the 16 blocks BK0 to BK15 are processed in the order of BK0, BK1, BK2, ..., and BK15. Examples of the processes to be performed on the 16 blocks BK0 to BK15 include reconstruction processing, in-loop filtering, and storing data in the frame memory 502.

Figure 13A:
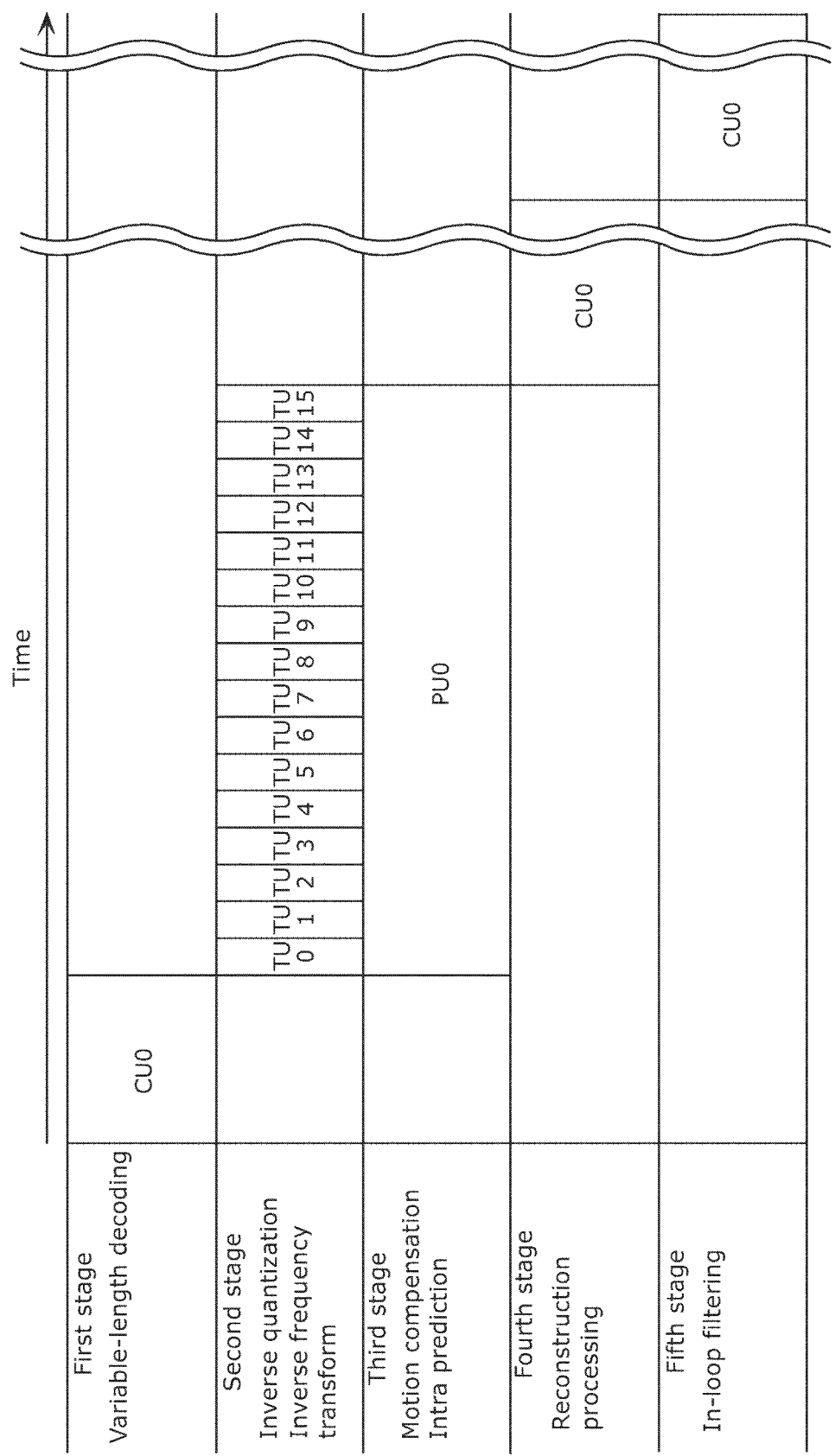
FIG. 13A illustrates a time chart of a first example of pipeline processing according to Embodiment 1.

FIG. 13A Illustrates a time chart of an example of pipeline processing when the procedure in FIG. 11 is not applied.

In the example of FIG. 13A, variable-length decoding is first performed on the coding unit CU0. Then, inverse quantization and inverse frequency transform are performed on the transform units TU0 to TU15 in the order of TU0, TU1, TU2, ..., and TU15. Simultaneously, motion compensation is performed on the prediction unit PU0. Then, reconstruction processing is performed on the coding unit CU0. Then, in-loop filtering is performed on the coding unit CU0.

In the example of FIG. 13A, the reconstruction processing cannot start until the motion compensation on the prediction unit PU0 and the inverse quantization and inverse frequency transform on the transform units TU0 to TU15 are completed.

FIG. 13B illustrates a time chart of an example of pipeline processing when the procedure in FIG. 11 is applied.

In the example of FIG. 13B, the variable-length decoding is first performed on the coding unit CU0. Then, the inverse quantization and inverse frequency transform are performed on the transform units TU0 to TU15 in the order of TU0, TU1, TU2, ..., and TU15. Simultaneously, the motion compensation is performed on the blocks PU0$a$ to PU0$p$ in the order of PU0$a$, PU0$b$, PU0$c$, ..., and PU0$p$.

Furthermore, the reconstruction processing is performed on the blocks BK0 to BK15 in the order of BK0, BK1, BK2, ..., and BK15. Here, after the inverse quantization and inverse frequency transform on the transform unit TU0 and the motion compensation on the block PUa end, the reconstruction processing on the block BK0 starts. Similarly, after the inverse quantization and inverse frequency transform on each of the transform units TU1 to TU15 and the motion compensation on a corresponding one of the blocks PU0$b$ to PU0$p$ end, the reconstruction processing on a corresponding one of the blocks BK1 to BK15 starts.

Furthermore, the in-loop filtering is performed on the blocks BK0 to BK15 in the order of BK0, BK1, BK2, ..., and BK15. Here, after the reconstruction processing on the block BK0 ends, the in-loop filtering on the block BK0 starts. Similarly, after the reconstruction processing on each of the blocks BK1 to BK15 ends, the in-loop filtering on a corresponding one of the blocks BK1 to BK15 starts.

In the example of FIG. 13B, the predictive images of the partitioned blocks are output in the same order as that of the TUs. Thus, a differential image and a predictive image having the same region as that of the differential image both of which are necessary for the reconstruction processing are provided earlier than the case of FIG. 13A. Thus, delay in start of the reconstruction processing and the in-loop filtering is reduced. Thus, the decoding processes are accelerated.

Furthermore, data of reference images is transferred on a smaller data unit basis, and the motion compensation is also performed on the smaller data unit basis. Thus, the capacity of the reference image storage unit 513 necessary for holding reference images is reduced. Furthermore, the image processing apparatus can transfer a reference image, perform motion compensation, and output a predictive image in parallel in a pipeline manner by partitioning the PU. Thus, the image processing apparatus can shorten the processing time necessary for the motion compensation.

Here, in the example of FIG. 13B, the process on the transform units TU0 to TU15 and the process on the blocks PU0$a$ to PU0$p$ simultaneously start. These processes do not have to simultaneously start. Each of the processes may start independently upon receipt of necessary information.

(1-4. Advantages)

As such, even when the size of PU is larger, the memory capacity of the image processing apparatus can be reduced by partitioning the PU into blocks and processing the blocks in the processing order of the TUs. Furthermore, the image processing apparatus can reduce the processing delay by transferring a reference image and performing motion compensation in a pipeline manner. Furthermore, the image processing apparatus can start the reconstruction processing and the in-loop filtering earlier. Thus, the entire decoding processes are accelerated.

(1-5. Supplemental Information)

The image processing apparatus according to Embodiment 1 calculates a position and a size of a reference image, transfers the reference image, performs motion compensation, and outputs a predictive image for each of the blocks obtained by partitioning the PU, in the processing order of the TUs. However, the image processing apparatus may perform the processing on the blocks two or three at a time, or on a per block of 256 pixels.

Furthermore, the image processing apparatus partitions the PU after calculating the motion vector. However, the image processing apparatus may partition the reference image necessary for the motion compensation into blocks with the edge of the TU, after calculating the position and the size of the reference image and transferring the reference image. Then, the image processing apparatus may perform motion compensation and output a predictive Image for each of the blocks obtained by partitioning the reference image, in the processing order of the TUs.

In this case, the necessary capacity of the reference image storage unit 513 remains the same as that when the reference image is not partitioned. However, the necessary capacity of the predictive image storage unit 514 is reduced. Furthermore, the image processing apparatus can start the reconstruction processing and the in-loop filtering earlier. Thus, the entire decoding processes are accelerated. Furthermore, the access frequency to the frame memory 502 is reduced.

Furthermore, the image processing apparatus may partition a predictive image necessary for the reconstruction processing into blocks with the edge of the TU, after calculating the position and the size of the reference image, transferring the reference image, and performing the motion compensation. Then, the image processing apparatus may perform the reconstruction processing and the in-loop filtering on the blocks obtained by partitioning the predictive image, in the processing order of the TUs.

In this case, the necessary capacity of the reference image storage unit 513 is not reduced. However, the necessary capacity of the predictive image storage unit 514 is reduced. Furthermore, the image processing apparatus can start the reconstruction processing and the in-loop filtering earlier. Thus, the entire decoding processes are accelerated. Furthermore, the access frequency to the frame memory 502 is reduced.

Furthermore, part or all of the constituent elements of each of the processing units may be implemented by a circuit using dedicated hardware or a program executed by a processor.

Furthermore, each of the frame memory 502, the reference image storage unit 513, and the predictive image storage unit 514 according to Embodiment 1 is described as a memory or a storage unit. However, as long as these units are storage elements capable of storing data, they may be any of flip-flops or registers. Furthermore, part of a memory region of a processor or part of a cache memory may be used as each of the frame memory 502, the reference image storage unit 513, and the predictive image storage unit 514.

Furthermore, Embodiment 1 describes the image processing apparatus that is an image decoding apparatus. However, the image processing apparatus is not limited to the image decoding apparatus. The image coding apparatus that performs the decoding processes in the opposite procedure can partition a PU and perform motion compensation. For example, there are cases where even the image coding apparatus performs motion compensation for generating a reference image. In such a case, the image coding apparatus may partition a PU and perform the motion compensation.

Furthermore, Embodiment 1 exemplifies the motion compensation. However, the image processing apparatus can produce the same advantages by performing the same processes also in the intra prediction.

Furthermore, the sizes and the shapes of the CUs, the PUs, and the TUs according to Embodiment 1 are examples, and they may be any sizes and shapes.

(Embodiment 2)

(2-1. Outline)

The outline of an image processing apparatus according to Embodiment 2 will be described. The image processing apparatus according to Embodiment 2 decodes a coded stream generated by coding processes including motion compensation. In the coding, the size of motion compensation, that is, the size of a PU is variable, e.g. 64×64 pixels at a maximum.

When the rectangle of each of PUs included in a CU includes an edge of a TU, the image processing apparatus partitions the PU into blocks with the edge of the TU. Then, the image processing apparatus transfers a reference image, performs motion compensation, and outputs a predictive image for each of the partitioned blocks, in the processing order of the TUs. Out of the intra prediction and the inter prediction, the inter prediction is used according to Embodiment 2.

Furthermore, the image processing apparatus performs the following reconstruction processing and in-loop filtering in the processing order of the TUs.

Accordingly, the image processing apparatus can perform processing on all of the PUs included in the CU in the same processing order as that of the TUs. Thus, the image processing apparatus may accelerate the decoding processes more than the case of Embodiment 1.

The outline of the image processing apparatus according to Embodiment 2 is hereinbefore described.

(2-2. Configuration)

FIG. 2 illustrates a configuration of the image processing apparatus according to Embodiment 2. FIG. 3 illustrates a surrounding configuration of the motion compensation unit 506 according to Embodiment 2. The configuration of the image processing apparatus according to Embodiment 2 is the same as that according to Embodiment 1, and thus the description thereof is omitted.

(2-3. Operations)

Embodiment 2 uses the structure of the coded stream illustrated in FIGS. 4A to 6B as according to Embodiment 1. The operation procedure of the image processing apparatus according to Embodiment 2 is the same as that in FIGS. 7 and 8 according to Embodiment 1, and thus the description thereof is omitted.

Figure 14A:
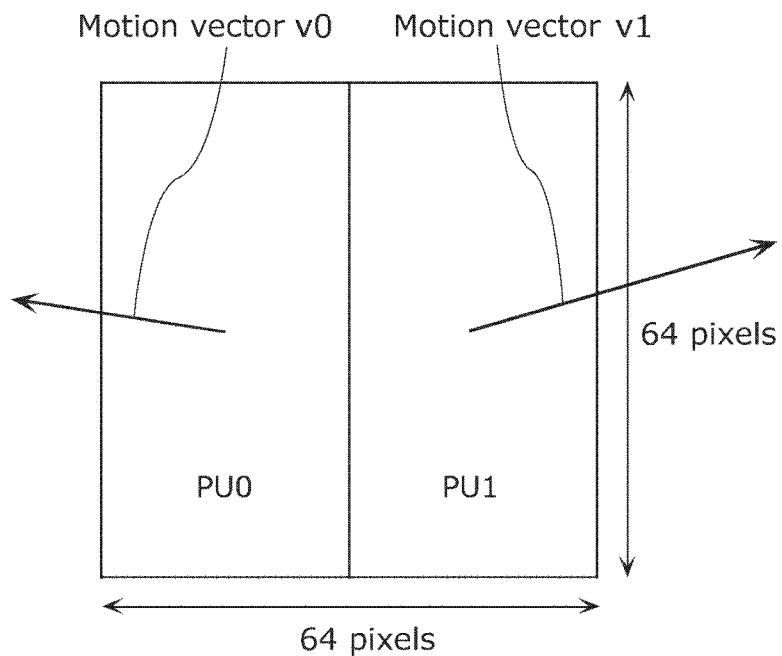
FIG. 14A illustrates PUs and the motion vectors according to Embodiment 2.

FIG. 14A Illustrates PUs and the motion vectors according to Embodiment 2. In the example of FIG. 14A, one CU includes two prediction units PU0 and PU1. The prediction unit PU0 has one motion vector v0, and the prediction unit PU1 has another motion vector v1.

Figure 14B:
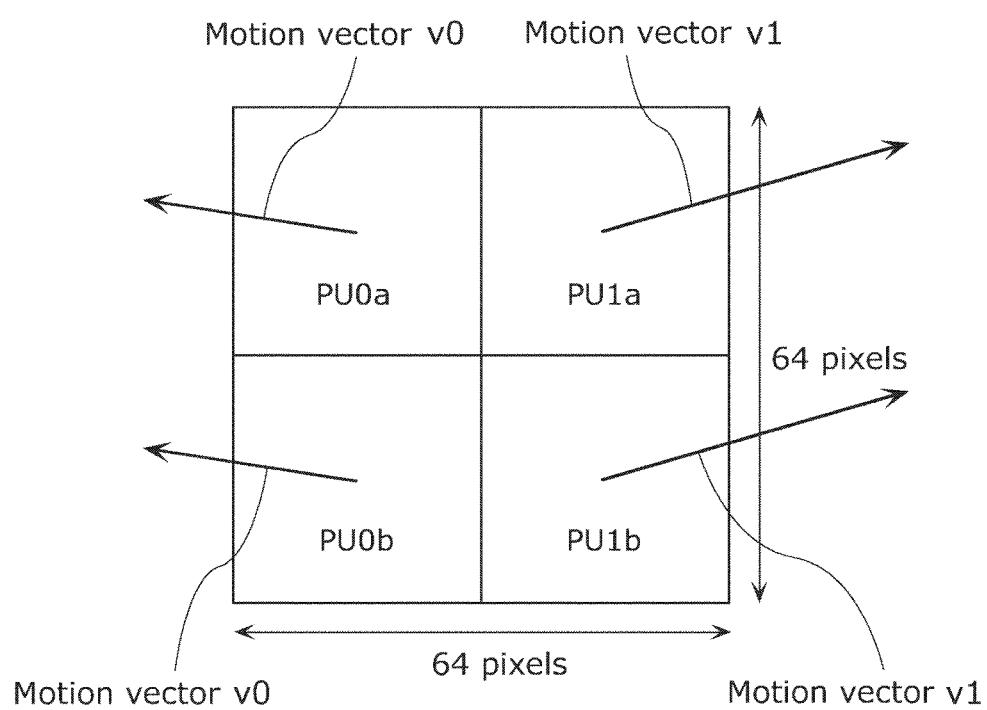
FIG. 14B illustrates partitioning of the PUs according to Embodiment 2.

FIG. 14B illustrates a result of partitioning of the two prediction units PU0 and PU1 in FIG. 14A. In the example of FIG. 14B, the prediction unit PU0 is partitioned into two blocks of PU0a and PU0b, and the prediction unit PU1 is partitioned into two blocks of PU1a and PU1b.

Each of the pixels in the prediction unit PU0 has the motion vector v identical to that of the prediction unit PU0 in FIG. 514A. In other words, even when the prediction unit PU0 is partitioned into the two blocks of PU0a and PU0b, the two blocks of PU0a and PU0b have the same motion vector v0. Similarly, the two blocks of PU1a and PU1b have the same motion vector v1 as that of the prediction unit PU1.

As illustrated in FIGS. 14A and 14B, the image processing apparatus according to Embodiment 2 partitions each of PUs included in a CU into blocks. Then, the image processing apparatus transfers a reference image, performs motion compensation, and outputs a predictive image for each of the blocks, in the processing order of the TUs.

Figure 15:
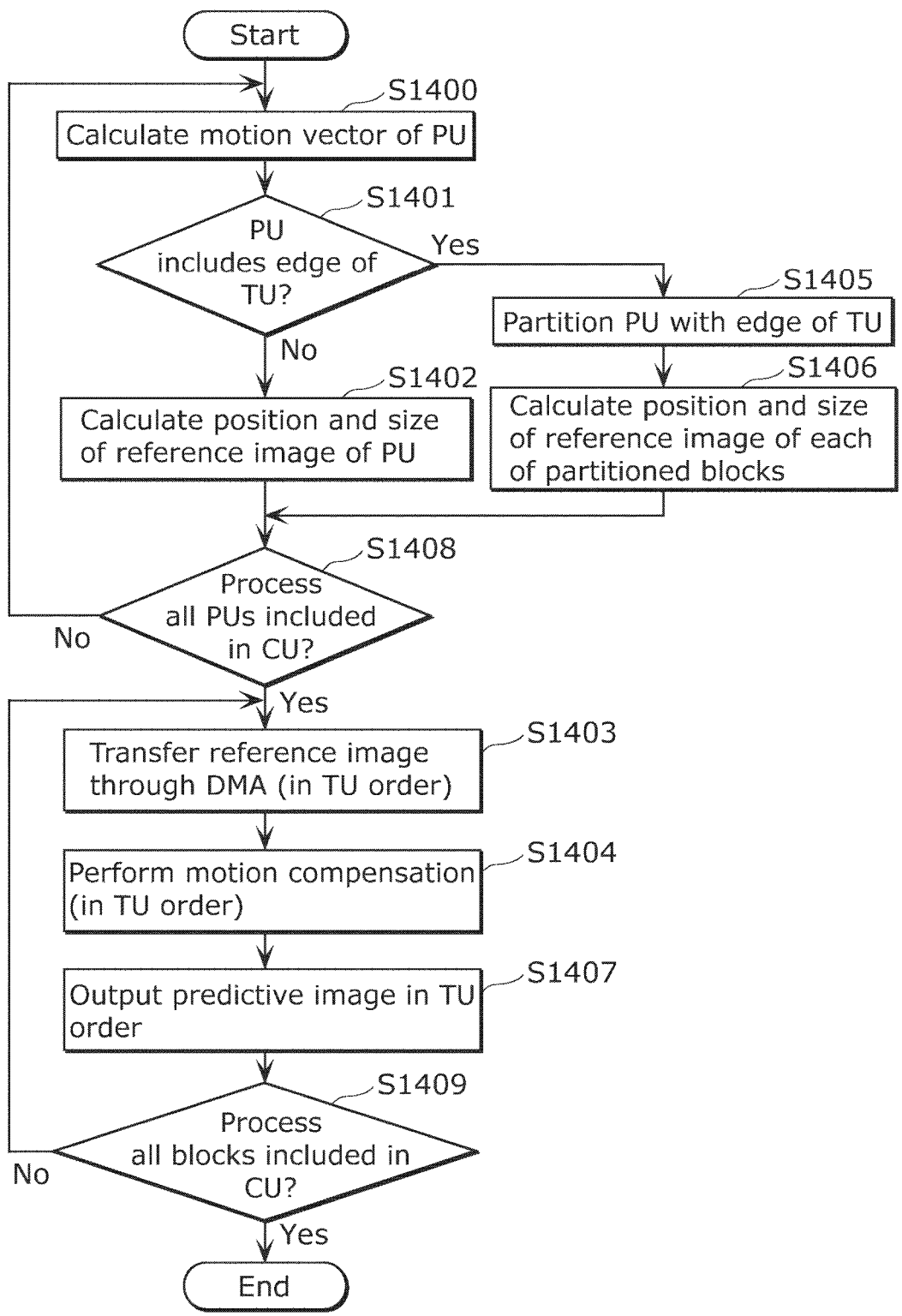
FIG. 15 is a flowchart indicating operations of motion compensation according to Embodiment 2.

FIG. 15 is a flowchart indicating operations of the motion compensation according to Embodiment 2. The operations of the motion vector calculating unit 511 and the motion compensation unit 506 will be described with reference to FIG. 15. FIG. 15 shows the operations of the motion compensation on one CU.

First, the motion vector calculating unit 511 calculates a motion vector of a PU included in the CU using a method determined by a standard (S1400). Next, the motion vector calculating unit 511 determines whether or not a rectangle of the PU includes an edge of a TU, based on coordinates and the size of the TU included in the same CU (S1401).

When the rectangle of the PU does not include an edge of a TU (No at S1401), the motion vector calculating unit 511 calculates a position and a size of a reference image based on the motion vector, the coordinates of the PU, and the size of the PU (S1402).

When the rectangle of the PU includes an edge of a TU (Yes at S1401), the motion vector calculating unit 511 partitions the PU with the edge of the TU (S1405). The motion vector calculating unit 511 calculates a position and a size of a reference image that are necessary for the motion compensation, for each of the partitioned blocks (S1406).

Next, the motion vector calculating unit 511 determines whether or not a series of operations (S1400, S1401, S1402, S1405, S1406) for calculating the position and the size of the reference image is performed on all of the PUs included in the CU (S1408). When an unprocessed PU remains (No at S1408), the motion vector calculating unit 511 calculates a motion vector of the PU (S1400).

Next, the motion vector calculating unit 511 sets the obtained position and size of the reference image to the DMA control unit 512. The DMA control unit 512 transfers the reference image from the frame memory 502 to the reference image storage unit 513 (S1403). Next, the motion compensation unit 506 performs motion compensation using the reference image transferred to the reference image storage unit 513, and writes the result in the predictive image storage unit 514 (S1407).

Next, the motion vector calculating unit 511 determines whether or not a series of operations (S1403, S1404, S1407)

for calculating the position and the size of the reference image is performed on all of the PUs included in the CU (S1409). When an unprocessed block remains (No at S1409), the motion vector calculating unit 511 transfers the reference image of the block (S1403). When there is no unprocessed block (Yes at S1409), the processes end.

The motion vector calculating unit 511, the DMA control unit 512, and the motion compensation unit 506 perform the processes (S1403, S1404, S1407) in the processing order of the TUs.

Figure 16A:
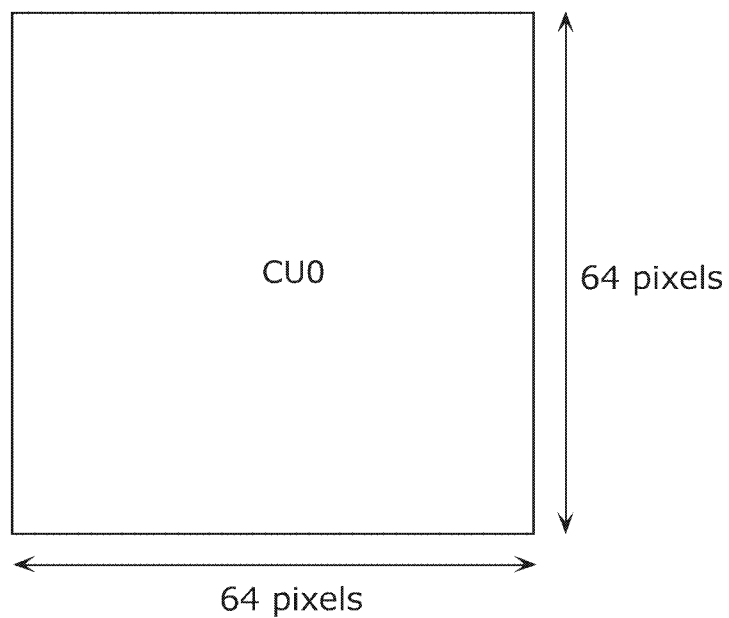
FIG. 16A illustrates a structure example of a CU according to Embodiment 2.

FIG. 16A illustrates a structure example of a CU according to Embodiment 2. The coding unit CU0 in FIG. 16A has the size of 64×64 pixels.

Figure 16B:
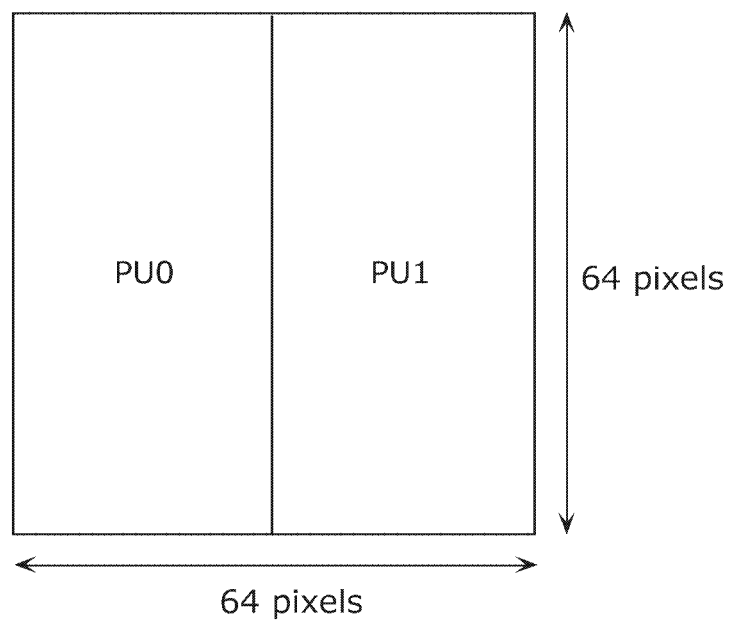
FIG. 16B illustrates a structure example of PUs according to Embodiment 2.

FIG. 16B illustrates a structure example of PUs corresponding to the coding unit CU0 in FIG. 16A. The coding unit CU0 includes two prediction units PU0 and PU1.

Figure 16C:
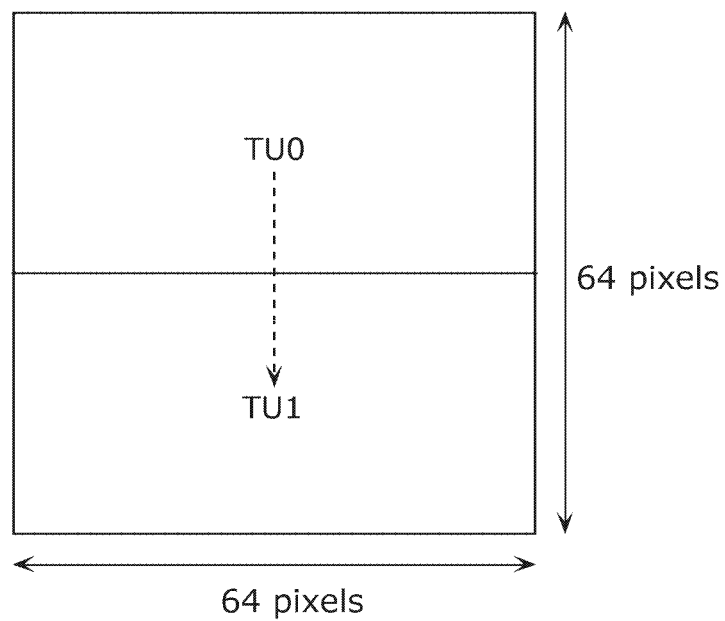
FIG. 16C illustrates a structure example of TUs according to Embodiment 2.

FIG. 16C illustrates a structure example of TUs corresponding to the coding unit CU0 in FIG. 16A. FIG. 16C illustrates two transform units TU0 and TU1. The two transform units TU0 and TU1 are processed in the order of TU0 and TU1.

Figure 16D:
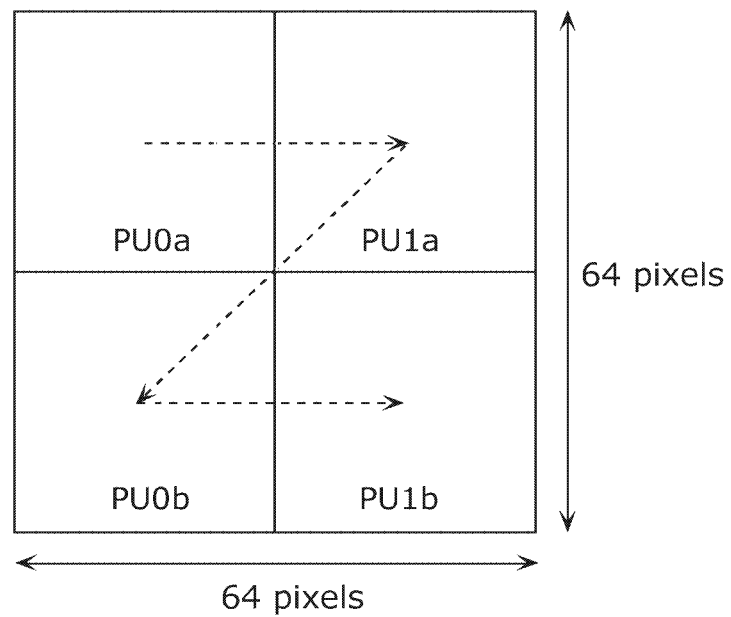
FIG. 16D illustrates a structure example of blocks obtained by partitioning the PUs according to Embodiment 2.

FIG. 16D illustrates a structure example of blocks obtained by partitioning the two prediction units PU0 and PU1 corresponding to the coding unit CU0 in FIG. 16A. FIG. 16D illustrates four blocks PU0a, PU0b, PU1a, and PU1b. The four blocks PU0a, PU0b, PU1a, and PU1b are processed in the order of PU0a, PU1a, PU0b, and PU1b.

The processing order of the four blocks PU0a, PU0b, PU1a, and PU1b in FIG. 16D follows a transform order that is a processing order of the two transform units TU0 and TU1 in FIG. 16C. In other words, the two prediction units PU0 and PU1 are processed in the transform order.

Figure 16E:
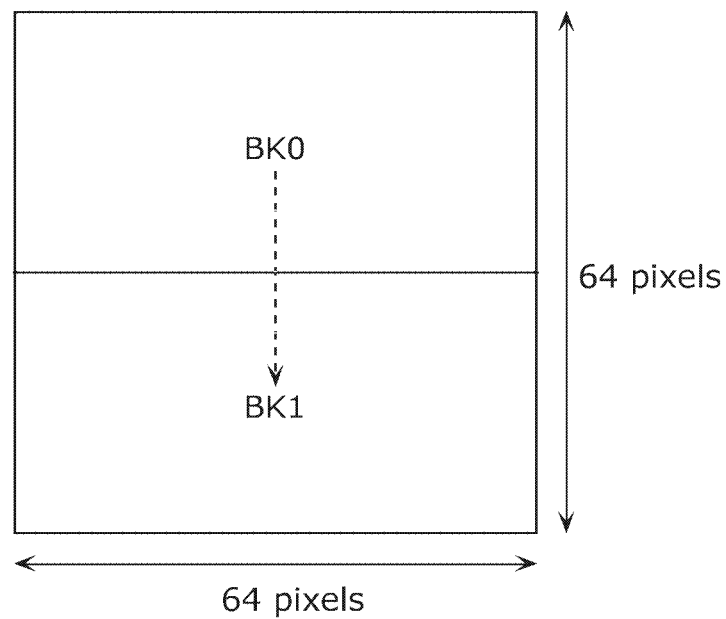
FIG. 16E illustrates a structure example of blocks obtained by partitioning the CU according to Embodiment 2.

FIG. 16E illustrates a structure example of blocks obtained by partitioning the coding unit CU0 in FIG. 16A. FIG. 16E illustrates two blocks BK0 and BK1. Then, the two blocks BK0 and BK1 are processed in the order of BK0 and BK1.

Figure 17A:
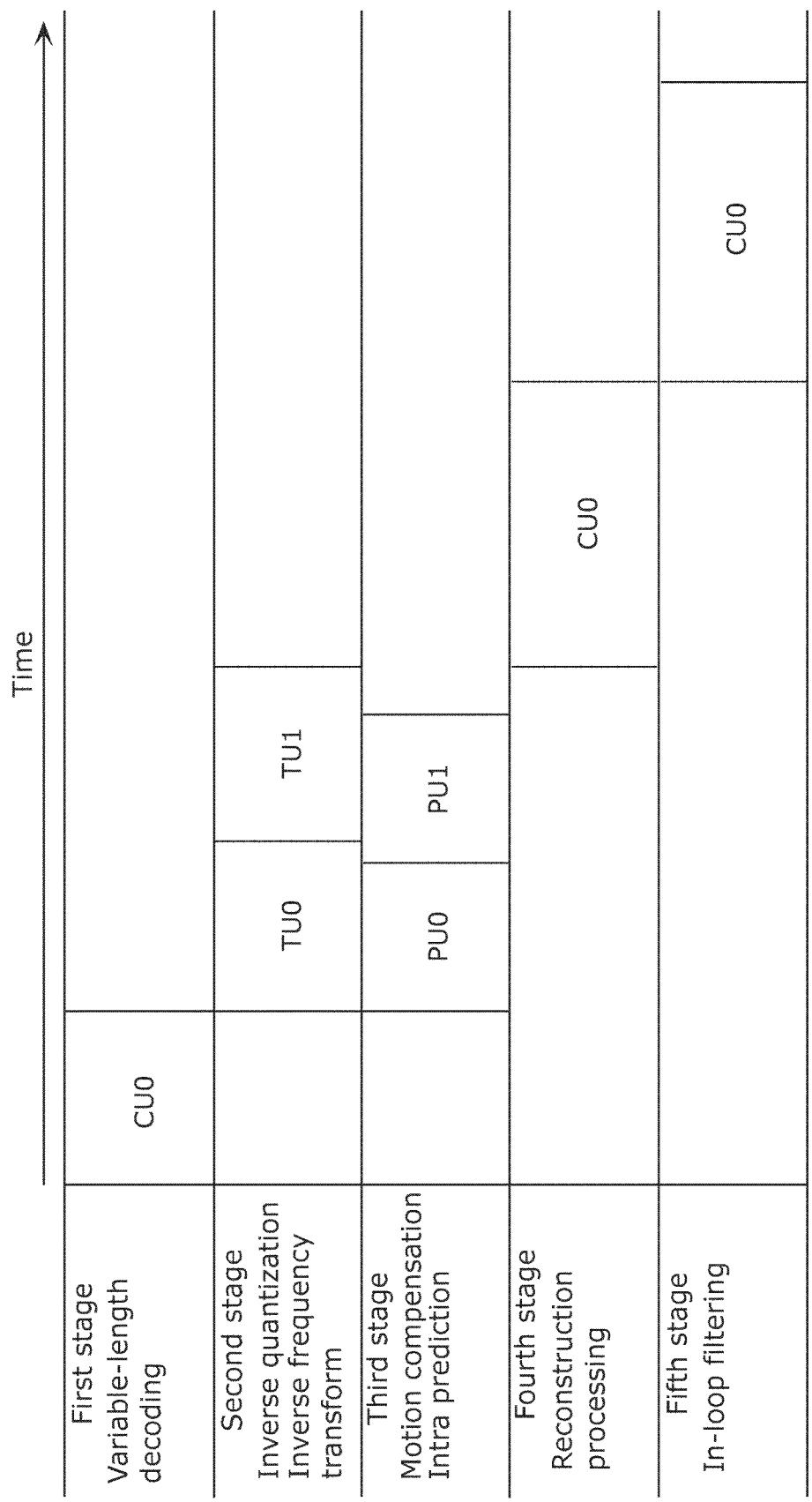
FIG. 17A illustrates a time chart of a first example of pipeline processing according to Embodiment 2.

FIG. 17A illustrates a time chart of an example of pipeline processing when the procedure in FIG. 15 is not applied.

In the example of FIG. 17A, the variable-length decoding is first performed on the coding unit CU0. Then, the inverse quantization and inverse frequency transform are performed on the transform units TU0 and TU1 in the order of TU0 and TU1. Simultaneously, the motion compensation is performed on the prediction units PU0 and PU1. Then, the reconstruction processing is performed on the coding unit CU0. Then, the in-loop filtering is performed on the coding unit CU0.

In the example of FIG. 17A, the reconstruction processing cannot start until the motion compensation on the prediction units PU0 and PU1 and the inverse quantization and inverse frequency transform on the transform units TU0 and TU1 are completed.

Figure 17B:
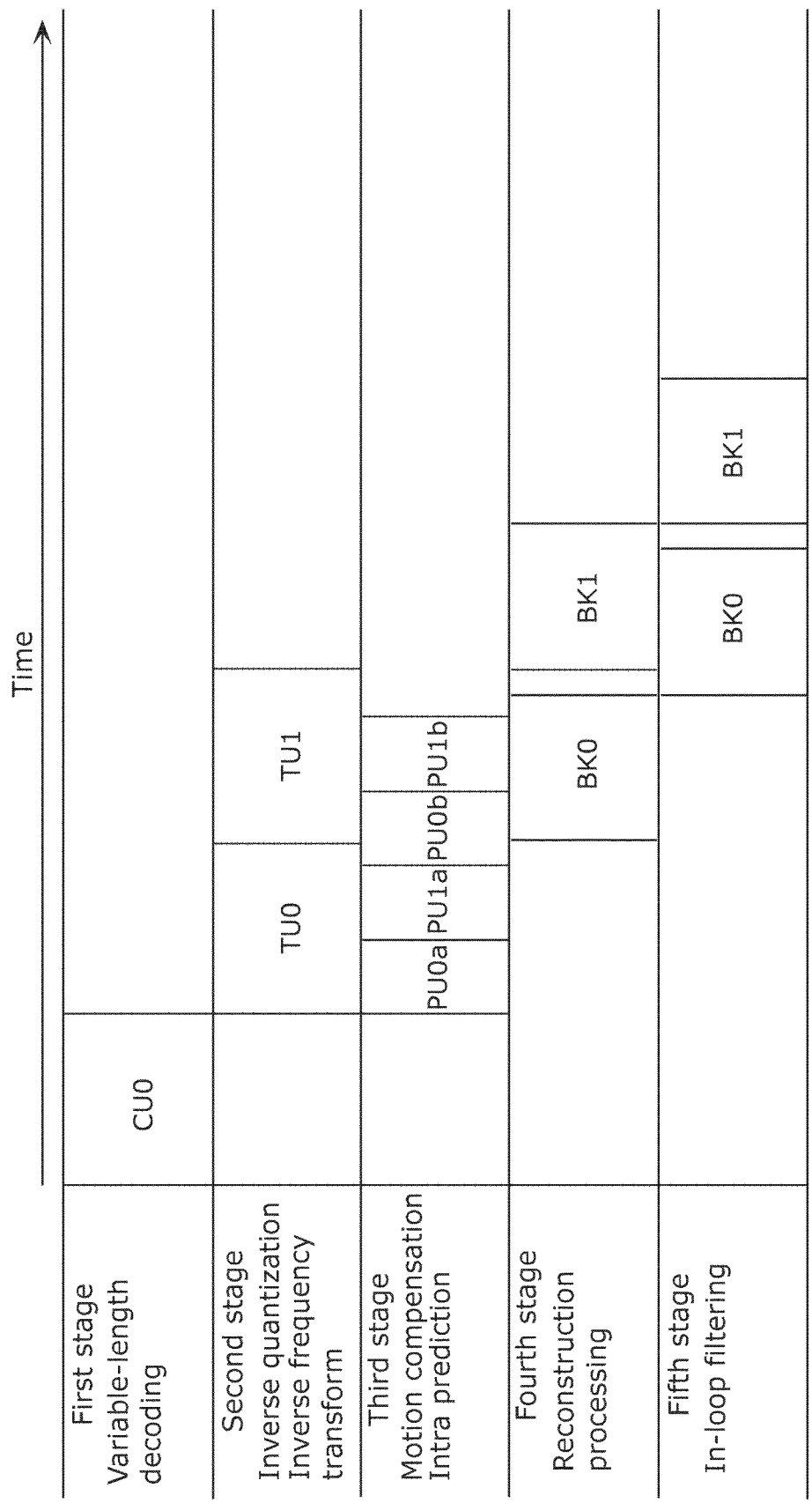
FIG. 17B illustrates a time chart of a second example of pipeline processing according to Embodiment 2.

FIG. 17B illustrates a time chart of an example of pipeline processing when the procedure in FIG. 15 is applied.

In the example of FIG. 17B, the variable-length decoding is first performed on the coding unit CU0. Then, the inverse quantization and inverse frequency transform are performed on the transform units TU0 and TU1 in the order of TU0 and TU1. Simultaneously, the motion compensation is performed on the blocks PU0a, PU0b, PU1a, and PU1b in the order of PU0a, PU1a, PU0b, and PU1b.

Furthermore, the reconstruction processing is performed on the blocks BK0 and BK1 in the order of BK0 and BK1. Here, when the inverse quantization and inverse frequency transform on the transform unit TU0 and the motion compensation on the blocks PU0a and PU1a end, the reconstruction processing on the block BK0 starts. Similarly, when the inverse quantization and inverse frequency transform on the transform unit TU1 and the motion compensation on the blocks PU0b and PU1b end, the reconstruction processing on the block BK1 starts.

Furthermore, the in-loop filtering is performed on the blocks BK0 and BK1 in the order of BK0 and BK1. Here, when the reconstruction processing on the block BK0 ends, the in-loop filtering on the block BK0 starts. Similarly, when the reconstruction processing on the block BK1 ends, the in-loop filtering on the block BK1 starts.

In the example of FIG. 17B, the predictive image after partitioning into the blocks is output in the same order as the TUs. Thus, the differential image and the predictive image having the same region as that of the differential image both of which are necessary for the reconstruction processing are provided earlier than the case of FIG. 17A. Thus, delay in start of the reconstruction processing and the in-loop filtering is reduced. Thus, the decoding processes are accelerated.

Furthermore, data of reference images is transferred on a smaller data unit basis, and the motion compensation is also performed on the smaller data unit basis. Thus, the capacity of the reference image storage unit 513 necessary for holding reference images is reduced. Furthermore, the image processing apparatus can transfer a reference image, perform motion compensation, and output the predictive image in parallel by the pipeline processing by partitioning the PU. Thus, the image processing apparatus can shorten the processing time necessary for the motion compensation.

(2-4. Advantages)

Accordingly, the image processing apparatus according to Embodiment 2 can perform processing on all of the PUs included in the CU in the same processing order as that of the TUs. Thus, the image processing apparatus may accelerate the decoding processes more than the case of Embodiment 1.

(2-5. Supplemental Information)

The image processing apparatus according to Embodiment 2 transfers a reference image, performs motion compensation, and outputs a predictive image for each of blocks obtained by partitioning all the PUs included in the CU, in the processing order of the TUs. However, the image processing apparatus may perform the processing on the blocks two or three at a time, or on a per block of 256 pixels.

Furthermore, the image processing apparatus partitions the PU after calculating the motion vector. However, the image processing apparatus may partition the reference image necessary for the motion compensation into blocks, after calculating the position and the size of the reference image and transferring the reference image for each of the PUs included in the CU. Then, the image processing apparatus may perform motion compensation and output a predictive image for each of the blocks obtained by partitioning the reference image, in the processing order of the TUs.

In this case, the necessary capacity of the reference image storage unit 513 remains the same as that when the reference image is not partitioned. However, the necessary capacity of the predictive image storage unit 514 is reduced. Furthermore, the image processing apparatus can start the reconstruction processing and the in-loop filtering earlier. Thus, the entire decoding processes are accelerated. Furthermore, the access frequency to the frame memory 502 is reduced.

Furthermore, the image processing apparatus may partition the predictive image necessary for the reconstruction processing into blocks, after calculating the position and the size of the reference image, transferring the reference image, and performing the motion compensation for each of the PUs included in the CU. Then, the image processing apparatus may output a predictive image, and perform the reconstruction processing and the in-loop filtering for each of the blocks obtained by partitioning the predictive image, in the processing order of the TUs.

In this case, the necessary capacity of the reference image storage unit 513 is not reduced. However, the necessary capacity of the predictive image storage unit 514 is reduced. Furthermore, the image processing apparatus can start the reconstruction processing and the in-loop filtering earlier. Thus, the entire decoding processes are accelerated. Furthermore, the access frequency to the frame memory 502 is reduced.

Furthermore, part or all of the constituent elements of each of the processing units may be implemented by a circuit using dedicated hardware or a program executed by a processor.

Furthermore, each of the frame memory 502, the reference image storage unit 513, and the predictive image storage unit 514 according to Embodiment 2 is described as a memory or a storage unit. However, as long as these units are storage elements capable of storing data, they may be any of flip-flops or registers. Furthermore, part of a memory region of a processor or part of a cache memory may be used as each of the frame memory 502, the reference image storage unit 513, and the predictive image storage unit 514.

Furthermore, Embodiment 2 describes the image processing apparatus that is an image decoding apparatus. However, the image processing apparatus is not limited to the image decoding apparatus. Similarly, the image coding apparatus that performs the decoding processes in the opposite procedure may partition a PU and perform motion compensation.

Furthermore, Embodiment 2 exemplifies the motion compensation. However, the image processing apparatus can produce the same advantages by performing the same processes also in the intra prediction.

Furthermore, the sizes and the shapes of the CUs, the PUs, and the TUs according to Embodiment 2 are examples, and they may be any sizes and shapes.

(Embodiment 3)

(3-1. Outline)

The outline of an image processing apparatus according to Embodiment 3 will be described. The image processing apparatus according to Embodiment 3 decodes a coded stream generated by coding processes including motion compensation. In the coding, the size of motion compensation, that is, the size of a PU is variable, e.g. 64×64 pixels at a maximum.

When a rectangle of a PU does not include an edge of a TU and the processing order of the TUs is different from that of the PUs, the image processing apparatus transfers a reference image, performs motion compensation, and outputs a predictive image in the processing order of the TUs. Out of the intra prediction and the inter prediction, the inter prediction is used according to Embodiment 3.

Furthermore, the image processing apparatus performs the following reconstruction processing and in-loop filtering in the processing order of the TUs.

Accordingly, the image processing apparatus can perform processing on the PU in the same processing order as that of the TUs without partitioning the PU. Thus, the decoding processes are accelerated.

The outline of the image processing apparatus according to Embodiment 3 is hereinbefore described.

(3-2. Configuration)

FIG. 2 illustrates a configuration of the image processing apparatus according to Embodiment 3. FIG. 3 illustrates a surrounding configuration of the motion compensation unit 506 according to Embodiment 3. The configuration of the image processing apparatus according to Embodiment 3 is the same as that according to Embodiment 1, and thus the description thereof is omitted.

(3-3. Operations)

Embodiment 3 uses the structure of the coded stream illustrated in FIGS. 4A to 6B as according to Embodiment 1. The operation procedure of the image processing apparatus according to Embodiment 3 is the same as that in FIGS. 7 and 8 according to Embodiment 1, and thus the description thereof is omitted.

Figure 18:
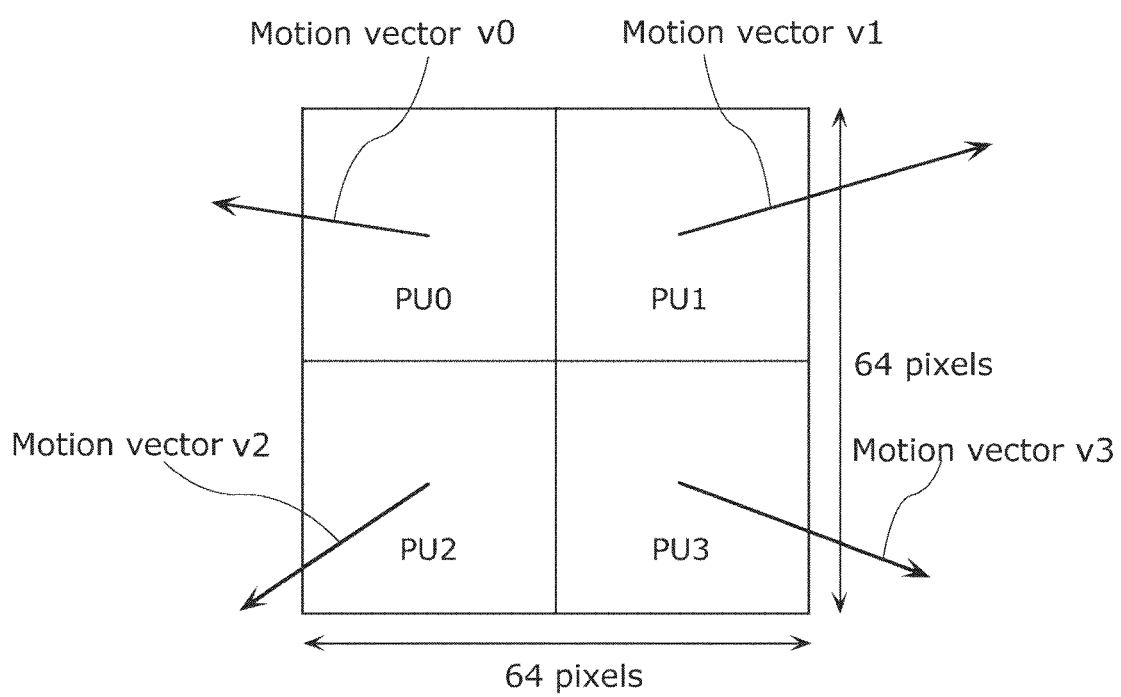
FIG. 18 illustrates PUs and the motion vectors according to Embodiment 3.

FIG. 18 illustrates PUs and the motion vectors according to Embodiment 3. In the example of FIG. 18, one CU includes four prediction units PU0 to PU3. The prediction unit PU0 has one motion vector v0. Similarly, the prediction units PU1 to PU3 have motion vectors v1 to v3, respectively.

The image processing apparatus transfers a reference image, performs motion compensation, and outputs a predictive image for the PUs in the processing order of the TUs without partitioning the PUs included in the CU.

Figure 19:
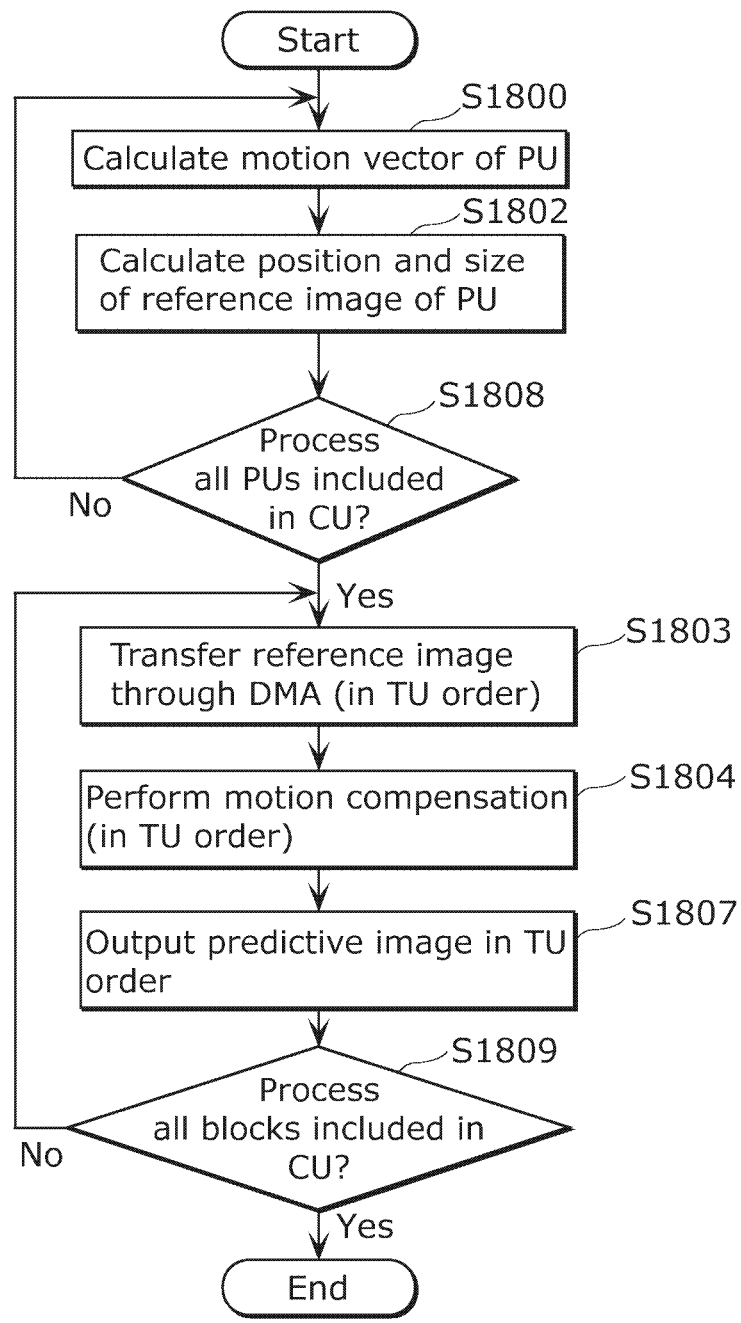
FIG. 19 is a flowchart indicating operations of motion compensation according to Embodiment 3.

FIG. 19 is a flowchart indicating operations of the motion compensation according to Embodiment 3. The operations of the motion vector calculating unit 511 and the motion compensation unit 506 will be described with reference to FIG. 19. FIG. 19 shows the operations of the motion compensation for one CU.

First, the motion vector calculating unit 511 calculates a motion vector of a PU included in the CU using a method determined by a standard (S1800). Next, the motion vector calculating unit 511 calculates a position and a size of the reference image based on the motion vector, and the coordinates and the size of the PU (S1802).

Next, the motion vector calculating unit 511 determines whether or not a series of operations (S1800, S1802) for calculating the position and the size of the reference image is performed on all of the PUs included in the CU (S1808). When an unprocessed PU remains (No at S1808), the motion vector calculating unit 511 calculates a motion vector of the PU (S1800).

Next, the motion vector calculating unit 511 sets the obtained position and size of the reference image to the DMA control unit 512. The DMA control unit 512 transfers the reference image from the frame memory 502 to the reference image storage unit 513 (S1803). Next, the motion compensation unit 506 performs motion compensation using the reference image transferred to the reference image storage unit 513 (S1804), and writes the result in the predictive image storage unit 514 (S1807).

Next, the motion vector calculating unit 511 determines whether or not a series of operations (S1803, S1804, S1807) for calculating the position and the size of the reference image is performed on all of the PUs included in the CU (S1809). When an unprocessed block remains (No at S1809), the motion vector calculating unit 511 transfers the reference image of the block (S1803). When there is no unprocessed block (Yes at S1809), the processes end.

The motion vector calculating unit 511, the DMA control unit 512, and the motion compensation unit 506 perform the processes (S1803, S1804, S1807) in the processing order of the TUs.

Figure 20A:
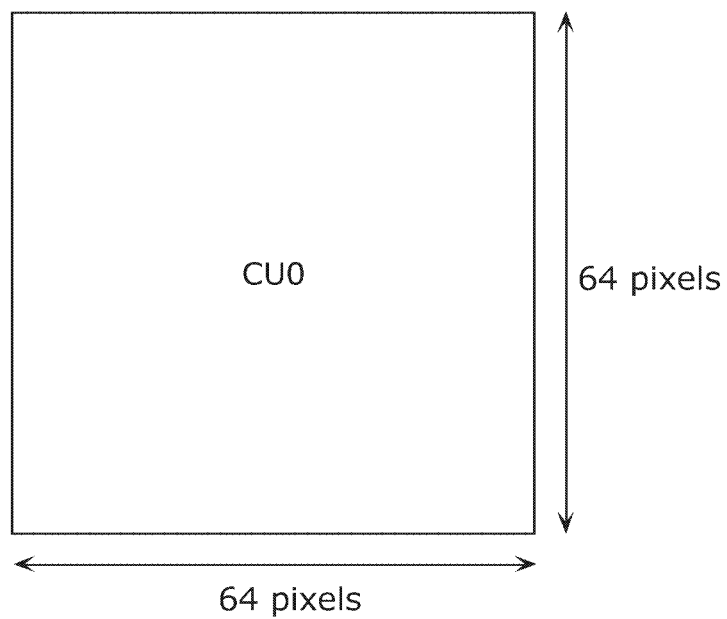
FIG. 20A illustrates a structure example of a CU according to Embodiment 3.

FIG. 20A illustrates a structure example of a CU according to Embodiment 3. The coding unit CU0 in FIG. 20A has the size of 64×64 pixels.

Figure 20B:
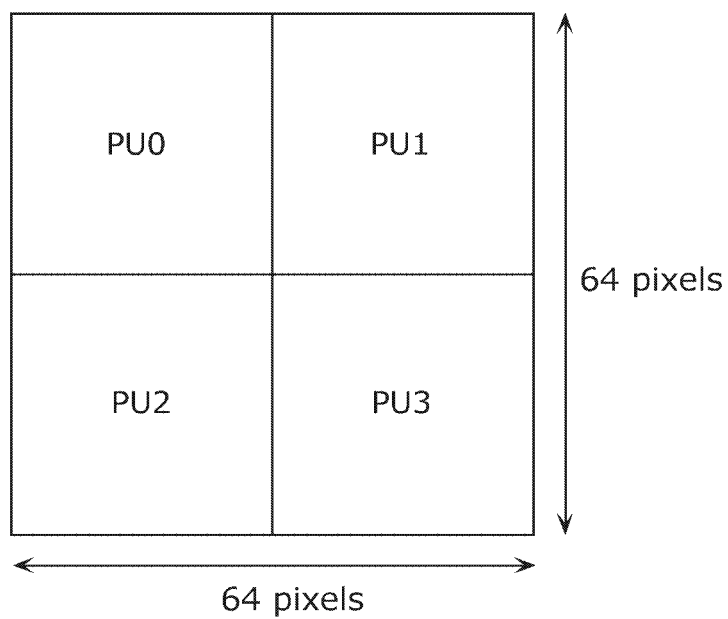
FIG. 20B illustrates a structure example of PUs according to Embodiment 3.

FIG. 20B illustrates a structure example of PUs corresponding to the coding unit CU0 in FIG. 20A. The coding unit CU0 includes four prediction units PU0 to PU3.

Figure 20C:
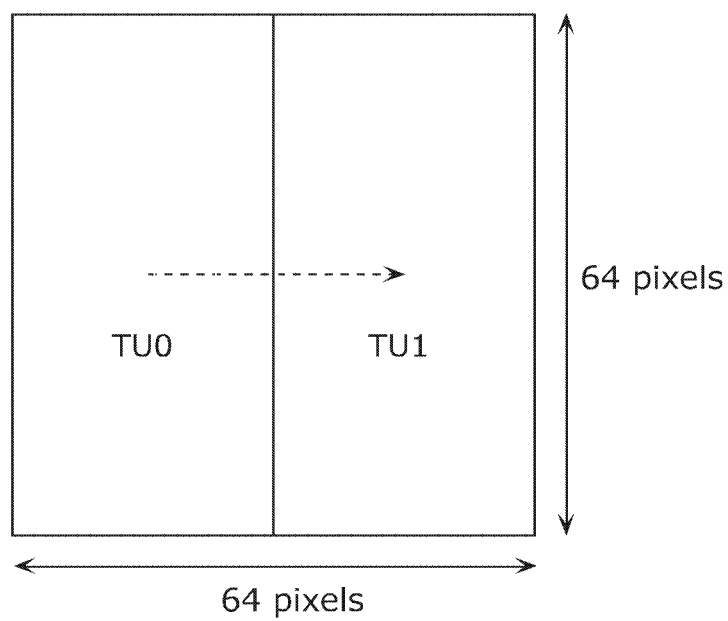
FIG. 20C illustrates a structure example of TUs according to Embodiment 3.

FIG. 20C illustrates a structure example of TUs corresponding to the coding unit CU0 in FIG. 20A. FIG. 20C illustrates two transform units TU0 and TU1. The two transform units TU0 and TU1 are processed in the order of TU0 and TU1.

Figure 20D:
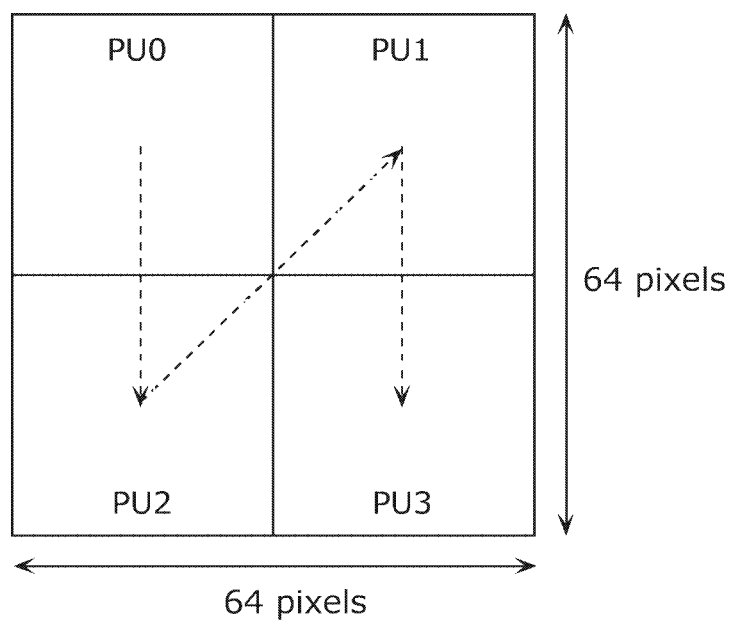
FIG. 20D illustrates a prediction order according to Embodiment 3.

FIG. 20D illustrates the processing order of the four prediction units PU0 to PU3 corresponding to the coding unit CU0 in FIG. 20A. The four prediction units PU0 to PU3 are processed in the order of PU0, PU2, PU1, and PU3.

The processing order of the four prediction units PU0 to PU3 in FIG. 20D follows a transform order that is a processing order of the two transform units TU0 and TU1 in FIG. 20C. In other words, the four prediction units PU0 to PU3 are processed in the transform order.

Figure 20E:
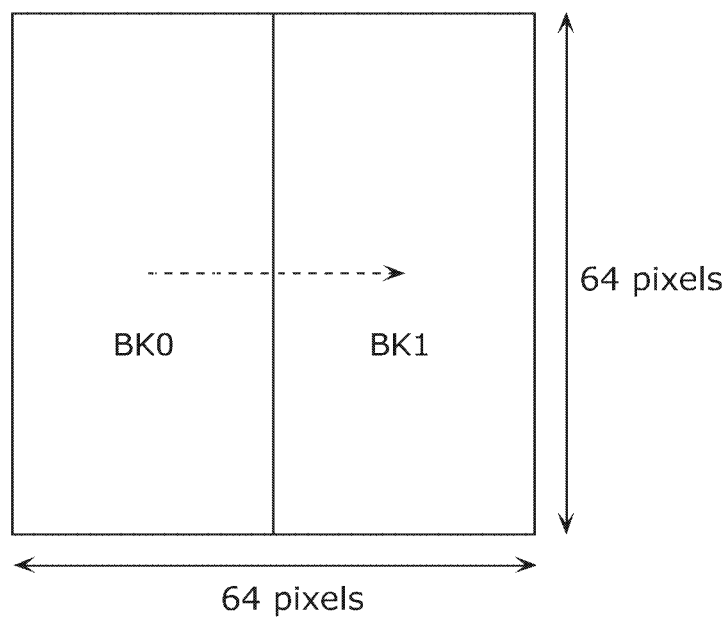
FIG. 20E illustrates a structure example of blocks obtained by partitioning the CU according to Embodiment 3.

FIG. 20E illustrates a structure example of blocks obtained by partitioning the coding unit CU0 in FIG. 20A. FIG. 20E illustrates two blocks BK0 and BK1. Then, the two blocks BK0 and BK1 are processed in the order of BK0 and BK1.

Figure 21A:
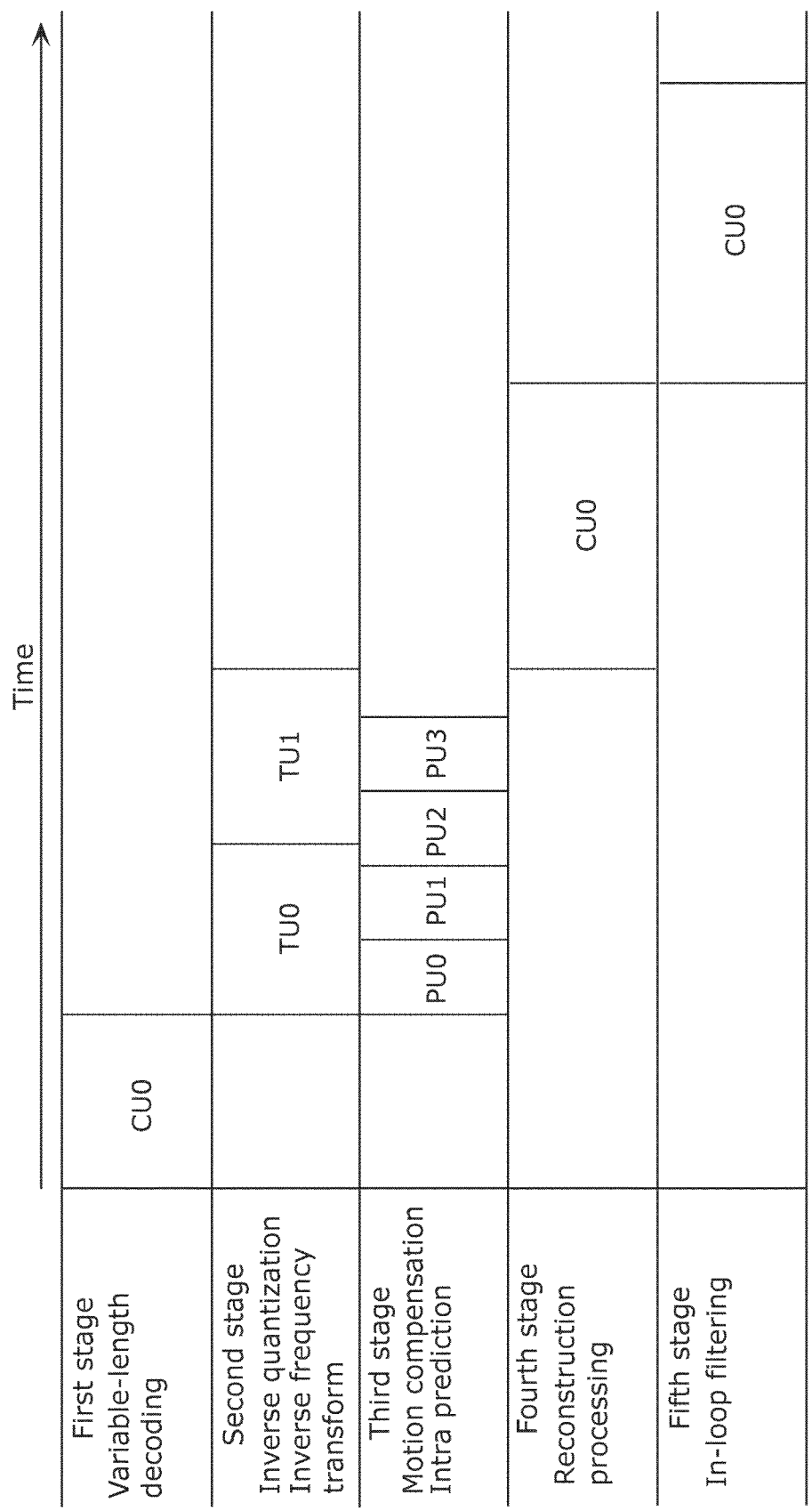
FIG. 21A illustrates a time chart of a first example of pipeline processing according to Embodiment 3.

FIG. 21A illustrates a time chart of an example of pipeline processing when the procedure in FIG. 19 is not applied.

In the example of FIG. 21A, the variable-length decoding is first performed on the coding unit CU0. Then, the inverse quantization and inverse frequency transform are performed on the transform units TU0 and TU1 in the order of TU0 and TU1. Simultaneously, the motion compensation is performed on the prediction units PU0 to PU3. Then, the reconstruction processing is performed on the coding unit CU0. Then, the in-loop filtering is performed on the coding unit CU0.

In the example of FIG. 21A, the reconstruction processing cannot start until the motion compensation on the prediction units PU0 and PU3 and the inverse quantization and inverse frequency transform on the transform units TU0 and TU1 are completed.

Figure 21B:
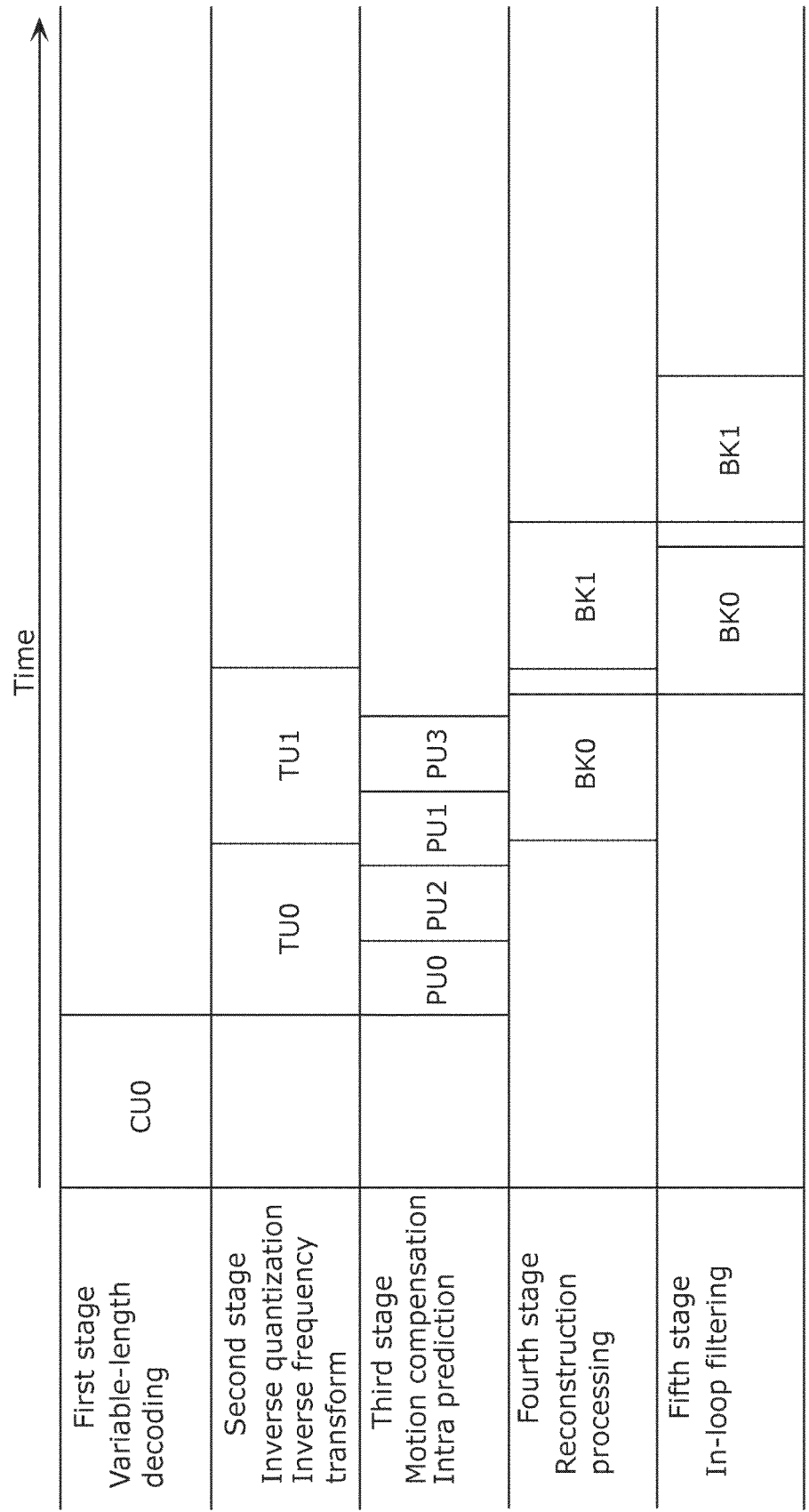
FIG. 21B illustrates a time chart of a second example of pipeline processing according to Embodiment 3.

FIG. 21B illustrates a time chart of an example of pipeline processing when the procedure in FIG. 19 is applied.

In the example of FIG. 21B, the variable-length decoding is first performed on the coding unit CU0. Then, the inverse quantization and inverse frequency transform are performed on the transform units TU0 and TU1 in the order of TU0 and TU1. Simultaneously, the motion compensation is performed on the blocks PU0 to PU3 in the order of PU0, PU2, PU1, and PU3.

Furthermore, the reconstruction processing is performed on the blocks BK0 and BK1 in the order of BK0 and BK1. Here, when the inverse quantization and inverse frequency transform on the transform unit TU0 and the motion compensation on the blocks PU0 and PU2 end, the reconstruction processing on the block BK0 starts. Similarly, when the inverse quantization and inverse frequency transform on the transform unit TU1 and the motion compensation on the blocks PU1 and PU3 end, the reconstruction processing on the block BK1 starts.

Furthermore, the in-loop filtering is performed on the blocks BK0 and BK1 in the order of BK0 and BK1. Here, when the reconstruction processing on the block BK0 ends, the in-loop filtering on the block BK0 starts. Similarly, when the reconstruction processing on the block BK1 ends, the in-loop filtering on the block BK1 starts.

In the example of FIG. 21B, the predictive images are output in the same order as that of the TUs. Thus, the differential image and the predictive image having the same region as that of the differential image both of which are necessary for the reconstruction processing are provided earlier than the case of FIG. 21A. Thus, delay in start of the reconstruction processing and the in-loop filtering is reduced. Thus, the decoding processes are accelerated.

(3-4. Advantages)

Accordingly, the image processing apparatus can perform processing on the PU in the same processing order as that of the TUs without partitioning the PU. Thus, the decoding processes are accelerated.

(3-5. Supplemental Information)

The image processing apparatus according to Embodiment 3 transfers a reference image, performs motion compensation, and outputs a predictive image for each of PUs included in the CU, in the processing order of the TUs. However, the image processing apparatus may perform the processing on the PUs two or three at a time, or on a per block of 256 pixels.

Furthermore, part or all of the constituent elements of each of the processing units may be implemented by a circuit using dedicated hardware or a program executed by a processor.

Furthermore, each of the frame memory 502, the reference image storage unit 513, and the predictive image storage unit 514 according to Embodiment 3 is described as a memory or a storage unit. However, as long as these units are storage elements capable of storing data, they may be any of flip-flops or registers. Furthermore, part of a memory region of a processor or part of a cache memory may be used as each of the frame memory 502, the reference image storage unit 513, and the predictive image storage unit 514.

Furthermore, Embodiment 3 describes the image processing apparatus that is an image decoding apparatus. However, the image processing apparatus is not limited to the image decoding apparatus. Similarly, the image coding apparatus that performs the decoding processes in the opposite procedure can perform motion compensation.

Furthermore, Embodiment 3 exemplifies the motion compensation. However, the image processing apparatus can produce the same advantages by performing the same processes also in the intra prediction.

Furthermore, the sizes and the shapes of the CUs, the PUs, and the TUs according to Embodiment 3 are examples, and they may be any sizes and shapes.

(Embodiment 4)

(4-1. Outline)

The outline of an image processing apparatus according to Embodiment 4 will be described. The image processing apparatus according to Embodiment 4 decodes a coded stream generated by coding processes including motion compensation. In the coding, the size of intra prediction, that is, the size of a PU is variable, e.g. 64×64 pixels at a maximum.

When the rectangle of a PU includes an edge of a TU, the image processing apparatus partitions the PU with the edge of the TU. Then, the image processing apparatus performs intra prediction and outputs a predictive image for blocks obtained by partitioning the PU, in the processing order of the TUs. Furthermore, the image processing apparatus performs the following reconstruction processing and in-loop filtering in the processing order of the TUs.

For example, even when the size of the PU is larger, the image processing apparatus partitions the PU, and performs intra prediction in the processing order of the TUs. Accordingly, the memory capacity necessary for storing predictive images is reduced. Furthermore, the image processing apparatus can start the reconstruction processing and in-loop processing earlier. Thus, the entire decoding processes are accelerated.

(4-2. Configuration)

Next, a configuration of the image processing apparatus according to Embodiment 4 will be described. FIG. 2 illustrates a configuration of the image processing apparatus according to Embodiment 4. The whole configuration of the image processing apparatus according to Embodiment 4 is the same as that according to Embodiment 1, and thus the description thereof is omitted.

Figure 22:
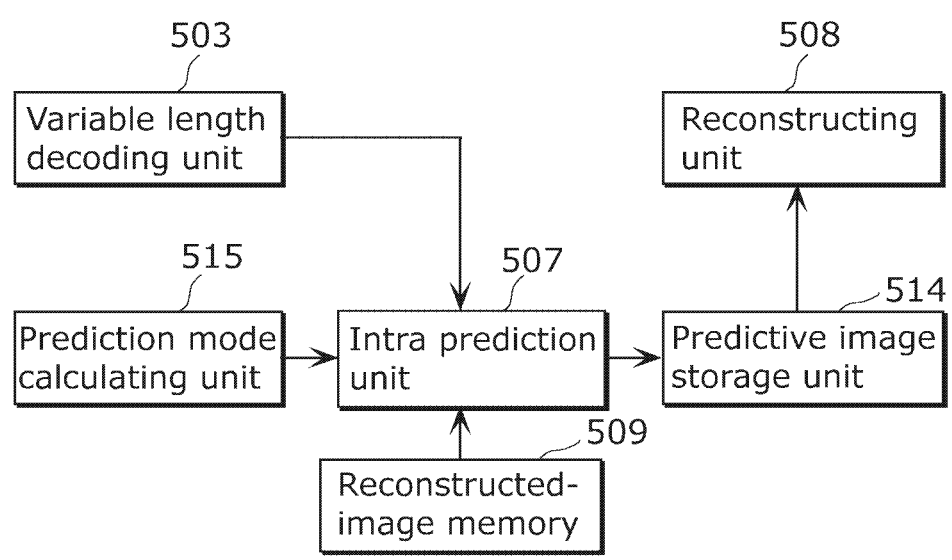
FIG. 22 illustrates a configuration for intra prediction according to Embodiment 4.

FIG. 22 illustrates a surrounding configuration of the intra prediction unit 507 according to Embodiment 4. The constituent elements identical to those in FIG. 2 are assigned the same reference numerals, and the description is omitted. FIG. 22 illustrates the variable length decoding unit 503, a prediction mode calculating unit 515, the intra prediction unit 507, the reconstructed-image memory 509, the reconstructing unit 508, and the predictive image storage unit 514. The intra prediction unit 507 may include the prediction mode calculating unit 515 and the predictive image storage unit 514.

The prediction mode calculating unit 515 calculates an intra prediction mode for intra prediction, based on the decoding information decoded by the variable length decoding unit 503. The intra prediction unit 507 performs the intra prediction based on the intra prediction mode. Here, the intra prediction unit 507 may obtain a transform order of TUs from the variable length decoding unit 503.

The configuration of the image processing apparatus is hereinbefore described.

(4-3. Operations)

Figure 23:
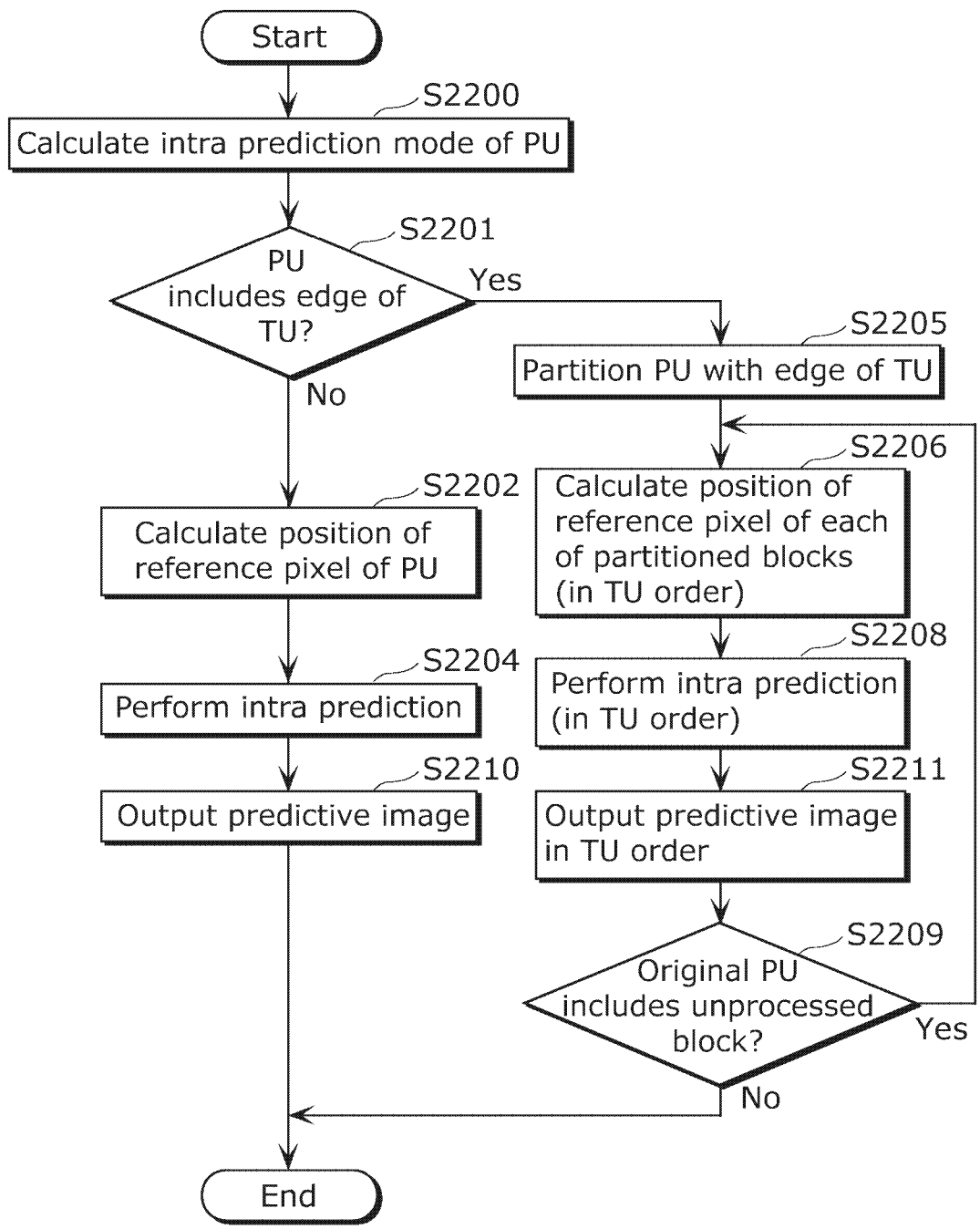
FIG. 23 is a flowchart indicating operations for intra prediction according to Embodiment 4.

FIG. 23 is a flowchart indicating operations of the intra prediction according to Embodiment 4. The operations of the prediction mode calculating unit 515 and the intra prediction unit 507 in FIG. 22 will be described with reference to FIG. 23.

First, the prediction mode calculating unit 515 calculates an intra prediction mode of a PU using a method determined by a standard (S2200). Next, the intra prediction unit 507 determines whether or not a rectangle of the PU includes an edge of a TU, based on coordinates and the size of the TU (S2201).

When the rectangle of the PU does not include an edge of a TU (No at S2201), the intra prediction unit 507 calculates a reference surrounding pixel position, based on the intra prediction mode, the coordinates of the PU, and the size of the PU (S2202). The intra prediction unit 507 performs intra prediction using a reference pixel at the obtained reference surrounding pixel position and the intra prediction mode (S2204). Then, the intra prediction unit 507 writes the result of the intra prediction in the predictive image storage unit 514 (S2210).

When the rectangle of the PU includes an edge of a TU (Yes at S2201), the intra prediction unit 507 partitions the PU with the edge of the TU (S2205). Then, the intra prediction unit 507 calculates a reference surrounding pixel position of each of blocks obtained by partitioning the PU, based on the intra prediction mode, and coordinates and the size of the block (S2206).

The intra prediction unit 507 performs intra prediction using a reference pixel at the obtained reference surrounding pixel position and the intra prediction mode (S2208). Then, the intra prediction unit 507 writes the result of the intra prediction in the predictive image storage unit 514 (S2211).

Furthermore, the intra prediction unit 507 determines whether or not the PU includes an unprocessed block (S2209). When there is an unprocessed block (Yes at S2209), the intra prediction unit 507 calculates a reference surrounding pixel position of the block (S2206). When there is no unprocessed block (No at S2209), the processes end.

The intra prediction unit 507 performs the processes (S2206, S2208, S2211, S2209) in the processing order of the TUs.

With the processes, the image processing apparatus can produce the same advantages also in the intra prediction as those according to Embodiment 1. In other words, the predictive images are output in the same order as that of the TUs. Thus, the differential image and the predictive image having the same region as that of the differential image both of which are necessary for the reconstruction processing are provided earlier. Thus, delay in start of the reconstruction processing and the in-loop filtering is reduced more than the case of FIG. 13A. Thus, the decoding processes are accelerated.

Furthermore, the intra prediction, the reconstruction processing, and the in-loop filtering are performed on a smaller data unit basis. Thus, the necessary capacity of the predictive image storage unit 514 for holding predictive images and the necessary capacity of a memory to be used for the reconstruction processing and the in-loop filtering are reduced.

Figure 24:
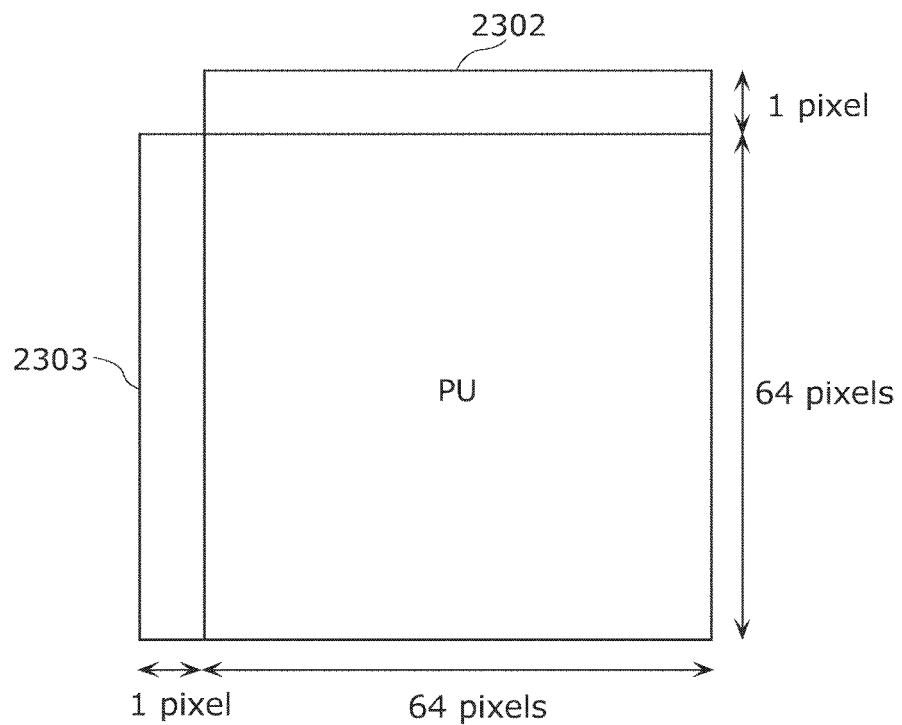
FIG. 24 illustrates a PU for intra prediction according to Embodiment 4.

FIG. 24 illustrates an example of a PU and reference surrounding pixels necessary for the intra prediction of the PU. In the intra prediction of the PU, reference surrounding pixels 2302 and 2303 that surround the prediction unit are used. For example, the intra prediction is performed in accordance with the following Equation 1.

[Math 1]

$$DCVal = \left( \sum_{x'=0}^{nS-1} p[x', -1] + \sum_{y'=0}^{nS-1} p[-1, y'] + nS \right) >> (k+1) \quad \text{(Equation 1)}$$

$$predSamples[x, y] = DCVal$$
$$\text{with } x, y = 0 \ldots nS - 1$$
$$\text{where } k = \log_2(nS)$$

Here, nS in Equation 1 denotes the size of a PU. In FIG. 24, nS is 64. Furthermore, p[x', −1] denotes the reference surrounding pixels 2302, and x' is a value of a coordinate axis (x coordinate) with respect to the origin at the left of the PU, in the right direction that is a positive direction. Furthermore, p[−1, y'] denotes the reference surrounding pixels 2303, and y' is a value of a coordinate axis (y coordinate) with respect to the origin at the top of the PU, in the downward direction that is a positive direction.

Furthermore, k denotes a variable that can be derived from the reference surrounding pixels. Furthermore, predSamples[x, y] in Equation 1 denotes a predicted pixel value obtained as a result of intra prediction.

In Equation 1, the predicted pixel value is the same at any position within the PU. Thus, even when a PU is partitioned into any rectangles, the intra prediction for each block is possible. Furthermore, after performing the intra prediction, the predictive images can be output in any order.

(4-4. Advantages)

Even when the size of a PU is larger, the image processing apparatus according to Embodiment 4 partitions the PU, and performs intra prediction in the processing order of the TUs. Accordingly, the necessary memory capacity is reduced. Furthermore, the reconstruction processing and the in-loop filtering can be started earlier. Thus, the decoding processes are accelerated.

(4-5. Supplemental Information)

The image processing apparatus according to Embodiment 4 calculates a reference surrounding pixel position, performs motion compensation, and outputs a predictive image for each of blocks obtained by partitioning the PU, in the processing order of the TUs. However, the image processing apparatus may perform the processing on the blocks two or three at a time, or on a per block of 256 pixels.

Furthermore, the image processing apparatus partitions the PU after calculating the motion vector. However, the image processing apparatus may partition a predictive image with the edge of a TU and output the predictive images in the processing order of the TUs after calculating a reference surrounding pixel position and performing the intra prediction of the PU.

Here, the memory capacity for the reconstruction processing and in-loop filtering is reduced. Furthermore, the reconstruction processing and the in-loop filtering can be started earlier. Thus, the entire decoding processes are accelerated.

Furthermore, part or all of the constituent elements of each of the processing units may be implemented by a circuit using dedicated hardware or a program executed by a processor.

Furthermore, each of the frame memory 502, the reference image storage unit 513, and the predictive image storage unit 514 according to Embodiment 4 is described as a memory or a storage unit. However, as long as these units are storage elements capable of storing data, they may be any of flip-flops or registers. Furthermore, part of a memory region of a processor or part of a cache memory may be used as each of the frame memory 502, the reference image storage unit 513, and the predictive image storage unit 514.

Furthermore, Embodiment 4 describes the image processing apparatus that is an image decoding apparatus. However, the image processing apparatus is not limited to the image decoding apparatus. Similarly, the image coding apparatus that performs the decoding processes in the opposite procedure may partition a PU and perform intra prediction.

Furthermore, the sizes and the shapes of the CUs, the PUs, and the TUs according to Embodiment 4 are examples, and they may be any sizes and shapes.

Furthermore, although the intra prediction mode referred to as the direct current (DC) prediction or the mean value prediction is used in Embodiment 4, other intra prediction modes may be used instead. For example, the intra prediction mode referred to as the vertical prediction or the horizontal prediction, or the other intra prediction modes described in NPL2 may be used instead.

(Embodiment 5)

Embodiments 5 to 12 describe image processing apparatuses each including the characteristic constituent elements described in Embodiments 1 to 4.

Figure 25A:
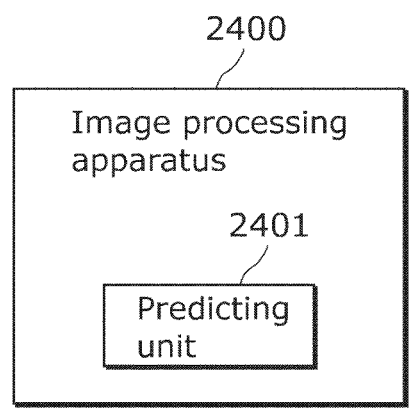
FIG. 25A illustrates a configuration of an image processing apparatus according to Embodiment 5.

FIG. 25A illustrates a configuration of an image processing apparatus 2400 according to Embodiment 5. The image processing apparatus 2400 in FIG. 25A decodes an image coded in coding processes. The coding processes include prediction on at least one PU, and frequency transform on TUs included in a region including the at least one PU.

The image processing apparatus 2400 includes a predicting unit 2401. The predicting unit 2401 corresponds to the motion compensation unit 506, the intra prediction unit 507, and others described in Embodiment 1.

Figure 25B:
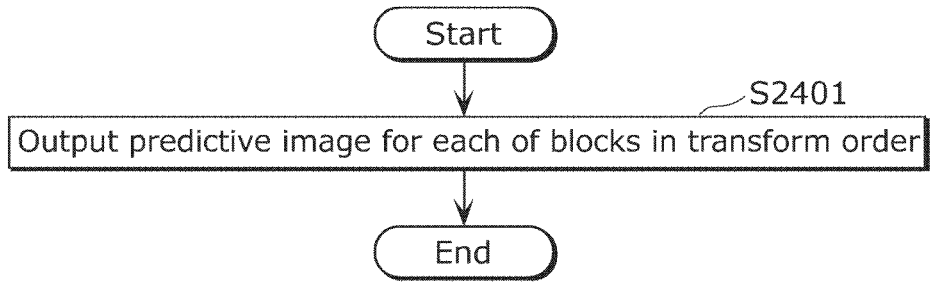
FIG. 25B is a flowchart indicating an operation performed by the image processing apparatus according to Embodiment 5.

FIG. 25B is a flowchart indicating an operation of the image processing apparatus 2400 in FIG. 25A. When a prediction order predetermined for the at least one PU does not follow a transform order predetermined for the TUs, the predicting unit 2401 outputs a predictive image corresponding to the at least one PU for each of the blocks in the transform order (S2401). For example, the predicting unit 2401 generates a predictive image with the prediction on the at least one PU. Then, the predicting unit 2401 outputs the predictive images in the transform order.

Here, the predetermined prediction order may be an order of PUs in a stream or other orders. Furthermore, the predetermined transform order may be an order of TUs in a stream or other orders. The predicting unit 2401 controls output of a PU so that a region to which a result of the processing on a TU is output is identical to a region to which a result of the processing on a PU is output.

Accordingly, the time at which a predictive image is output approximates the time at which the differential image obtained by transform is output. Thus, the reconstruction processing at a latter stage can be started earlier. Thus, the image processing apparatus 2400 can reduce delay occurring in the image processing.

Here, the image processing apparatus 2400 according to Embodiment 5 may include the constituent elements described in other Embodiments. For example, the image processing apparatus 2400 may include the inverse frequency transform unit 505 that performs the inverse frequency transform on TUs in a transform order. Furthermore, the image processing apparatus 2400 may be included in one of the constituent elements described in the other Embodiments.

(Embodiment 6)

An image processing apparatus according to Embodiment 6 is a specific example of the image processing apparatus 2400 according to Embodiment 5.

Figure 26A:
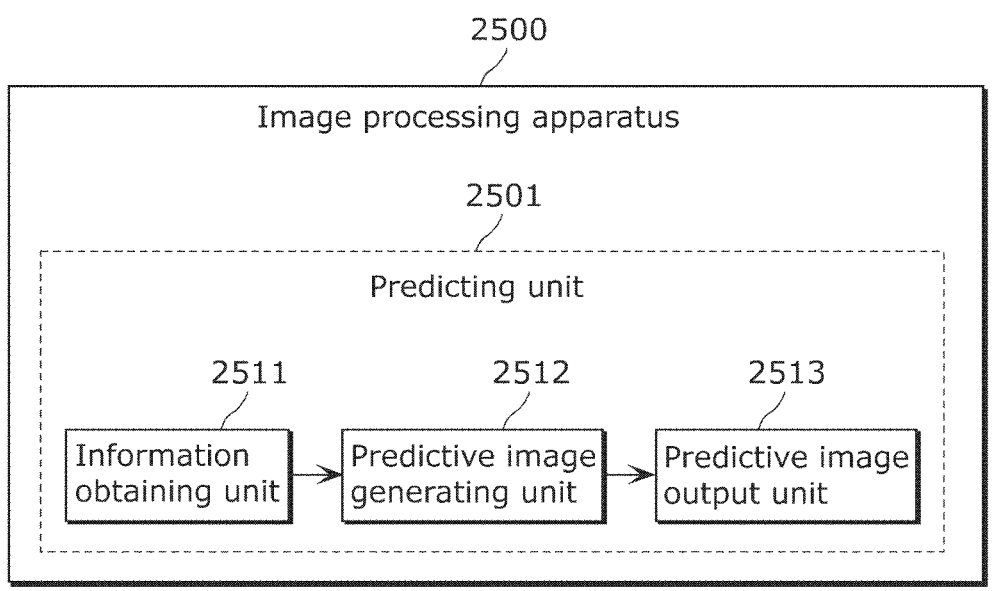
FIG. 26A illustrates a configuration of an image processing apparatus according to Embodiment 6.

FIG. 26A illustrates a configuration of an image processing apparatus 2500 according to Embodiment 6. The image processing apparatus 2500 in FIG. 26A decodes an image coded in coding processes similarly as the image processing apparatus 2400 according to Embodiment 5. The coding processes include prediction on at least one PU, and frequency transform on TUs included in a region including the at least one PU as according to Embodiment 5.

The image processing apparatus 2500 includes a predicting unit 2501. The predicting unit 2501 corresponds to the predicting unit 2401 described in Embodiment 5. Furthermore, the predicting unit 2501 includes an information obtaining unit 2511, a predictive image generating unit 2512, and a predictive image output unit 2513.

Figure 26B:
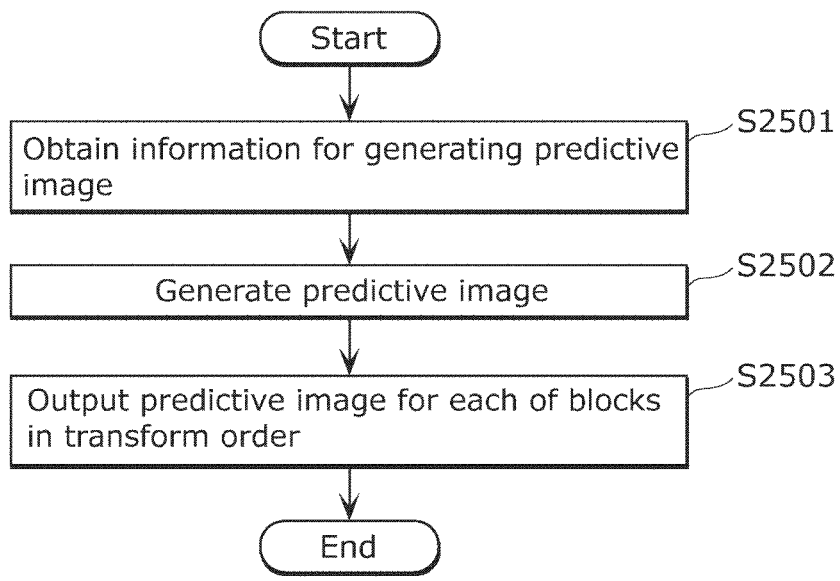
FIG. 26B is a flowchart indicating operations performed by the image processing apparatus according to Embodiment 6.

FIG. 26B is a flowchart indicating operations of the image processing apparatus 2500 in FIG. 26A. First, the information obtaining unit 2511 obtains information for generating a predictive image (S2501). For example, the information for generating a predictive image includes a motion vector, an intra prediction mode, a reference image, and a reference surrounding pixel. Next, the predictive image generating unit 2512 performs prediction using the obtained Information to generate a predictive image (S2502).

Then, the predictive image output unit 2513 outputs a predictive image (S2503). Here, when the prediction order does not follow a transform order, the predictive image output unit 2513 outputs predictive images for the blocks in the transform order.

Accordingly, the time at which the predictive image is output approximates the time at which the differential image obtained by transform is output. Thus, the reconstruction processing at a latter stage can be started earlier. Thus, the image processing apparatus 2500 can reduce delay occurring in the image processing.

Here, when the prediction order does not follow the transform order, the predictive image generating unit 2512 may generate a predictive image in the transform order for each of the blocks. Thus, the generating process and the output process can be smoothly performed.

Furthermore, when the prediction order does not follow the transform order, the information obtaining unit 2511 may obtain the information for generating a predictive image for each of the blocks in the transform order. Accordingly, the information obtaining process, the generating process, and the output process can be smoothly performed. Furthermore, the necessary memory capacity is reduced.

The predictive image generating unit 2512 may generate a predictive image by performing intra prediction or motion compensation.

(Embodiment 7)

Figure 27A:
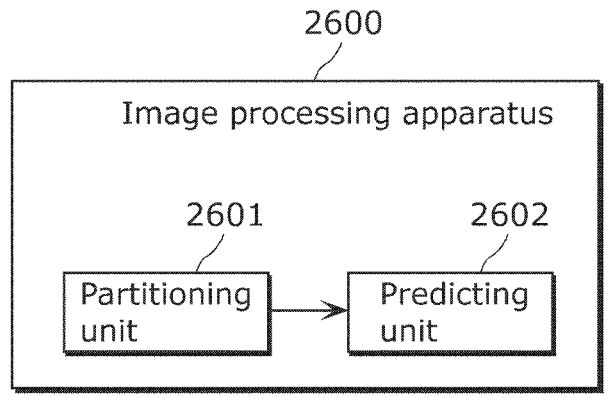
FIG. 27A illustrates a configuration of an image processing apparatus according to Embodiment 7.

FIG. 27A illustrates a configuration of an image processing apparatus 2600 according to Embodiment 7. The image processing apparatus 2600 in FIG. 27A decodes an image coded in coding processes similarly as the image processing apparatus 2400 according to Embodiment 5. The coding processes include prediction on at least one PU, and frequency transform on TUs included in a region including the at least one PU.

The image processing apparatus 2600 includes a partitioning unit 2601 and a predicting unit 2602. The predicting unit 2602 corresponds to the predicting unit 2401 according to Embodiment 5.

Figure 27B:
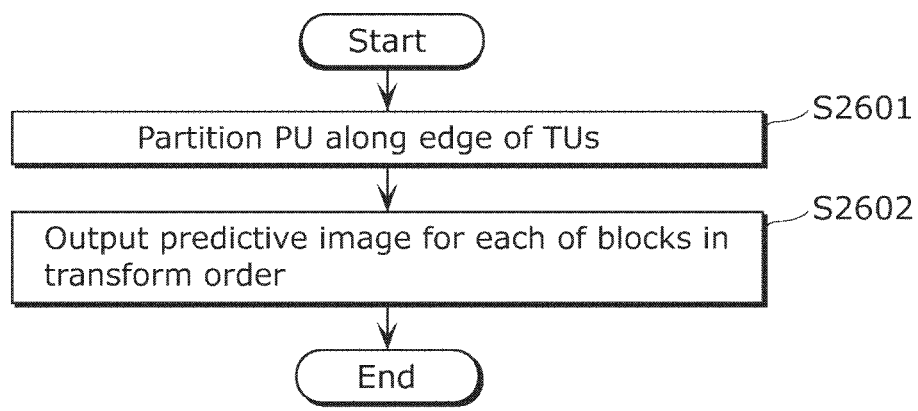
FIG. 27B is a flowchart indicating operations performed by the image processing apparatus according to Embodiment 7.

FIG. 27B is a flowchart indicating operations of the image processing apparatus 2600 in FIG. 27A. First, the partitioning unit 2601 partitions at least one PU into blocks along an edge of TUs (S2601). Next, when the prediction order does not follow a transform order, the predicting unit 2601 outputs a predictive image for each of the blocks in the transform order (S2602).

Accordingly, a larger PU is partitioned along an edge of TUs. Thus, predictive images corresponding to the larger PU are appropriately output in the transform order. Furthermore, the memory capacity necessary for the reconstruction processing at a latter stage is reduced.

FIGS. 28A to 28D illustrate whether or not a prediction order follows a transform order, and the prediction order to be applied to a PU. The values in FIGS. 28A to 28D indicate orders. Furthermore, the TUs and PUs in FIGS. 28A to 28D are hierarchically partitioned. Each of the blocks obtained by partitioning a TU is also a TU. Furthermore, each of the blocks obtained by partitioning a PU is also a PU.

Figure 28A:
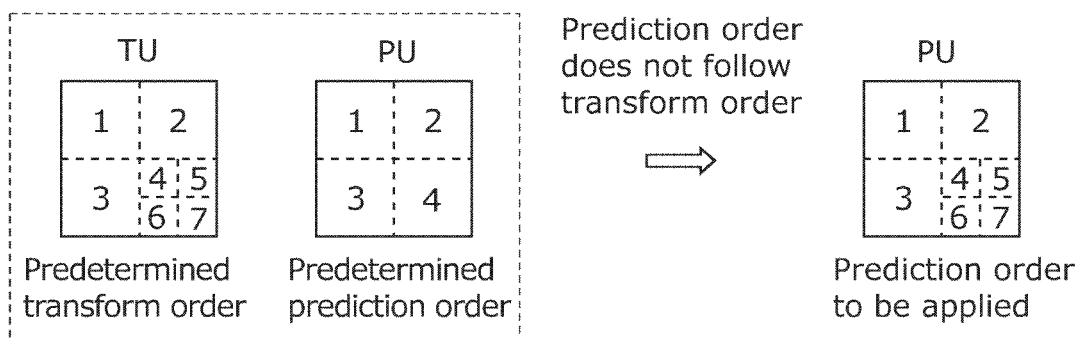
FIG. 28A illustrates a first example of a prediction order according to Embodiment 7.

FIG. 28A illustrates a first example of a prediction order to be used by the image processing apparatus 2600 in FIG. 27A. The prediction order of the fourth PU does not follow the transform order of the fourth to seventh TUs. Thus, the fourth PU is partitioned, and the obtained blocks are processed in the transform order of the TUs.

Figure 28B:
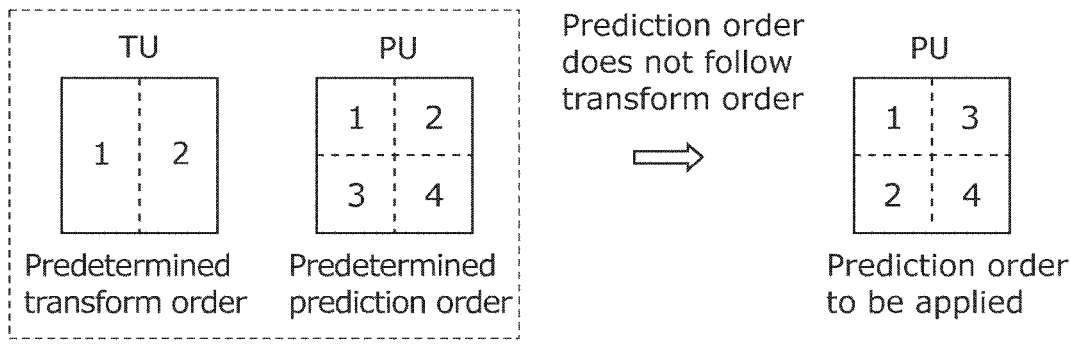
FIG. 28B illustrates a second example of a prediction order according to Embodiment 7.

FIG. 28B illustrates a second example of a prediction order to be used by the image processing apparatus 2600 in FIG. 27A. The prediction order of the second and third PUs does not follow the transform order of the first and second TUs. Thus, the second and third PUs are processed in the transform orders of the first and second TUs.

Figure 28C:
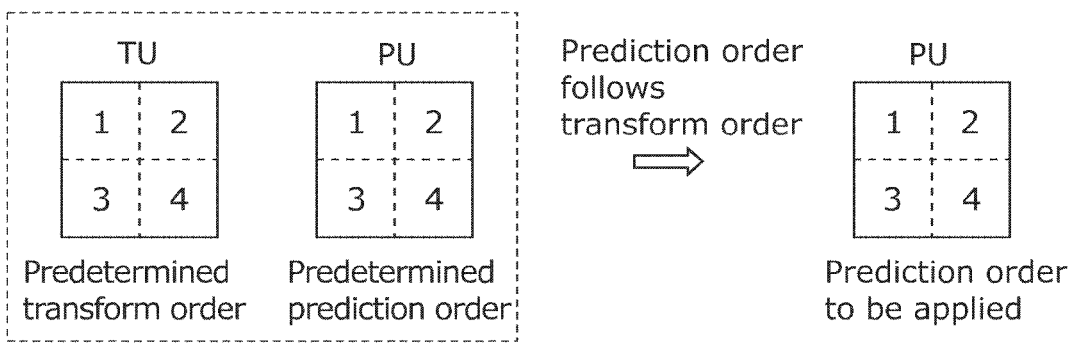
FIG. 28C Illustrates a third example of a prediction order according to Embodiment 7.

FIG. 28C illustrates a third example of a prediction order to be used by the image processing apparatus 2600 in FIG. 27A. The transform order of the first to fourth TUs is identical to the prediction order of the first to fourth PUs. In other words, the prediction order follows the transform order. Thus, the prediction order does not have to be changed.

Figure 28D:
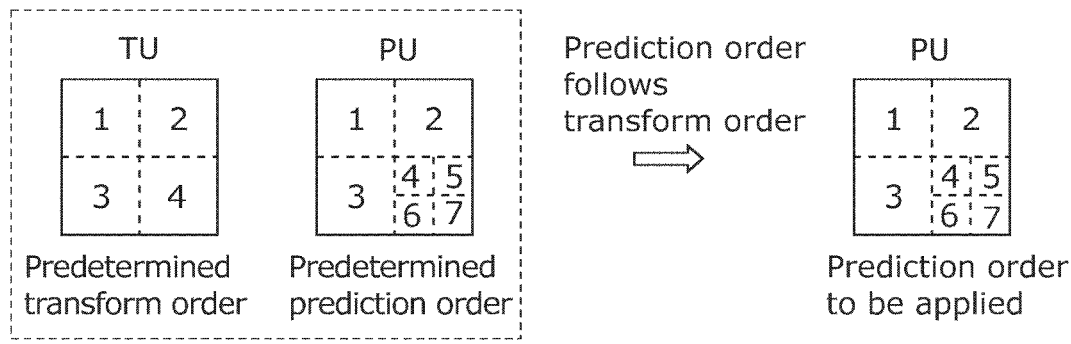
FIG. 28D illustrates a fourth example of a processing order according to Embodiment 7.

FIG. 28D illustrates a fourth example of a prediction order to be used by the image processing apparatus 2600 in FIG. 27A. The prediction order of the fourth to seventh PUs does not follow the transform order of the fourth TU. However, the prediction order of the fourth to seventh PUs is equivalent to the order obtained by partitioning the transform order of the fourth TU. Thus, the prediction order of the fourth to seventh PUs follows the transform order of the fourth TU. Thus, the prediction order does not have to be changed.

As described above, whether or not the prediction order follows the transform order is equivalent to whether or not the prediction order is based on or in accordance with the transform order.

(Embodiment 8)

Figure 29A:
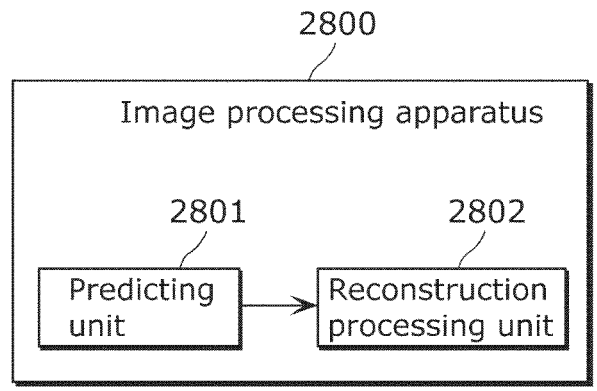
FIG. 29A illustrates a configuration of an image processing apparatus according to Embodiment 8.

FIG. 29A illustrates a configuration of an image processing apparatus 2800 according to Embodiment 8. The image processing apparatus 2800 in FIG. 29A decodes an image coded in coding processes similarly as the image processing apparatus 2400 according to Embodiment 5. The coding processes include prediction on at least one PU, and frequency transform on TUs included in a region including the at least one PU.

The image processing apparatus 2800 includes a predicting unit 2801 and a reconstruction processing unit 2802. The predicting unit 2801 corresponds to the predicting unit 2401 according to Embodiment 5. Furthermore, the reconstruction processing unit 2802 corresponds to the reconstructing unit 508 according to Embodiment 1.

Figure 29B:
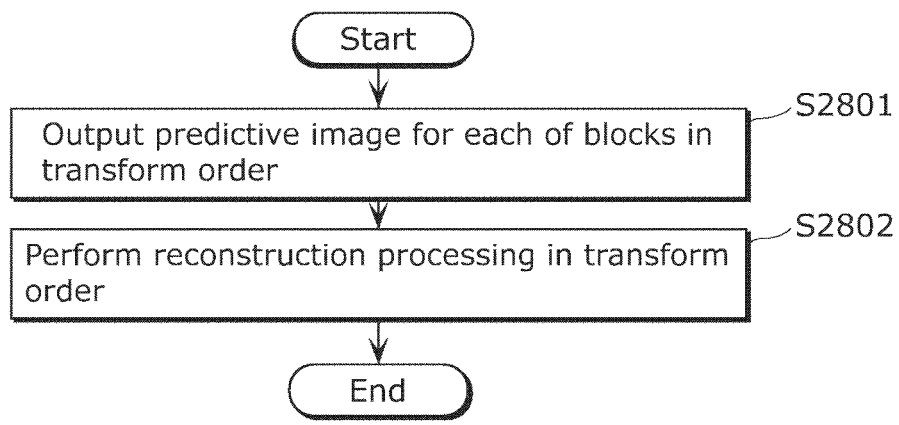
FIG. 29B is a flowchart indicating operations performed by the image processing apparatus according to Embodiment 8.

FIG. 29B is a flowchart indicating operations of the image processing apparatus 2800 in FIG. 29A. First, when the prediction order does not follow a transform order, the prediction unit 2801 outputs predictive images for each of blocks in the transform order (S2801). Next, the reconstruction processing unit 2802 performs the reconstruction processing for each of the blocks in the transform order (S2802).

Accordingly, the image processing apparatus 2800 can start the reconstruction processing earlier. Thus, the image processing apparatus 2800 can reduce delay occurring in the image processing.

(Embodiment 9)

Figure 30A:
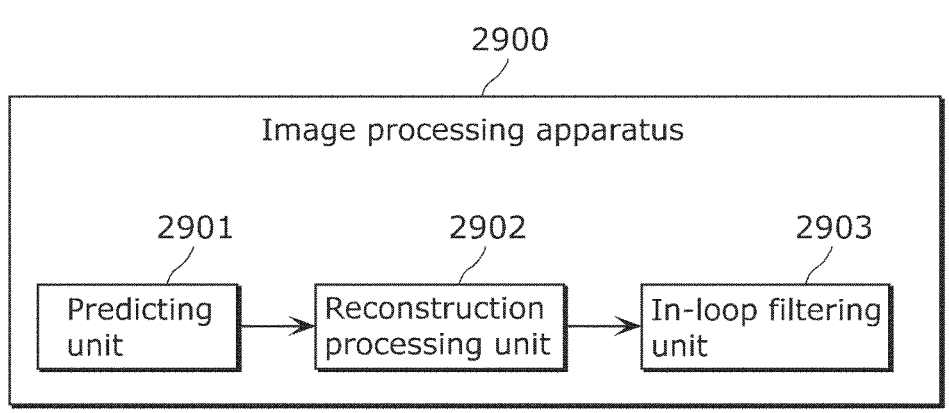
FIG. 30A Illustrates a configuration of an image processing apparatus according to Embodiment 9.

FIG. 30A illustrates a configuration of an image processing apparatus 2900 according to Embodiment 9. The image processing apparatus 2900 in FIG. 30A decodes an image coded in coding processes similarly as the image processing apparatus 2400 according to Embodiment 5. The coding processes include prediction on at least one PU, and frequency transform on TUs included in a region including the at least one PU.

The image processing apparatus 2900 includes a predicting unit 2901, a reconstruction processing unit 2902, and an in-loop filtering unit 2903. The predicting unit 2901 corresponds to the predicting unit 2401 according to Embodiment 5. Furthermore, the reconstruction processing unit 2902 corresponds to the reconstructing unit 508 according to Embodiment 1. Furthermore, the in-loop filtering unit 2903 corresponds to the in-loop filtering unit 510 according to Embodiment 1.

Figure 30B:
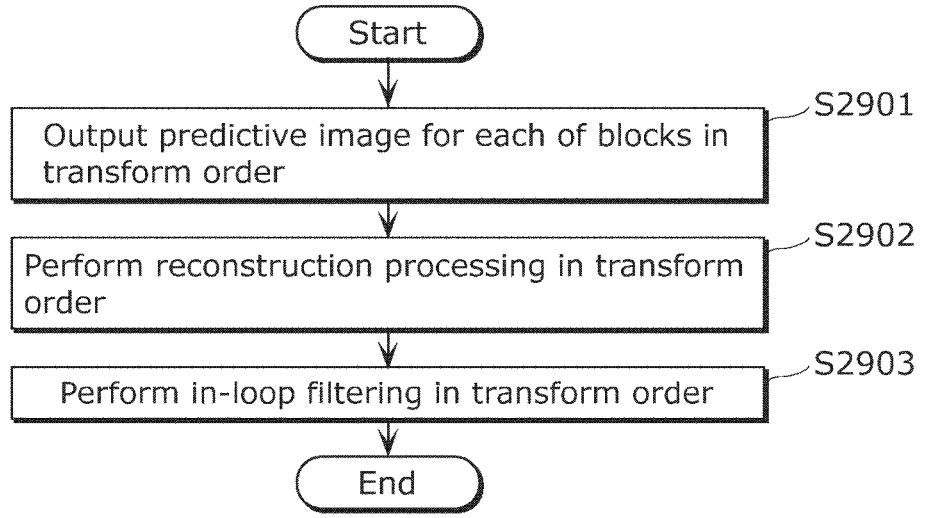
FIG. 30B is a flowchart indicating operations performed by the image processing apparatus according to Embodiment 9.

FIG. 30B is a flowchart indicating operations of the image processing apparatus 2900 in FIG. 30A. First, when the prediction order does not follow a transform order, the predicting unit 2901 outputs predictive images for each of the blocks in the transform order (S2901). Next, the reconstruction processing unit 2902 performs the reconstruction processing for each of the blocks in the transform order (S2902). Next, the in-loop filtering unit 2903 performs the in-loop filtering for each of the blocks in the transform order (S2903).

Accordingly, the image processing apparatus 2900 can start the in-loop filtering earlier. Thus, the image processing apparatus 2900 can reduce delay occurring in the image processing.

The in-loop filtering unit 2903 may store, in a frame memory, the image data obtained by performing the in-loop filtering, for each of the blocks in the transform order. Accordingly, the image processing apparatus 2900 can start the in-loop filtering earlier. Thus, the image processing apparatus 2900 can accelerate a series of pipeline processes.

(Embodiment 10)

Figure 31A:
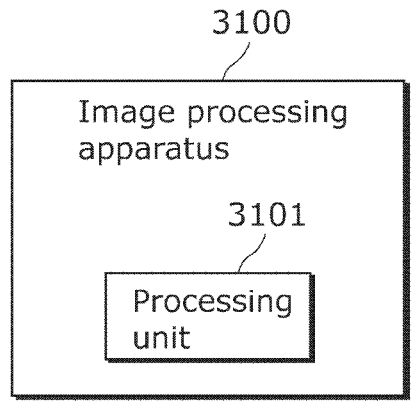
FIG. 31A illustrates a configuration of an image processing apparatus according to Embodiment 10.

FIG. 31A illustrates a configuration of an image processing apparatus 3100 according to Embodiment 10. The image processing apparatus 3100 in FIG. 31A decodes an image coded in coding processes. The coding processes include prediction on at least one PU, and frequency transform on TUs included in a region including the at least one PU.

The image processing apparatus 3100 includes a processing unit 3101. The processing unit 3101 corresponds to, for example, the motion compensation unit 506, the intra prediction unit 507, and others according to Embodiment 1. Furthermore, the processing unit 3101 may correspond to the reconstructing unit 508 according to Embodiment 1.

Figure 31B:
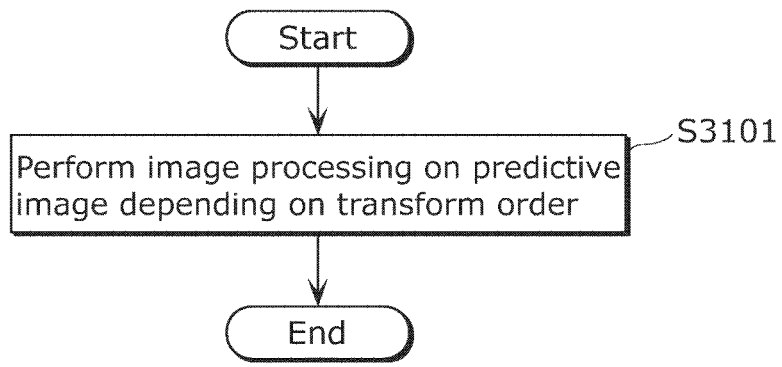
FIG. 31B is a flowchart indicating operations performed by the image processing apparatus according to Embodiment 10.

FIG. 31B is a flowchart indicating an operation of the image processing apparatus 3100 in FIG. 31A. The processing unit 3101 performs image processing on a predictive image of at least one PU depending on a predetermined transform order of TUs (S3101).

Accordingly, the pipeline processing can be smoothly performed. In other words, the image processing apparatus 3100 can reduce the wait time in the pipeline processing, and delay in the processing.

The image processing on a predictive image is processing for dealing with the predictive image. Examples of the image processing include obtaining information for generating the predictive image, generating the predictive image, outputting the predictive image, reconstructing an image using the predictive image, and a combination of these processes. The processing unit 3101 may generate a predictive image by performing motion compensation or intra prediction.

Furthermore, the processing unit 3101 according to Embodiment 10 may perform other processes. For example, the processing unit 3101 may perform the inverse frequency transform on TUs in a transform order. Furthermore, the image processing apparatus 3100 or the processing unit 3101 may include part or all of the constituent elements described in other Embodiments. Furthermore, the image processing apparatus 3100 or the processing unit 3101 may be included in one of the constituent elements described in the other Embodiments.

Furthermore, the processing unit 3101 may obtain a transform order, and perform image processing in the obtained transform order. For example, the processing unit 3101 obtains information indicating a transform order, and performs image processing in the transform order indicated by the obtained information. Furthermore, the processing unit 3101 may determine an order of the image processing according to a transform order, and perform image processing in the determined order. Furthermore, the processing unit 3101 may perform image processing for blocks smaller than or equal to TUs in a transform order.

Furthermore, when a prediction order predetermined for at least one PU does not follow a transform order, the processing unit 3101 may perform image processing in the transform order. Furthermore, when a prediction order is not predetermined for at least one PU, the processing unit 3101 may perform image processing in the transform order. Furthermore, when an edge format for TUs is different from that for at least one PU, the processing unit 3101 may perform image processing in a transform order.

Furthermore, the processing unit 3101 may perform, in a transform order, the in-loop filtering that is filtering for a reconstructed image. Furthermore, the processing unit 3101 may store, in a frame memory according to a transform order, images in which the in-loop filtering have been performed.

(Embodiment 11)

Figure 32A:
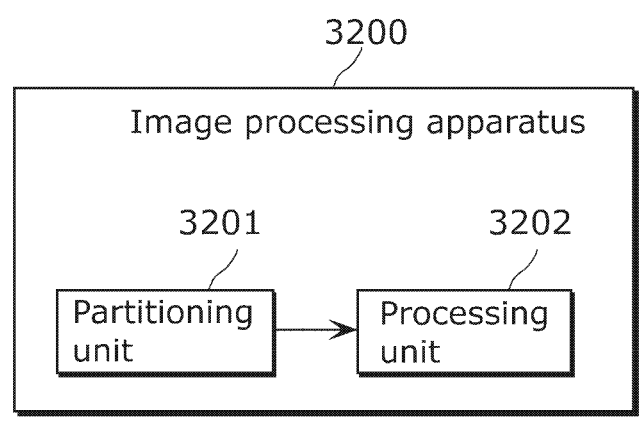
FIG. 32A illustrates a configuration of an image processing apparatus according to Embodiment 11.

FIG. 32A illustrates a configuration of an image processing apparatus 3200 according to Embodiment 11. The image processing apparatus 3200 in FIG. 32A decodes an image coded in coding processes similarly as the image processing apparatus 3100 according to Embodiment 10. The coding processes include prediction on at least one PU, and frequency transform on TUs included in a region including the at least one PU.

The image processing apparatus 3200 includes a partitioning unit 3201 and a processing unit 3202. The processing unit 3202 corresponds to the processing unit 3101 according to Embodiment 10.

Figure 32B:
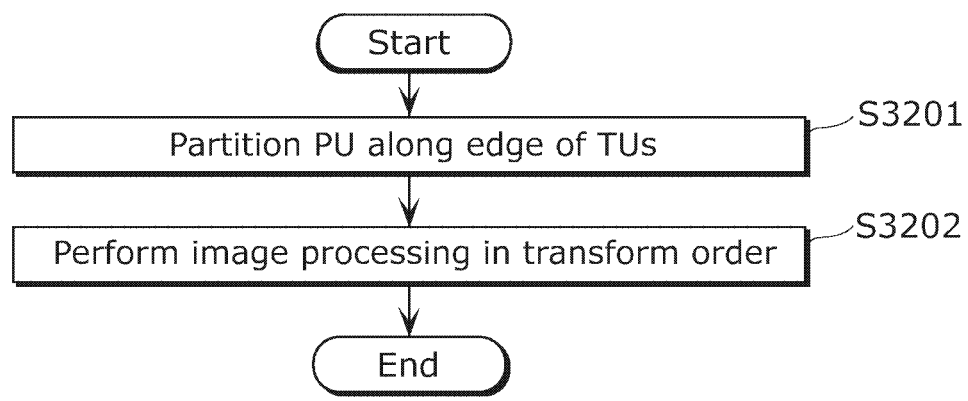
FIG. 32B is a flowchart indicating operations performed by the image processing apparatus according to Embodiment 11.

FIG. 32B is a flowchart indicating operations of the image processing apparatus 3200 in FIG. 32A. First, the partitioning unit 3201 partitions at least one PU into blocks along an edge of TUs (S3201). Next, the processing unit 3202 performs image processing, for predictive images, on the blocks in a transform order (S3202).

Accordingly, a larger PU is partitioned along an edge of TUs. Thus, the image processing on a predictive image that is a larger PU is appropriately performed in the transform order.

Here, the partitioning unit 3201 may partition one PU into blocks along an edge of TUs. The partitioning unit 3201 may partition PUs included in a CU into blocks along an edge of TUs.

(Embodiment 12)

Figure 33A:
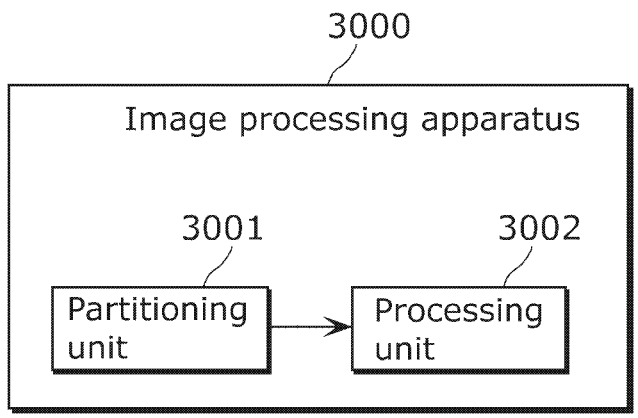
FIG. 33A illustrates a configuration of an image processing apparatus according to Embodiment 12.

FIG. 33A illustrates a configuration of an image processing apparatus 3000 according to Embodiment 12. The image processing apparatus 3000 in FIG. 33A decodes an image coded in coding processes. The coding processes include intra prediction of generating a predictive image corresponding to a PU in a prediction mode of the PU.

The image processing apparatus 3000 includes a partitioning unit 3001 and a processing unit 3002. The processing unit 3002 corresponds to the intra prediction unit 507 according to Embodiment 1 and others.

Figure 33B:
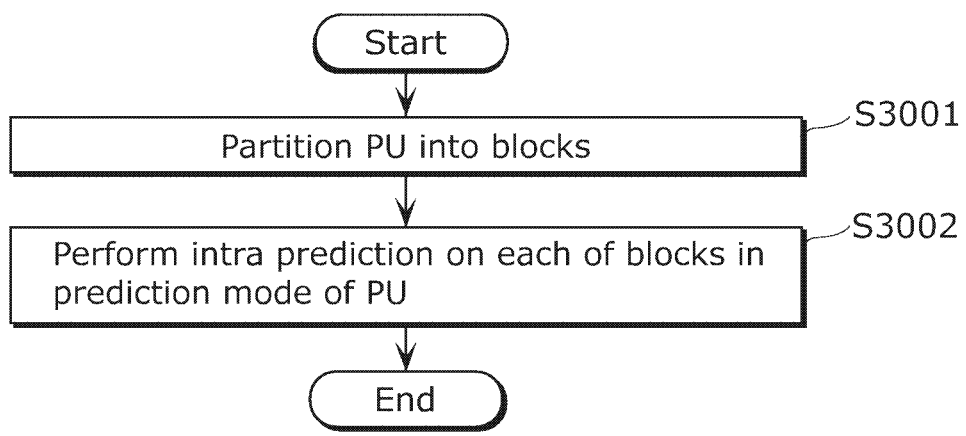
FIG. 33B is a flowchart indicating operations performed by the image processing apparatus according to Embodiment 12.

FIG. 33B is a flowchart indicating operations of the image processing apparatus 3000 in FIG. 33A. First, the partitioning unit 3001 partitions a PU into blocks (S3001). Then, the processing unit 3002 performs intra prediction on each of the blocks in a prediction mode of the PU (S3002).

Accordingly, the image processing apparatus 3000 can start the intra prediction on a smaller data unit basis. Thus, the image processing apparatus 3000 can perform pipeline processing on the smaller data unit basis. Furthermore, the image processing apparatus 3000 can reduce delay occurring in the image processing.

Here, the constituent elements described in the other Embodiments may be added to the image processing apparatus 3000 according to Embodiment 12. Furthermore, the image processing apparatus 3000 may be included in one of the constituent elements described in the other Embodiments.

Furthermore, each of the constituent elements according to each of Embodiments 1 to 12 may be implemented by dedicated hardware or by executing a software program appropriate for the constituent element. Each of the constituent elements may be implemented by a program executing unit, such as a CPU and a processor, reading and executing the software program recorded on a hard disk or a semiconductor memory. Here, the software that implements the image processing apparatus according to each of Embodiments 1 to 12 is the following program.

In other words, the program causes a computer to execute an image processing method for decoding an image coded in coding processes including (i) prediction on at least one prediction unit (PU) and (ii) frequency transform on transform units (TUs) included in a region including the at least one PU, and the image processing method includes performing image processing for a predictive image of the at least one PU, depending on a transform order predetermined for the TUs.

Although the image processing apparatuses according to one or more aspects of the present invention are described based on Embodiments 1 to 12, the present invention is not limited by these Embodiments. Without departing from the scope of the present invention, the aspects of the present invention include an embodiment with some modifications on Embodiments that are conceived by a person skilled in the art, and another embodiment obtained through combinations of the constituent elements of different Embodiments.

For example, processing to be performed by a specific processing unit may be performed by another processing unit. Furthermore, an order to perform processes may be changed, or the processes may be performed in parallel.

Furthermore, the present invention can be implemented not only as an image processing apparatus but also as a method using the processing units included in the image processing apparatus as steps. For example, these steps are performed by a computer. Then, the present invention can be implemented also as a program causing a computer to execute the steps included in the method. Furthermore, the present invention can be implemented as a computer-readable recording medium on which the program is recorded, such as a CD-ROM.

Furthermore, the image processing apparatus and the image processing method according to the present invention are applicable to an image coding apparatus, an image decoding apparatus, an image coding method, and an image decoding method.

Furthermore, the constituent elements included in the image processing apparatus may be implemented as an integrated circuit that is a Large Scale Integration (LSI). Each of the constituent elements may be made into one chip individually, or a part or an entire thereof may be made into one chip. For example, the constituent elements other than a memory may be made into one chip. The name used here is LSI, but it may also be called integrated circuit (IC), system LSI, super LSI, or ultra LSI depending on the degree of integration.

Moreover, ways to achieve integration are not limited to the LSI, and a special circuit or a general purpose processor can also achieve the integration. Field Programmable Gate Array (FPGA) that can be programmed or a reconfigurable processor that allows re-configuration of the connection or configuration of an LSI can be used for the same purpose.

In the future, with advancement in semiconductor technology, a brand-new technology may replace LSI. The constituent elements included in the image processing apparatus can be integrated using such a technology.

(Embodiment 13)

Furthermore, by recording a program, which realizes the image coding method and the image decoding method described in each of Embodiments 1 to 12, onto a recording medium, it is possible to easily perform the processing as described in Embodiment in an independent computer system. The recording medium may be any mediums, such as a magnetic disk, an optical disk, a magnet-optical disk, an integrated circuit (IC) card, and a semiconductor memory, as far as a program can be recorded on the mediums.

Furthermore, applications of the image coding method and the image decoding method described in each of Embodiments 1 to 12, and a system using such applications are described below.

Figure 34:
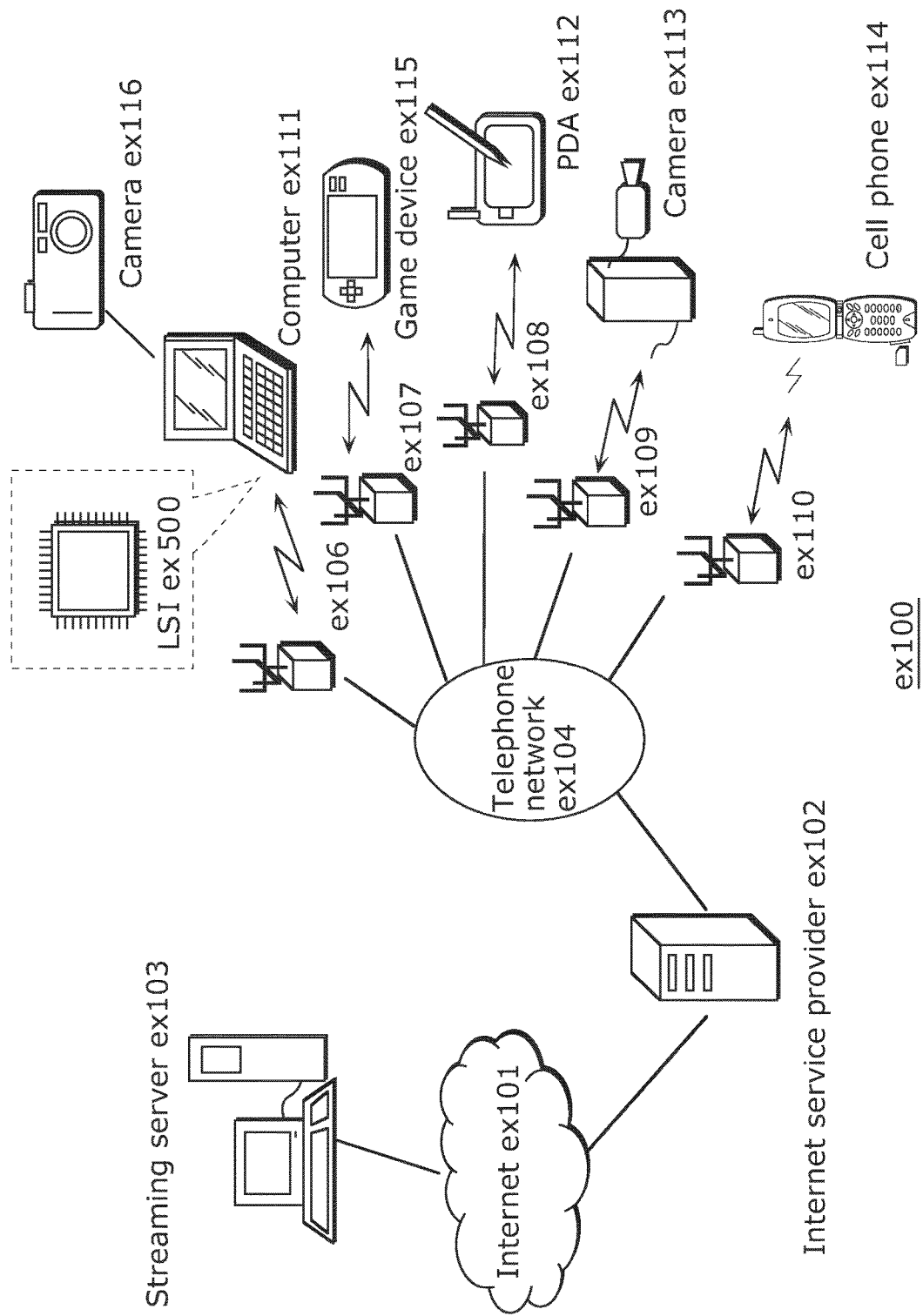
FIG. 34 is a diagram showing an overall configuration of a content supply system for implementing content distribution service.

FIG. 34 is a block diagram showing the overall configuration of a content supply system ex100 for realizing content distribution service. The area for providing communication service is divided into cells of desired size, and base stations ex106 to ex110 which are fixed wireless stations are placed in respective cells.

In this content supply system ex100, various devices such as a computer ex111, a Personal Digital Assistant (PDA) ex112, a camera ex113, a cell phone ex114 and a game device ex115 are connected to one another, via a telephone network ex104 and base stations ex106 to ex110. Furthermore, the various devices are connected to the Internet ex101 via an Internet service provider ex102.

However, the content supply system ex100 is not limited to the combination as shown in FIG. 34, and may include a combination of any of these devices which are connected to each other. Also, each device may be connected directly to the telephone network ex104, not through the base stations ex106 to ex110 which are the fixed wireless stations. Furthermore, the devices may be connected directly to one another via Near Field Communication (NFC) or the like.

The camera ex113 is a device such as a digital video camera capable of shooting moving images. The camera ex116 is a device such as a digital video camera capable of shooting still images and moving images. The cell phone ex114 may be any of a cell phone of a Global System for Mobile Communications (GSM) system, a Code Division Multiple Access (CDMA) system, a Wideband-Code Division Multiple Access (W-CDMA) system, a Long Term Evolution (LTE) system, a High Speed Packet Access (HSPA) system, a Personal Handy-phone System (PHS), and the like.

In the content supply system ex100, the camera ex113 is connected to a streaming server ex103 via the base station ex109 and the telephone network ex104, which realizes live distribution or the like. In the live distribution, the coding as according to Embodiments 1 to 12 is performed for a content (such as a video of a live music performance) shot by a user using the camera ex113, and the coded content is provided to the streaming server ex103. On the other hand, the streaming server ex103 makes steam distribution of the received content data to the clients at their requests. The clients include the computer ex111, the PDA ex112, the camera ex113, the cell phone ex114, the game device ex115, and the like, capable of decoding the above-mentioned coded data. Each device receiving the distributed data decodes the received data to be reproduced.

Here, the coding of the data shot by the camera may be performed by the camera ex113, the streaming server ex103 for transmitting the data, or the like. Likewise, either the client or the streaming server ex103 may decode the distributed data, or both of them may share the decoding. The still image and/or moving image data shot by the camera ex116 may be transmitted not only to the camera ex113 but also to the streaming server ex103 via the computer ex111. In this case, either the camera ex116, the computer ex111, or the streaming server ex103 may perform the coding, or all of them may share the coding.

It should be noted that the above-described coding and the decoding are performed by a Large Scale Integration (LSI) ex500 generally included in each of the computer ex111 and the devices. The LSI ex500 may be implemented as a single chip or a plurality of chips. It should be noted that software for coding and decoding images may be integrated into any type of a recording medium (such as a CD-ROM, a flexible disk and a hard disk) that is readable by the computer ex111 or the like, so that the coding and decoding are performed by using the software. Furthermore, if the cell phone ex114 is a camera-equipped cell phone, it may transmit generated moving image data. This moving image data is the data coded by the LSI ex500 included in the cell phone ex114.

It should be noted that the streaming server ex103 may be implemented as a plurality of servers or a plurality of computers, so that data is divided into pieces to be processed, recorded, and distributed separately.

As described above, the content supply system ex100 enables the clients to receive and reproduce coded data. Thus, in the content supply system ex100, the clients can receive information transmitted by the user, then decode and reproduce it, so that the user without specific rights or equipment can realize individual broadcasting.

Figure 35:
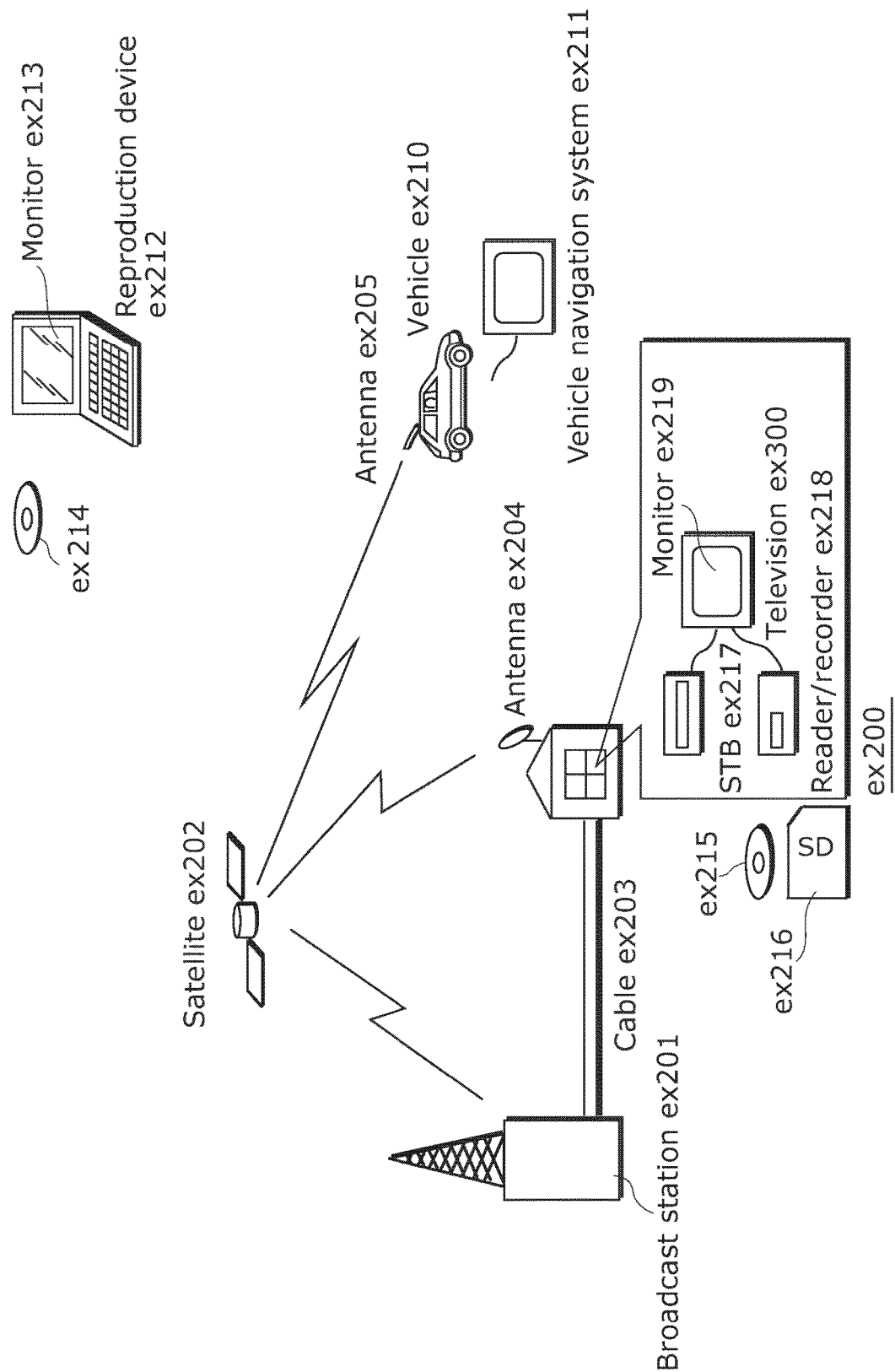
FIG. 35 is a diagram showing an overall configuration of a digital broadcast system.

The present invention is not limited to the example of the content supply system ex100. At least either the image coding apparatus or the image processing apparatus in Embodiments 1 to 12 can be incorporated into the digital broadcast system ex200 as shown in FIG. 35. More specifically, a bit stream of video information is transmitted from a broadcast station ex201 to a communication or broadcast satellite ex202 via radio waves. The bitstream is a coded bitstream generated by the image coding method described in Embodiments 1 to 12. Upon receipt of it, the broadcast satellite ex202 transmits radio waves for broadcasting, and a home antenna ex204 with a satellite broadcast reception function receives the radio waves. A device such as a television (receiver) ex300 or a Set Top Box (STB) ex217 decodes the coded bit stream for reproduction.

The image processing apparatus described in Embodiments 1 to 12 can be implemented in a reproduction device ex212 for reading and decoding a coded bit stream recorded on a recording medium ex214 such as a CD and DVD that is a recording medium. In this case, the reproduced video signals are displayed on a monitor ex213.

The image processing apparatus or the image coding apparatus described in Embodiments 1 to 12 can be implemented in a reader/recorder ex218 for reading and decoding a coded bitstream recorded on a recording medium ex215 such as a DVD and a BD or for coding and writing video signals into the recording medium ex215. In this case, the reproduced video signals are displayed on a monitor ex219, and the recording medium ex215, on which the coded bitstream is recorded, allows a different device of system to reproduce the video signals. It is also conceived to implement the image processing apparatus in the set top box ex217 connected to a cable ex203 for cable television or the antenna ex204 for satellite and/or terrestrial broadcasting so as to reproduce them on a monitor ex219 of the television. The image processing apparatus may be Incorporated into the television, not in the set top box.

Figure 36:
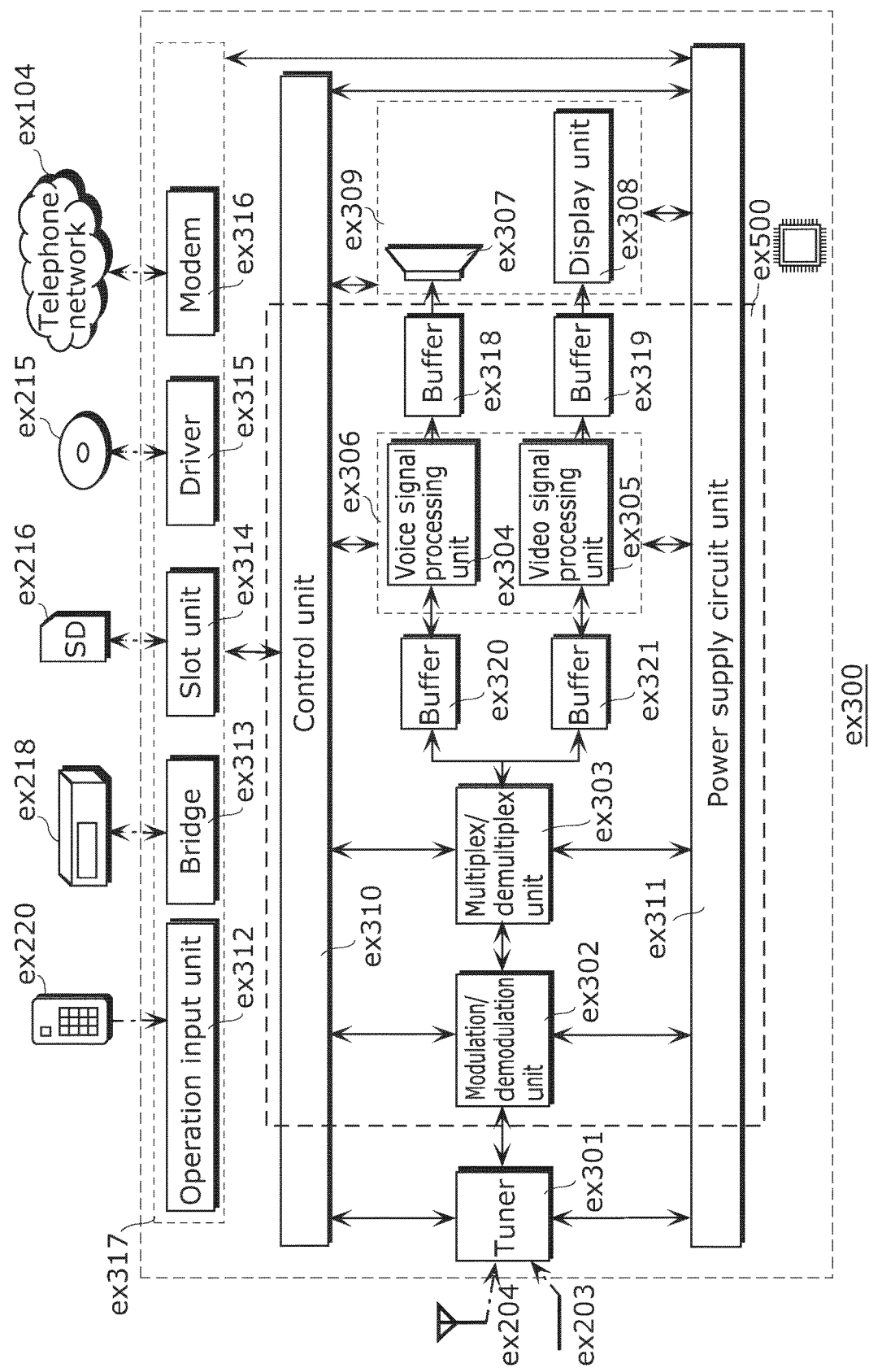
FIG. 36 is a block diagram showing a structure example of a television.

FIG. 36 is a diagram showing a television (receiver) ex300 using the image decoding method described in Embodiments 1 to 12. The television ex300 includes: a tuner ex301 that receives or outputs a bitstream of video Information via the antenna ex204, the cable ex203, or the like that receives the above broadcasting; a modulation/demodulation unit ex302 that demodulates the received coded data or modulates generated coded data to be transmitted to the outside; and a multiplex/demultiplex unit ex303 that demultiplexes the modulated video data from the modulated voice data or multiplexes the coded video data and the coded voice data.

In addition, the television ex300 includes: a signal processing unit ex306 having (a) a voice signal processing unit ex304 that decodes or codes voice data and (b) a video signal processing unit ex305 that decodes or codes video data; and an output unit ex309 having (c) a speaker ex307 that outputs the decoded voice signal and (d) a display unit ex308, such as a display, that displays the decoded video signal. Furthermore, the television ex300 includes an interface unit ex317 having an operation input unit ex312 that receives inputs of user operations, and the like. Moreover, the television ex300 includes: a control unit ex310 for the overall controlling of the respective units; and a power supply circuit unit ex311 that supplies the respective units with power.

In addition to the operation input unit ex312, the interface unit ex317 may include: a bridge ex313 connected to external devices such as the reader/recorder ex218; a slot unit ex314 enabling the recording medium ex216 such as a SD card to be attached to the interface unit ex317; a driver ex315 for connecting to an external recording medium such as a hard disk; a modem ex316 connected to a telephone network; and the like. It should be noted that the recording medium ex216 enables information to be electrically recorded on a stored nonvolatile/volatile semiconductor memory device.

The units in the television ex300 are connected to one another via a synchronous bus.

First, the description is given for the structure by which the television ex300 decodes and reproduces data received from the outside via the antenna ex204 or the like. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, in the television ex300, the audio signal processing unit ex304 decodes the demultiplexed audio data, and the video signal processing unit ex305 decodes the demultiplexed video data, using the decoding method described in each of Embodiments 1 to 12. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disk, and a SD card.

Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments 1 to 12. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other.

Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of coding, multiplexing, and providing outside data but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 37:
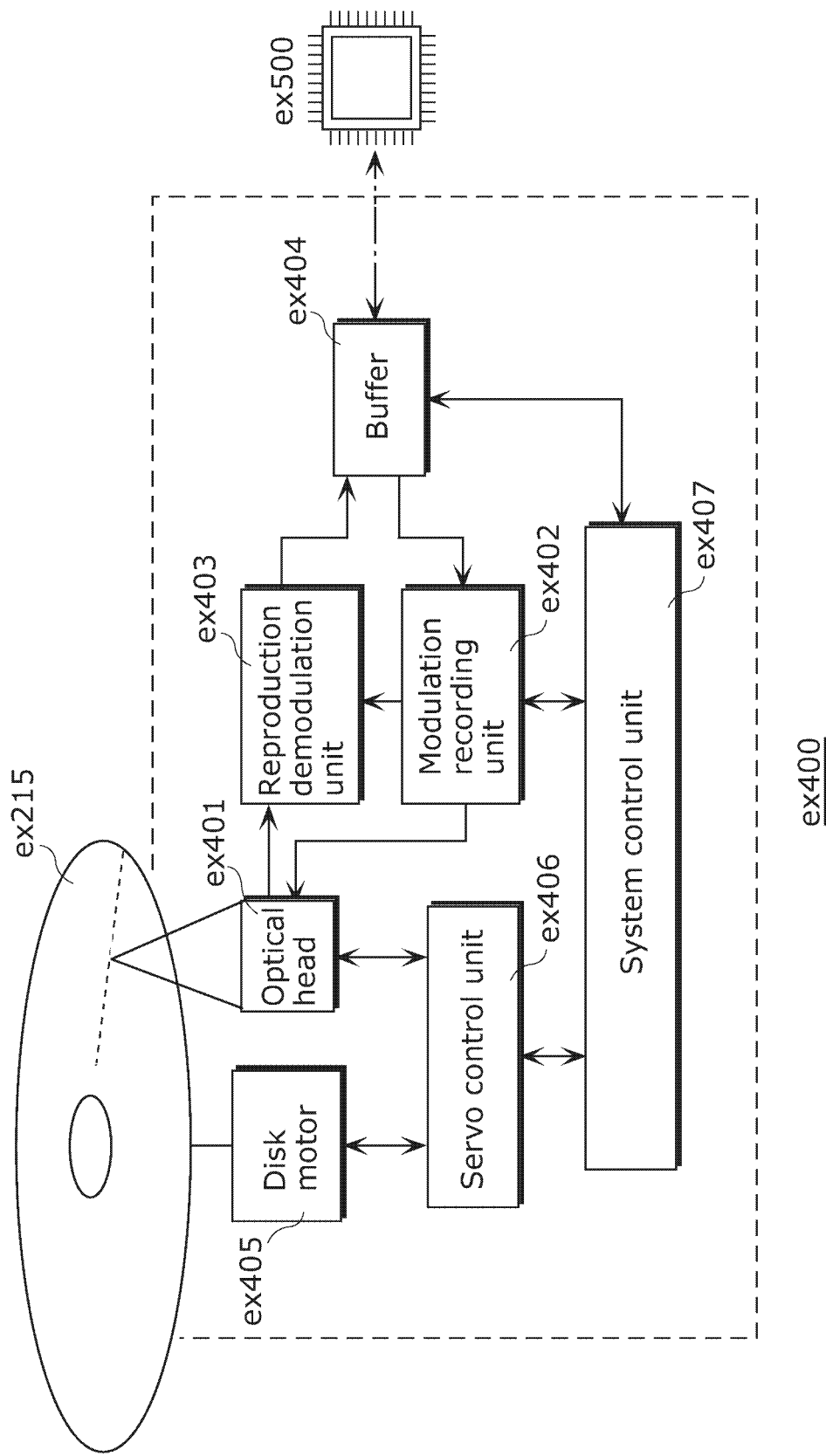
FIG. 37 is a block diagram illustrating a structure example of an information reproduction/recording unit which reads/writes information from/to a recording medium that is an optical disc.

As an example, FIG. 37 illustrates a configuration of an information reproducing/recording unit ex400 when data is read or written from or in an optical disk. The information reproducing/recording unit ex400 includes constituent elements ex401 to ex407 to be described hereinafter.

The optical head ex401 irradiates a laser spot on a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot.

The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 38:
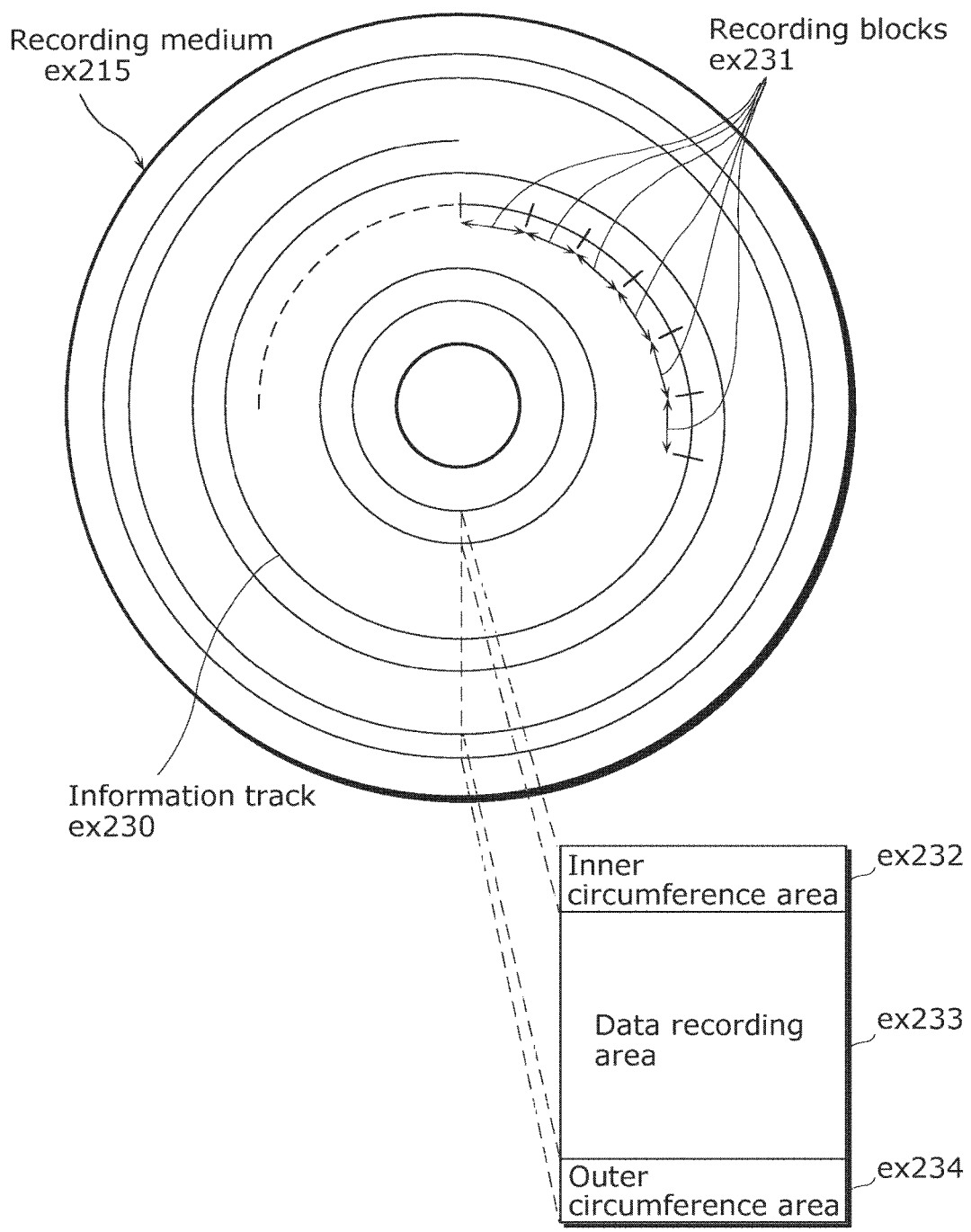
FIG. 38 is a diagram showing a structure example of the recording medium that is an optical disc.

FIG. 38 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data.

The information reproducing/recording unit 400 reads and writes coded audio data, coded video data, or coded data obtained by multiplexing the coded audio data and the coded video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be a configuration, for example, including a GPS receiving unit from the configuration illustrated in FIG. 36. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in each of Embodiments 1 to 12 can be used in any of the devices and systems described. Thus, the advantages described in Embodiments can be obtained.

Furthermore, the present invention is not limited to Embodiments, and various modifications and revisions are possible without departing from the scope of the present invention.

(Embodiment 14)

Figure 39:
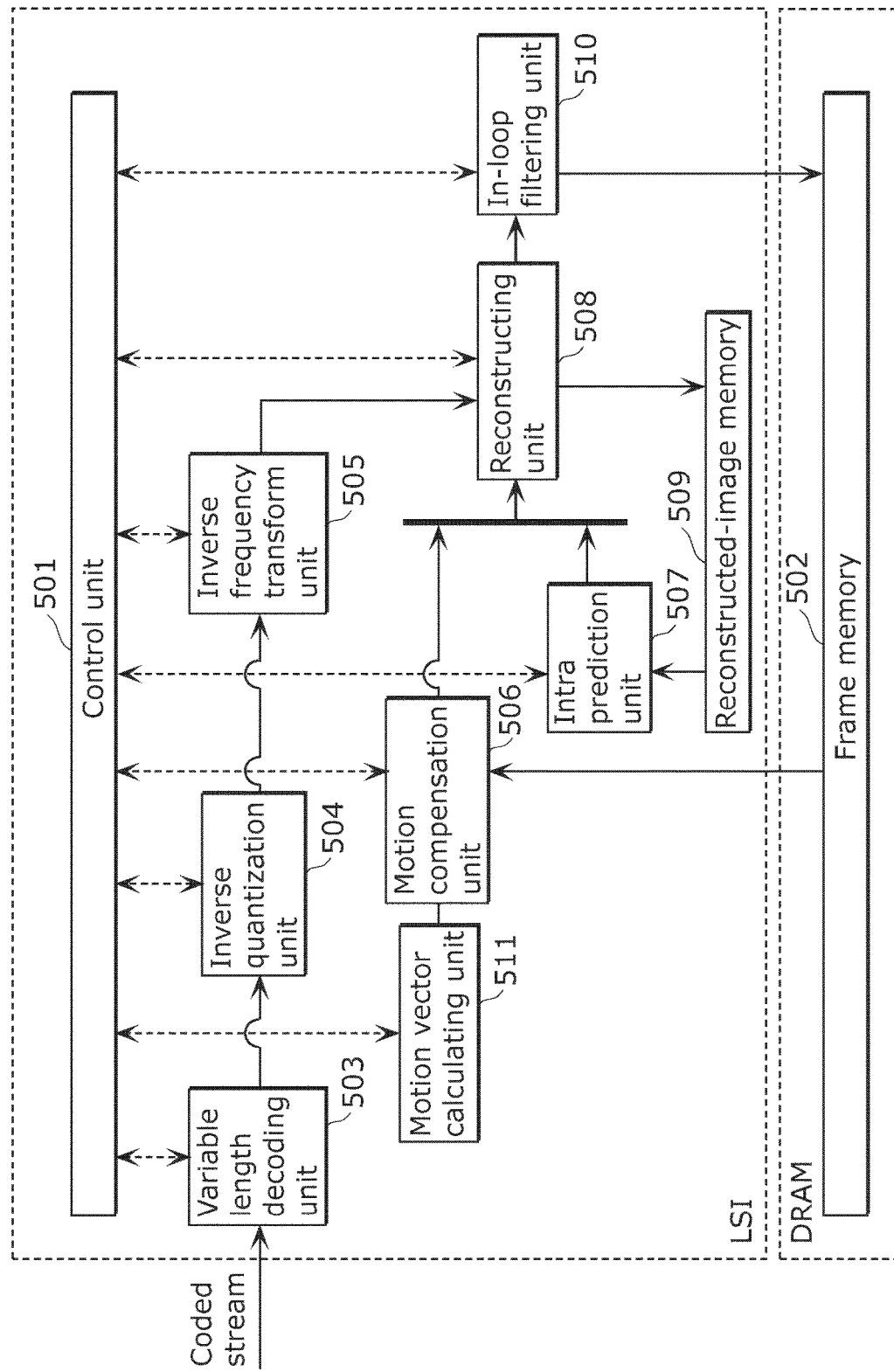
FIG. 39 illustrates a structure example of an integrated circuit that implements image decoding processing.

The image processing apparatus according to Embodiment 1 is typically implemented as an LSI that is a semiconductor integrated circuit. FIG. 39 illustrates a configuration of Embodiment 14. The frame memory 502 is implemented into a DRAM and the other circuits and memories are implemented into the LSI. The bitstream buffer that stores a coded stream may be implemented into a DRAM.

Each of the elements may be made into one chip individually, or a part or an entire there of may be made into one chip. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

In addition, a combination of a semiconductor chip obtained by integrating the image processing apparatus according to Embodiments and a display for drawing images may configure a drawing apparatus for various uses. The present invention can be applied to an information drawing unit in a cellular phone, a television, a digital video recorder, a digital video camera, and a car navigation system. The displays may be combined with not only a cathode-ray tube (CRT) but also a flat display, such as a liquid crystal display, a plasma display panel (PDP), an organic EL device, and a projection display represented by a projector.

Furthermore, the LSI according to Embodiments 1 to 13 may perform coding and decoding processes in coordination with a bitstream buffer that stores coded streams and a Dynamic Random Access Memory (DRAM) including a frame memory that stores images. Furthermore, the LSI according to Embodiment 14 may be in coordination with not the DRAM but an eDRAM (embeded DRAM), Static Random Access Memory (SRAM), or other storage devices, such as hard disk.

(Embodiment 15)

Figure 40:
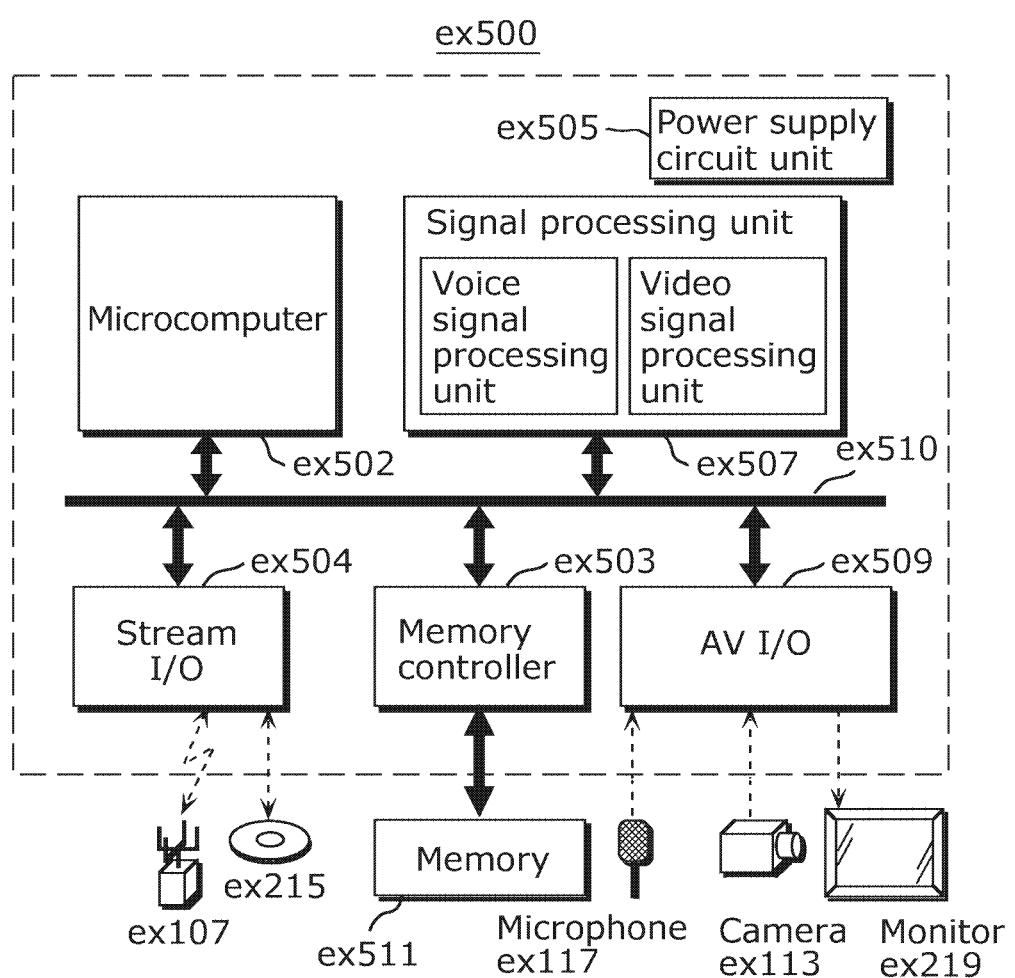
FIG. 40 illustrates a structure example of an integrated circuit that implements image decoding and coding processing.

Each of the image coding apparatus, the image processing apparatus, the image coding method, and the image decoding method in each of Embodiments 1 to 14 is typically implemented by a LSI that is an integrated circuit. As an example, FIG. 40 illustrates a configuration of an LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an input of an AV signal from a microphone ex117, a camera ex113, and others through an AV IO ex509. The received AV signal is temporarily stored in a memory ex511 outside the LSI ex500, such as an SDRAM. The stored data is subdivided into data portions according to the processing amount and speed as necessary. Then, the data portions are transmitted to a signal processing unit ex507. The signal processing unit ex507 codes an audio signal and/or a video signal. Here, the coding of the video signal is the coding described in Embodiments 1 to 14. Furthermore, the signal processing unit ex507 sometimes multiplexes the coded audio data and the coded video data, and a stream I/O ex504 provides the multiplexed data outside. The provided bit stream is transmitted to a base station ex107, or written into the recording medium ex215.

For example, when coded data is decoded, the LSI ex500 temporarily stores, in the memory ex511, the coded data obtained from the base station ex107 through the stream I/O ex504 or read from the recording medium ex215 under control of a microcomputer ex502. The stored data is subdivided into data portions according to the processing amount and speed as necessary, under control of the microcomputer ex502. Then, the data portions are transmitted to the signal processing unit ex507 to decode the audio data and/or the video data. Here, the decoding of the video signal is the decoding described in Embodiments 1 to 14. Furthermore, a decoded audio signal and a decoded video signal may be temporarily stored in the buffer ex511 and others so that the signals can be reproduced in synchronization with each other. The decoded output signals are provided from the AV IO ex509 to the monitor ex219 through the memory ex511 as necessary. The LSI ex500 has the configuration in which the memory ex511 is accessed through the memory controller ex503.

Although the memory ex511 is an element outside the LSI ex500 in the description, it may be included in the LSI ex500. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. A Field Programmable Gate Array (FPGA) that is programmable after manufacturing an LSI or a reconfigurable processor allowing re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

INDUSTRIAL APPLICABILITY

The present invention is applicable to various uses. For example, the present invention is applicable to information display apparatuses and image capturing apparatuses, for example, a television, a digital video recorder, a car navigation system, a mobile phone, a digital camera, a digital video camera, and is highly suitable for practical use.

REFERENCE SIGNS LIST 501, ex310 Control unit
502 Frame memory
503 Variable length decoding unit
504 Inverse quantization unit
505 Inverse frequency transform unit
506 Motion compensation unit
507 Intra prediction unit
508 Reconstructing unit
509 Reconstructed-image memory
510 In-loop filtering unit
511 Motion vector calculating unit
512 DMA control unit
513 Reference image storage unit
514 Predictive image storage unit
515 Prediction mode calculating unit
2302, 2303 Reference surrounding pixels
2400, 2500, 2600, 2800, 2900, 3000, 3100, 3200 Image processing apparatus
2401, 2501, 2602, 2801, 2901 Predicting unit
2511 Information obtaining unit
2512 Predictive image generating unit
2513 Predictive image output unit
2601, 3001, 3201 Partitioning unit
2802, 2902 Reconstruction processing unit
2903 In-loop filtering unit
3002, 3101, 3202 Processing unit
ex100 Content supply system
ex101 Internet
ex102 Internet service provider
ex103 Streaming server
ex104 Telephone network
ex106, ex107, ex108, ex109, ex110 Base station
ex111 Computer
ex112 Personal Digital Assistant (PDA)
ex113. ex116 Camera
ex114 Cell phone
ex115 Game device
ex117 Microphone
ex200 Digital broadcasting system
ex201 Broadcast station
ex202 Broadcast satellite (satellite)
ex203 Cable
ex204, ex205 Antenna
ex210 Car
ex211 Car navigation system
ex212 Reproduction device
ex213, ex219 Monitor
ex214, ex215, ex216 Recording medium
ex217 Set Top Box (STB)
ex218 Reader/recorder
ex220 Remote controller
ex230 Information track
ex231 Recording block
ex232 Inner circumference area
ex233 Data recording area
ex234 Outer circumference area
ex300 Television (receiver)
ex301 Tuner
ex302 Modulation/demodulation unit
ex303 Multiplex/demultiplex unit
ex304 Voice signal processing unit
ex305 Video signal processing unit
ex306, ex507 Signal processing unit
ex307 Speaker
ex308 Display unit
ex309 Output unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321, ex404 Buffer
ex400 Information reproducing/recording unit
ex401 Optical head
ex402 Modulation recording unit
ex403 Reproduction demodulation unit
ex405 Disk motor
ex406 Servo control unit
ex407 System control unit
ex500 LSI
ex502 Microcomputer
ex503 Memory controller
ex504 Stream I/O
ex509 AV I/O
ex510 Bus
ex511 Memory

The invention claimed is:

1. An image processing apparatus for decoding an image coded in coding processes including (i) prediction on at least two prediction units (PUs) and (ii) frequency transform on transform units (TUs) included in a region including the at least two PUs, the image processing apparatus comprising:
a determining circuit configured to determine, for each of the at least two PUs, whether or not at least a part of a boundary line between the TUs is within the PU and not coincident with an edge of the PU;
a partitioning circuit configured to, for each of the at least two PUs, (i) perform partitioning of the PU when it is determined that the PU includes the part of the boundary line between the TUs, and (ii) not partition the PU when it is determined that the PU does not include the part of the boundary line between the TUs, the partitioning being a partitioning of the PU along the part of the boundary line between the TUs into blocks that are each included in the TUs and that are each smaller than each of the TUs; and
an image processor configured to perform image processing, for a predictive image of the at least two PUs, on the blocks in a transform order;
wherein:
each PU is a unit defined as a data unit for the prediction, each TU is a unit defined as a data unit for the frequency transform, and
at least one PU in the image has an edge format different from an edge format for the TUs in the image.

2. The image processing apparatus according to claim 1, wherein the PUs are included in a coding unit (CU) including the TUs.

3. The image processing apparatus according to claim 1, wherein the image processor is configured to generate and output the predictive image in the transform order as the image processing.

4. The image processing apparatus according to claim 1, wherein the image processor is configured to obtain information for generating the predictive image, generate the predictive image using the obtained information, and output the generated predictive image, in the transform order as the image processing.

5. The image processing apparatus according to claim 1, wherein the image processor is configured to output the predictive image generated by motion compensation, in the transform order as the image processing.

6. The image processing apparatus according to claim 1, wherein the image processor is configured to perform motion compensation to generate the predictive image, and output the predictive image, in the transform order as the image processing.

7. The image processing apparatus according to claim 1, wherein the image processor is configured to obtain information for performing motion compensation, perform the motion compensation using the obtained information to generate the predictive image, and output the generated predictive image, in the transform order as the image processing.

8. The image processing apparatus according to claim 1, wherein the image processor is configured to output the predictive image generated by intra prediction, in the transform order as the image processing.

9. The image processing apparatus according to claim 1, wherein the image processor is configured to perform intra prediction to generate the predictive image, and output the generated predictive image, in the transform order as the image processing.

10. The image processing apparatus according to claim 1, wherein the image processor is configured to obtain information for performing intra prediction, perform the intra prediction using the obtained information to generate the predictive image, and output the generated predictive image, in the transform order as the image processing.

11. The image processing apparatus according to claim 1, wherein the image processor is configured to reconstruct the image using the predictive image in the transform order as the image processing.

12. The image processing apparatus according to claim 11, wherein the image processor is further configured to perform in-loop filtering on the reconstructed image in the transform order.

13. The image processing apparatus according to claim 12, wherein the image processor is further configured to store, in a frame memory in the transform order, the image on which the in-loop filtering has been performed.

14. An image processing method for decoding an image coded in coding processes including (i) prediction on at least two prediction units (PUs) and (ii) frequency transform on transform units (TUs) included in a region including the at least two PUs, the image processing method comprising:
    determining, for each of the at least two PUs, whether or not at least a part of a boundary line between the TUs is within the PU and not coincident with an edge of the PU;
    for each of the at least two Pus: (i) performing partitioning of the PU when it is determined that the PU includes the part of the boundary line between the TUs, and (ii) not partitioning the PU when it is determined that the PU does not include the part of the boundary line between the TUs, the partitioning being a partitioning of the PU along the part of the boundary line between the TUs into blocks that are each included in the TUs and that are each smaller than each of the TUs; and
    performing image processing, for a predictive image of the at least two PUs, on the blocks in a transform order;
    wherein:
    each PU is a unit defined as a data unit for the prediction,
    each TU is a unit defined as a data unit for the frequency transform, and
    at least one PU in the image has an edge format different from an edge format for the TUs in the image.

15. A non-transitory computer-readable recording medium on which a program is recorded, the program causing a computer to execute the image processing method according to claim 14.

16. An integrated circuit for decoding an image coded in coding processes including (i) prediction on at least two prediction units (PUs) and (ii) frequency transform on transform units (TUs) included in a region including the at least two PUs, the integrated circuit comprising:
    a determining circuit configured to determine, for each of the at least two PUs, whether or not at least a part of a boundary line between the TUs is within the PU and not coincident with an edge of the PU;
    a partitioning circuit configured to, for each of the at least two PUs, (i) perform partitioning of the PU when it is determined that the PU includes the part of the boundary line between the TUs, and (ii) not partition the PU when it is determined that the PU does not include the part of the boundary line between the TUs, the partitioning being a partitioning of the PU along the part of the boundary line between the TUs into blocks that are each included in the TUs and that are each smaller than each of the TUs; and
    a processing circuit configured to perform image processing, for a predictive image of the at least two PUs, on the blocks in a transform order;
    wherein:
    each PU is a unit defined as a data unit for the prediction,
    each TU is a unit defined as a data unit for the frequency transform, and
    at least one PU in the image has an edge format different from an edge format for the TUs in the image.

17. The image processing apparatus according to claim 1, further comprising a memory and a processor, wherein at least one of the determining circuit, partitioning circuit, and image processor, is constituted by the processor executing a program stored in the memory.

18. The image processing apparatus according to claim 1, wherein at least one of the determining circuit, partitioning circuit, and image processor, is constituted by a dedicated hardware circuit.

* * * * *